(12) United States Patent
Imamura et al.

(10) Patent No.: US 11,235,706 B2
(45) Date of Patent: Feb. 1, 2022

(54) DISPLAY SYSTEM

(71) Applicant: Panasonic Intellectual Property Management Co., Ltd., Osaka (JP)

(72) Inventors: Norihiro Imamura, Osaka (JP); Kenji Nagatomi, Osaka (JP); Hirofumi Hoshida, Osaka (JP); Michihiro Yamagata, Osaka (JP); Keiichi Matsuzaki, Kyoto (JP); Shoji So, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/080,366

(22) Filed: Oct. 26, 2020

(65) Prior Publication Data
US 2021/0129755 A1 May 6, 2021

(30) Foreign Application Priority Data

Oct. 30, 2019 (JP) .............................. JP2019-197960
Oct. 30, 2019 (JP) .............................. JP2019-197961
(Continued)

(51) Int. Cl.
*B60R 1/08* (2006.01)
*B60R 1/12* (2006.01)
(Continued)

(52) U.S. Cl.
CPC .................. *B60R 1/08* (2013.01); *B60R 1/12* (2013.01); *G02B 5/10* (2013.01); *G02B 5/3033* (2013.01);
(Continued)

(58) Field of Classification Search
CPC ..... B60R 1/08; B60R 1/12; B60R 2001/1253; B60R 2300/103; B60R 2300/202;
(Continued)

(56) References Cited

U.S. PATENT DOCUMENTS 5,706,144 A * 1/1998 Brandin .................... B60R 1/02
359/843
6,469,768 B1 * 10/2002 Lee ..................... C09K 19/0208
349/177
(Continued)

FOREIGN PATENT DOCUMENTS

JP 11-237584 A 8/1999
JP 2017-210229 A 11/2017

OTHER PUBLICATIONS

U.S. Appl. No. 17/031,270 to Norihiro Imamura et al., filed Sep. 24, 2020.
(Continued)

*Primary Examiner* — James M Pontius
(74) *Attorney, Agent, or Firm* — Greenblum & Bernstein, P.L.C.

(57) ABSTRACT

A display system includes: a display that emits light corresponding to image information; a half mirror that receives the light emitted, reflects, as reflected light, a first component of the light received, and transmits a second component different from the first component; and a first reflecting mirror having a concave surface that receives and reflects the reflected light toward the half mirror. The half mirror includes a first retardation film, a first support substrate, and a reflective polarizing film stacked in this order from a side on which the light emitted is received. The first retardation film changes a phase of the light received. The first support substrate is light-transmissive. The reflective polarizing film reflects a first polarized component and transmits a second
(Continued)

polarized component different from the first polarized component.

20 Claims, 30 Drawing Sheets

(30) Foreign Application Priority Data

Dec. 27, 2019 (JP) .............................. JP2019-237754
Jun. 15, 2020 (JP) .............................. JP2020-103396

(51) Int. Cl.
*G02B 5/10* (2006.01)
*G02B 5/30* (2006.01)

(52) U.S. Cl.
CPC . *B60R 2001/1253* (2013.01); *B60R 2300/103* (2013.01); *B60R 2300/202* (2013.01); *B60R 2300/308* (2013.01); *B60R 2300/605* (2013.01); *B60R 2300/8026* (2013.01)

(58) Field of Classification Search
CPC ........ B60R 2300/308; B60R 2300/605; B60R 2300/8026; B60R 2300/20; B60R 1/00; B60R 1/07; B60R 1/02; G02B 5/10; G02B 5/3033; G02B 27/283; G02B 27/286; G02B 27/0179; G02B 27/10; G02B 27/28; G02B 2027/0183
See application file for complete search history.

(56) References Cited

U.S. PATENT DOCUMENTS

| | | | |
|---|---|---|---|
| 10,525,886 B2 | 1/2020 | Imamura et al. | |
| 10,730,440 B2 | 8/2020 | Imamura et al. | |
| 10,836,314 B2 | 11/2020 | Imamura et al. | |
| 10,882,454 B2* | 1/2021 | Imamura | H04N 5/23219 |
| 2002/0030773 A1* | 3/2002 | Endo | H04N 9/3164 349/95 |
| 2016/0178964 A1* | 6/2016 | Sakai | G02B 27/286 345/592 |
| 2016/0200255 A1* | 7/2016 | Takada | B60R 1/084 359/488.01 |
| 2016/0216414 A1* | 7/2016 | Ichihashi | G03B 21/62 |
| 2017/0009138 A1* | 1/2017 | Nakazawa | G02F 1/133553 |
| 2017/0343806 A1* | 11/2017 | Anzai | G02B 5/26 |
| 2017/0349790 A1* | 12/2017 | Todaka | G06F 3/044 |
| 2018/0284470 A1* | 10/2018 | Yamamoto | G02B 5/124 |
| 2018/0335551 A1* | 11/2018 | Taguchi | G02B 5/0816 |
| 2019/0079304 A1* | 3/2019 | Ando | B60R 1/04 |
| 2019/0243147 A1* | 8/2019 | Smithwick | G02B 27/10 |
| 2020/0012099 A1* | 1/2020 | Kim | G02B 5/30 |
| 2020/0070726 A1* | 3/2020 | Imamura | G02B 5/10 |
| 2020/0070729 A1 | 3/2020 | Imamura et al. | |
| 2020/0089015 A1* | 3/2020 | Reichow | G02B 27/148 |
| 2020/0189363 A1* | 6/2020 | Sugiyama | B60K 35/00 |
| 2020/0377021 A1* | 12/2020 | So | B60R 1/04 |
| 2020/0379226 A1* | 12/2020 | Steiner | G02B 27/283 |
| 2021/0197725 A1* | 7/2021 | Imamura | B60R 1/00 |

OTHER PUBLICATIONS

U.S. Appl. No. 17/125,578 to Norihiro Imamura et al., filed Dec. 17, 2020.

* cited by examiner

DISPLAY SYSTEM

CROSS REFERENCE TO RELATED APPLICATIONS

The present application is based on and claims priority of Japanese Patent Application No. 2019-197960 filed on Oct. 30, 2019, Japanese Patent Application No. 2019-197961 filed on Oct. 30, 2019, Japanese Patent Application No. 2019-237754 filed on Dec. 27, 2019, and Japanese Patent Application No. 2020-103396 filed on Jun. 15, 2020.

FIELD

The present disclosure relates to a display system for displaying image information.

BACKGROUND

As an example of a conventional display system, for example, Patent Literature (PTL) 1 discloses an image display device securing high brightness and high image quality, while achieving reduction in the size and weight of an optical system, on the assumption that the device is mounted on a head-mounted display.

CITATION LIST

Patent Literature

[PTL 1]
Japanese Unexamined Patent Application Publication No. H11-237584
[PTL 2]
U.S. Pat. No. 5,706,144
[PTL 3]
Japanese Unexamined Patent Application Publication No. 2017-210229

SUMMARY

However, the image display device etc. disclosed in PTL 1 can be improved upon.

In view of this, the present disclosure provides a display system capable of improving upon the above related art.

A display system according to one aspect of the present disclosure includes: a display that emits, from a display surface, light corresponding to image information; a half mirror that receives the light emitted, reflects, as reflected light, a first component of the light received, and transmits a second component of the light received, the second component being different from the first component; and a first reflecting mirror having a concave surface that receives and reflects the reflected light toward the half mirror. The half mirror includes a first retardation film, a first support substrate, and a reflective polarizing film stacked in this order from a side on which the light emitted is received, the first retardation film changing a phase of the light received, the first support substrate being light-transmissive, the reflective polarizing film reflecting a first polarized component and transmitting a second polarized component different from the first polarized component.

The display system according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

[History Until Arriving at Present Disclosure]

Now, example use of a display system according to the present disclosure and the problems of the display system disclosed in PTL 1, etc. described above will be described in detail with reference to FIGS. 1 to 3.

Figure 1:
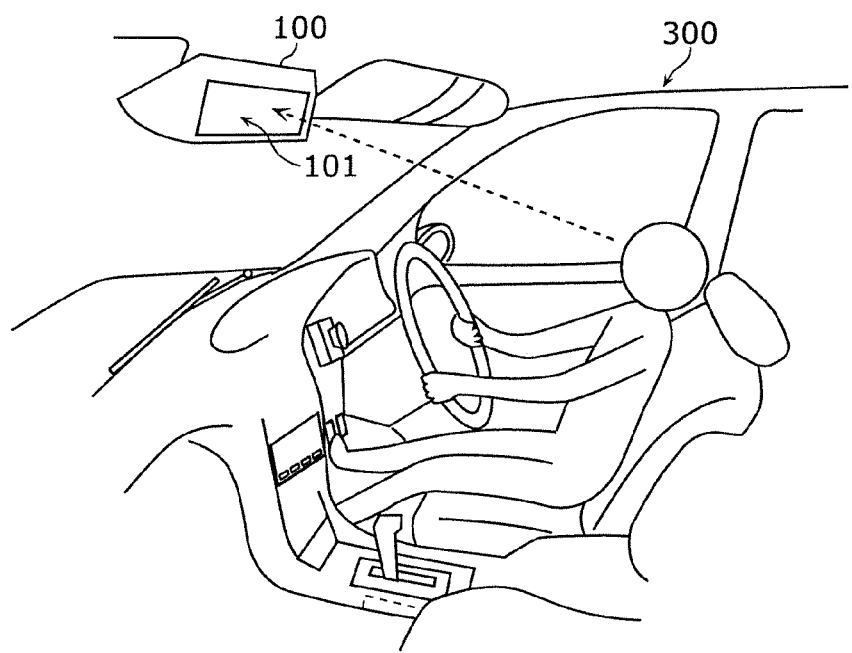
FIG. 1 shows an example interior of a vehicle in which a display system is placed.

FIG. 1 shows an example interior of a vehicle in which a display system is placed. In FIG. 1, as example placement of display system 100 according to the present disclosure and a conventional display system, the room mirror of vehicle 300 is replaced with a far-view electronic mirror. Note that the conventional display system can be understood by reading display system 100 as the conventional display system as appropriate. As shown in FIG. 1, display system 100 forms, as an example, the far-view electronic mirror replacing the room mirror of vehicle 300.

Display system 100 can be placed in a position equivalent to that of the room mirror, for example, above a windshield (i.e., a front window) as viewed form a driver of vehicle 300. Like the room mirror, display system 100 placed in such the position displays, as images, the view behind vehicle 300. Unlike the room mirror, display system 100 displays, as desired images, any types of information such as the vehicle speed, a result of detecting a nearby object, or navigation from the current location to a destination. The images are projected through output window 101 located on the surface of case 105 (see FIG. 5 which will be described later) of display system 100 onto the line of sight of the driver. In other words, the information described above is visible to the driver viewing output window 101.

Figure 2A:
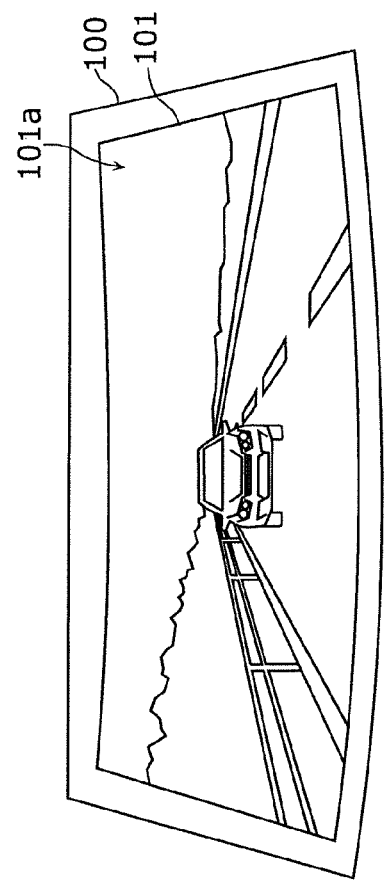
FIG. 2A is a first view showing example use of the display system.
Figure 2B:
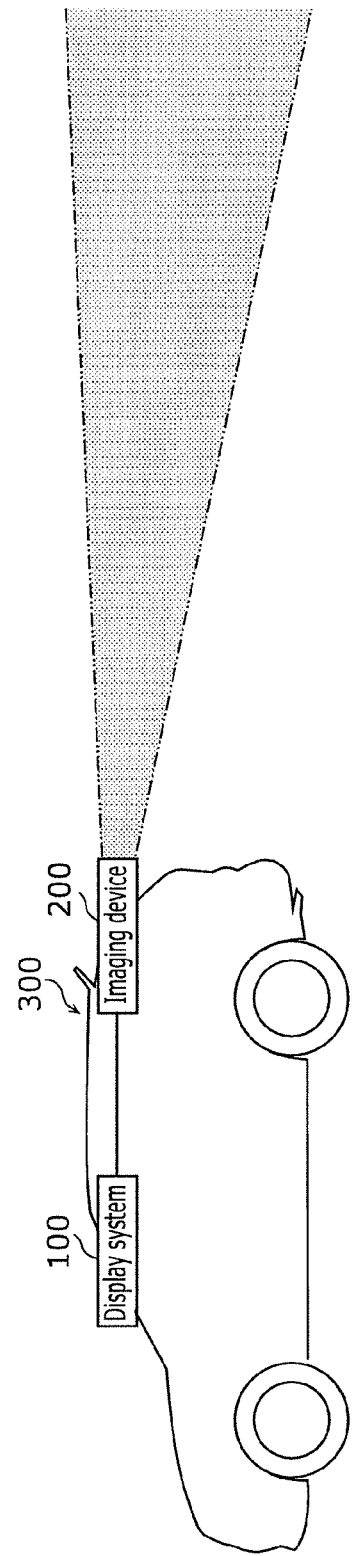
FIG. 2B is a second view showing the example use of the display system.

FIG. 2A is a first view showing example use of the display system. FIG. 2B is a second view showing the example use of the display system. FIG. 2A shows the view behind vehicle 300 as example image 101a displayed on the display system as viewed from the driver. In this manner, projected image 101a is visible to the driver viewing output window 101 of display system 100. In this example, displayed image 101a is captured by imaging device 200 placed in vehicle 300. As shown in FIG. 2B, imaging device 200 is placed at the rear of vehicle 300 and images the view of the area, such as the dot-hatched area, behind vehicle 300. A captured image is transmitted to display system 100 and displayed as image 101a in almost real time.

Figure 3:
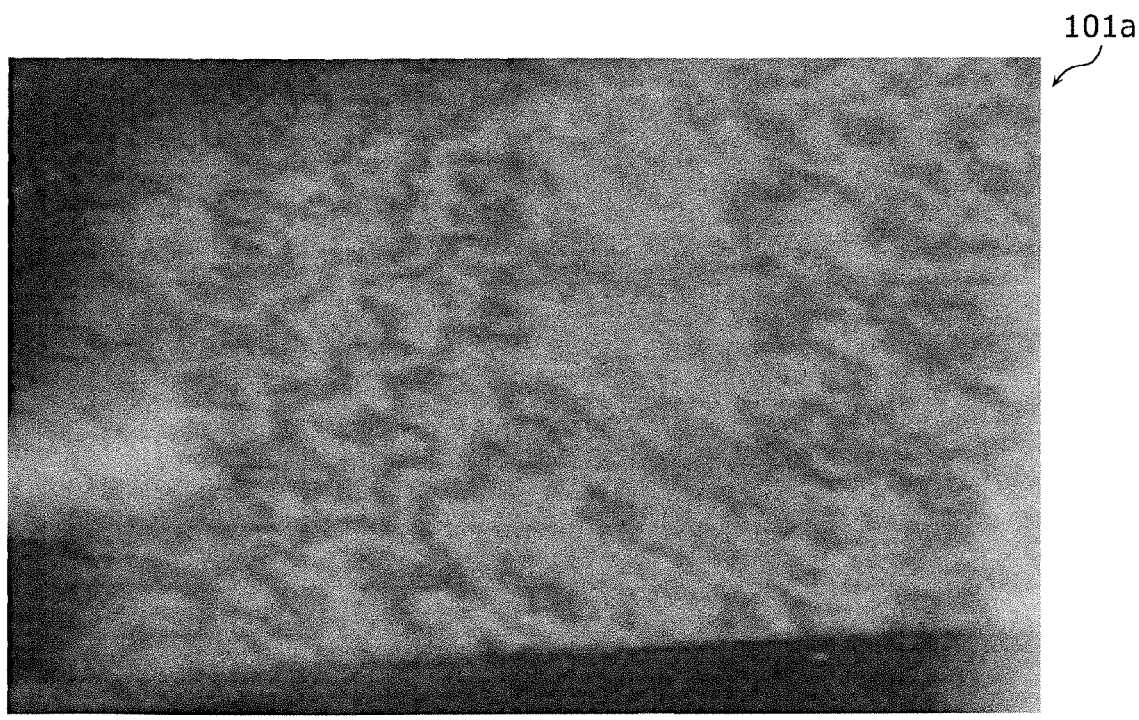
FIG. 3 illustrates an image displayed by a conventional display system.

Here, the conventional display system may display image 101a as shown in FIG. 3. FIG. 3 illustrates an image displayed by the conventional display system. In FIG. 3, the displayed image is plane without any pattern. As shown in FIG. 3, the conventional display system causes a coloring phenomenon in which colors different from viewing direction to viewing direction are mottled and rippling. At the occurrence of such the coloring phenomenon, image 101a to be displayed actually is influenced and distorted and becomes less visible. In short, the conventional display system may fail to display images properly.

The coloring phenomenon shown in FIG. 3 in which colors different from viewing direction to viewing direction are mottled and rippling can be seen on an oil film spreading on the water surface. This phenomenon can be explained with the interference between two types of natural light, one reflected by the water surface and the other by the oil film surface. Specifically, one of the natural light passes through the oil film, reaches the water surface, and is reflected by the water surface. The other natural light is reflected by the oil film surface without reaching the water surface. If the two types of light overlap each other and have an identical photon wavelength, the amplitudes are amplified or attenuated depending on the phases of the two types of light. In addition, the water surface and the oil film surface have inconstant thicknesses, the wavelengths of interfering light differ from each other depending on the viewing positions or directions. The conventional display system may cause a phenomenon based on a similar principle.

More specifically, in the conventional display system, the light corresponding to the image information is emitted from the display, reflected by the inside of the display system a plurality of times, and reflected toward the output window.

At this time, the configuration reflecting light has a half mirror which causes the problem described above at the reflection.

[Outline of Disclosure]

In this point of view, a display system according to one aspect of the present disclosure includes: a display that emits, from a display surface, light corresponding to image information; a half mirror that receives the light emitted, reflects, as reflected light, a first component of the light received, and transmits a second component of the light received, the second component being different from the first component; and a first reflecting mirror having a concave surface that receives and reflects the reflected light toward the half mirror. The half mirror includes a first retardation film, a first support substrate, and a reflective polarizing film stacked in this order from a side on which the light emitted is received, the first retardation film changing a phase of the light received, the first support substrate being light-transmissive, the reflective polarizing film reflecting a first polarized component and transmitting a second polarized component different from the first polarized component.

In such the display system, the emitted light is, as the light corresponding to the image information, incident on the half mirror. The light incident on the half mirror is divided into a first component that is reflective and a second component that is transmissive. At this time, unintended reflection may occur at interfaces between a first retardation film and a reflective polarizing film constituting the half mirror, and a joint layer that joins the films to a first support substrate. The display system according to the present disclosure reduces such the unintended reflection.

Specifically, if an interface has non-flatness, that is, a swell, the incident light tends to be reflected and the interference between the different light reflected by the different interfaces causes the coloring phenomenon described above. Thus, a flat interface reduces unintended reflection, eventually the coloring phenomenon. In the display system according to the present disclosure, the first support substrate with a relatively high flatness has, on each surface, one of a first retardation film and a reflective polarizing film that tend to cause non-flat interfaces. This configuration reduces non-flatness (i.e., secures the flatness) of interfaces as compared to the conventional display system including the two of the first retardation film and the reflective polarizing film stacked one on the top of the other. Accordingly, the display system reduces unintended reflection and the coloring phenomenon caused by the reflection. As a result, more proper display of images becomes possible.

For example, the first retardation film may be directly bonded to one principal surface of the first support substrate. The reflective polarizing film may be directly bonded to another principal surface of the first support substrate.

In this configuration, there is no member between the first retardation film and the first support substrate. This configuration improves the effect of the first support substrate securing the flatness of the first retardation film. At the same time, there is also no member between the reflective polarizing film and the first support substrate. This configuration improves the effect of the first support substrate securing the flatness of the reflective polarizing film. Accordingly, the non-flat surface is less formed and more proper display of images becomes possible. In addition, such the effects can be obtained only by the single first support substrate, which reduces an increase in the size of the display system to secure the flatness of the constituent elements of the half mirror.

For example, the half mirror may further include a second retardation film on a surface of the reflective polarizing film opposite to the first support substrate. The second retardation film may change a phase of the second polarized component transmitted through the reflective polarizing film.

In this configuration, the display system displays images using the output of circularly polarized light. Even if there is a polarizing optical device such as a polarizing plate or a polarizing film between the display system and the user (e.g. the driver) viewing an image using the display system, the user recognizes the image properly. Accordingly, more proper display of images becomes possible.

For example, the half mirror may further include, on a surface of the reflective polarizing film opposite to the first support substrate, a second support substrate that is light-transmissive.

In this configuration, the reflective polarizing film interposed between the first support substrate and the second support substrate secures flatness. The non-flat surface is less formed on both the principal surfaces of the reflective polarizing film and more proper display of images becomes possible.

For example, the half mirror may further include, on a surface of the first retardation film opposite to the first support substrate, a third support substrate that is light-transmissive.

In this configuration, the first retardation film interposed between the first support substrate and the third support substrate secures the flatness. The non-flat surface is less formed on both the principal surfaces of the first retardation film and more proper display of images becomes possible.

For example, the half mirror may further include a second reflecting mirror different from the first reflecting mirror.

This configuration improves the flexibility in designing the optical path of the light emitted from the display of the display system via the half mirror. This configuration also allows flexible designing of the shape of the case that determines the outer shape of the display system. As a result, more proper display of images becomes possible which is suitable for the usage of the display system.

For example, the second reflecting mirror may reflect, toward the half mirror, the light emitted.

In this configuration, the light emitted and reflected by the second reflecting mirror interposed between the display and the half mirror is incident on the half mirror. Even in the space including a shield, for example, between the display and the half mirror, the flexibility improves in designing the optical path of the light. As a result, more proper display of images becomes possible which is suitable for the usage of the display system.

For example, the second reflecting mirror may reflect the reflected light toward the first reflecting mirror.

In this configuration, the reflected light reflected by the second reflecting mirror interposed between the half mirror and the first reflecting mirror is incident on the first reflecting mirror. Even in the space including a shield, for example, between the half mirror and the first reflecting mirror, the flexibility improves in designing the optical path of the light. As a result, more proper display of images becomes possible which is suitable for the usage of the display system.

For example, the image information may indicate an image captured by an imaging device.

In this configuration, the display system is used to display captured images. For example, if displaying the captured images in almost real time, the display system is applicable as an electronic mirror.

For example, the display may include: a light supplier that supplies linearly polarized light as the light corresponding to the image information, and a third retardation film that changes a phase of the linearly polarized light supplied from the light supplier and emits the linearly polarized light as the light emitted.

In this configuration, any type of light supplier capable of supplying linearly polarized light constitutes the display system. The display system may include, as the light supplier, a liquid crystal display (LCD) or an organic electroluminescence (EL) display, for example. In the use of the organic EL display, polarizing plates, for example, for changing the supplied light to linearly polarized light may be combined.

Note that the embodiments described below are mere specific examples of the present disclosure. The numerical values, shapes, materials, constituent elements, the arrangement and connection of the constituent elements, steps, step orders etc. shown in the following embodiments are thus mere examples, and are not intended to limit the scope of the present disclosure. Among the constituent elements in the following embodiments, those not recited in any of the independent claims are described as optional constituent elements.

Embodiment 1

[Configuration and Operation of Display System]

Figure 4:
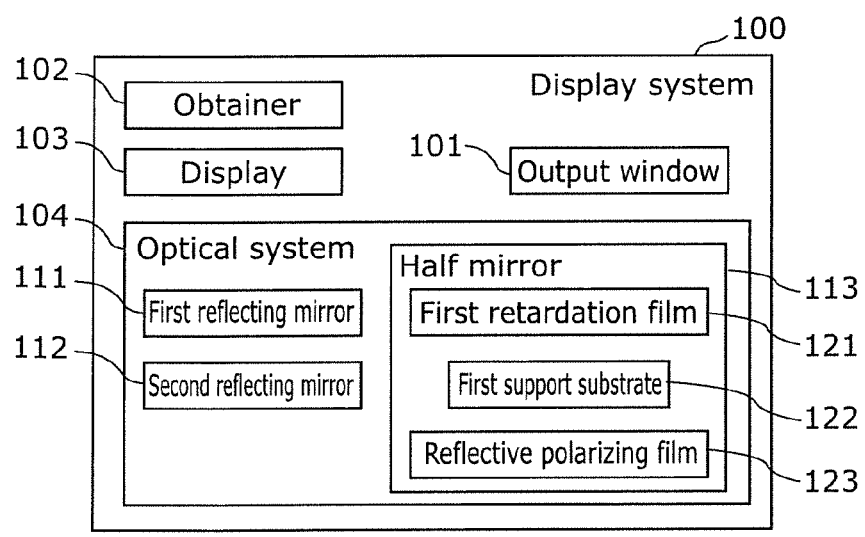
FIG. 4 is a block diagram showing a functional configuration of a display system according to Embodiment 1.

Now, a configuration and an operation of display system 100 according to an embodiment will be described with reference to FIGS. 4 to 7. FIG. 4 is a block diagram showing a functional configuration of the display system according to the embodiment.

As shown in FIG. 4, display system 100 according to this embodiment includes output window 101, obtainer 102, display 103, and optical system 104. In the block diagram of FIG. 4, the rectangle surrounding the outermost periphery of display system 100 represents case 105. Output window 101 includes inside, the constituent elements of display system 100 together with case 105. Output window 101 outputs the light reflected inside case 105. In other words, output window 101 is located around the opening in case 105 and outputs image 101a to be displayed by display system 100. Output window 101 is made of a material, such as glass or a resin including acrylic, that is at least partially light-transmissive.

Obtainer 102 is a processor that obtains captured images from imaging device 200 described above with reference to FIG. 2A. Obtainer 102 executes image obtaining programs using a processor and a memory, for example, to obtain the images captured by imaging device 200. Obtainer 102 outputs the obtained images as image information to display 103, which will be described later, whereby display system 100 starts displaying the images. If images displayed by display system 100 are not captured by imaging device 200, obtainer 102 may be replaced with an image generator (not shown). The image generator may generate image information corresponding to information, such as the vehicle speed, a result of detecting a nearby object, or the navigation information from the current location to a destination, to be displayed. The image generator may output the information to display 103. Obtainer 102 and the image generator may be both included.

Display 103 is a device that emits light according to the image information output from obtainer 102 or the image generator. Display 103 is achieved including display device 103a (see FIG. 5 which will be described later) such as an LCD, an organic EL display, or micro LED display. Display device 103a is an example light supplier according to the embodiment. Although described later in detail with reference to FIG. 5, display 103 includes third retardation film 103b (see FIG. 5 which will be described later) though which the light emitted by display device 103a passes. Third retardation film 103b causes display 103 to emit circularly polarized light. Thus, display device 103a needs to emit linearly polarized light. The linearly polarized light can be obtained by combining a display panel and a general polarizing plate. If used as a display device, an LCD emits linearly polarized light without requiring such the polarizing plate, for example, in principle. An LCD is thus suitable as display device 103a according to the present disclosure.

Optical system 104 has a light path guiding the light emitted from display 103 to the output window utilizing reflection or refraction, for example. Optical system 104 includes optical devices such as reflecting mirrors and lenses, for example. Optical system 104 according to this embodiment includes first reflecting mirror 111, second reflecting mirror 112, and half mirror 113. Half mirror 113 includes first retardation film 121, first support substrate 122, and reflective polarizing film 123. If allowable by the angle of reflection of the light in optical system 104, first support substrate 122 of half mirror 113 may serve as output window 101.

Figure 5:
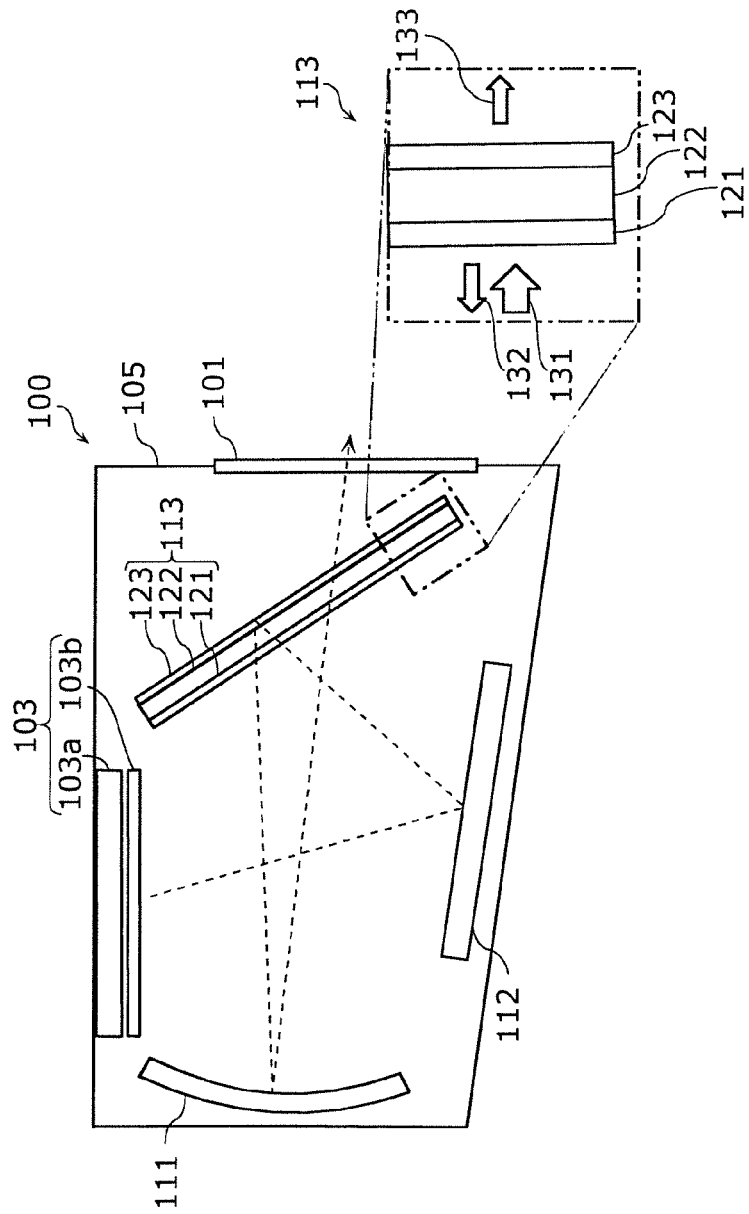
FIG. 5 illustrates an optical system of the display system according to Embodiment 1.

Optical system 104 according to this embodiment guides the light emitted from display 103 to the output window through the path indicated by the broken arrow in FIG. 5. FIG. 5 illustrates the optical system of the display system according to the embodiment.

As shown in FIG. 5, display device 103a constituting display 103 supplies, as P-polarized light, the light corresponding to the image information. The supplied P-polarized light is changed to circularly polarized light by third retardation film 103b. The film changes the phase of incident light by applying a phase difference of a ¼ wavelength. Emitted light 131 is then emitted to optical system 104. Third retardation film 103b is an optical device that changes the phase of the P-polarized light supplied from display device 103a and emits the changed light as emitted light.

Emitted light 131 emitted from display 103 including display device 103a and third retardation film 103b is reflected by second reflecting mirror 112. Second reflecting mirror 112 is a plane mirror, for example, different from first reflecting mirror 111 which will be described later. Second reflecting mirror 112 is located at the position for reflecting the emitted light incident toward half mirror 113. Note that the circularly polarized light reflected by second reflecting mirror 112 rotates in the inverted direction.

As shown in the enlarged view surrounded by the two-dotted chain line, half mirror 113 reflects, as reflected light 132, a light component, such as an S-polarized component, of incident light. The half mirror transmits, as transmitted light 133, the light component obtained by subtracting reflected light 132 from the incident light. Emitted light 131 reflected by second reflecting mirror 112 is incident on half mirror 113. Here, half mirror 113 includes first retardation film 121, first support substrate 122, and reflective polarizing film 123 stacked in this order from the side on which emitted light 131 is incident. Accordingly, emitted light 131 incident on half mirror 113 is transmitted by first retardation film 121 and first support substrate 122 and reaches reflective polarizing film 123.

First retardation film 121 is a sheet-like optical device that changes the phase of incident light. First retardation film 121 applies the phase difference of a ¼ wavelength to the transmitted light. Thus, first retardation film 121 changes the phase of the incident circularly polarized light to linearly polarized light. As described above, being the circularly polarized light, the light incident from second reflecting mirror 112 onto half mirror 113 is changed to the linearly polarized light and incident on first support substrate 122. Since the circularly polarized light rotates here in the direction inverted by the reflection of second reflecting mirror 112, the S-polarized light is generated as the linearly polarized light. Note that the function of applying the phase difference of the ¼ wavelength may be applied within the wavelength range of light visible to human, out of the light emitted from display 103. Such the wavelength range extends from 400 nm to 700 nm, for example. Alternatively, the function may be applied to the wavelength range that sufficiently covers the wavelength range of visible light. Such the wavelength range extends from 350 nm to 850 nm, for example.

First support substrate 122 is a light-transmissive hard plate-like member that supports first retardation film 121 and reflective polarizing film 123 that are soft sheets. The first retardation film is directly bonded to one principal surface, whereas the reflective polarizing film is directly bonded to the other principal surface. In addition, first support substrate 122 has a smaller optical influence on transmitted light in one preferred embodiment. With this configuration, the light transmitted by first retardation film 121 reaches, almost unchanged, reflective polarizing film 123. First support substrate 122 is a glass plate with rectangular principal surfaces, for example. As long as having the characteristics described above, first support substrate 122 may be made of any material and in any shape.

Reflective polarizing film 123 is an optical device that reflects the S-polarized component and transmits the P-polarized component that vibrates orthogonally to the S-polarized component. Reflective polarizing film 123 receives the light transmitted by first retardation film 121 via first support substrate 122. The incident light is changed from the circularly polarized light to the linearly polarized light. This linearly polarized light is the S-polarized light and thus reflected by reflective polarizing film 123 and incident again via first support substrate 122 on first retardation film 121. First retardation film 121 exhibits reduced directivity and effects of changing the phase of the light incident from both the principal surfaces similarly. The S-polarized light reflected by reflective polarizing film 123 is thus incident on first retardation film 121 and changed to the circularly polarized light. Note that the phase difference caused by first retardation film 121 may fall within a range from ⅓ to ⅕. In this case, optical system 104 can be designed so that reflective polarizing film 123 reflects the S-polarized component at a desired amount.

Reflected light 132 containing the light changed to the circularly polarized light in this manner is incident on first reflecting mirror 111. First reflecting mirror 111 has a concave surface that reflects incident light. Reflection of light using the concave surface in this manner is effective in causing light to seem as if it were farther from the actual location.

Reflected light 132 incident on first reflecting mirror 111 is further reflected by first reflecting mirror 111. At this time, the circularly polarized light contained in reflected light 132 rotates in the inverted direction. First reflecting mirror 111 at the position for receiving reflected light 132 and reflects reflected light 132 incident from first reflecting mirror 111 toward half mirror 113. Accordingly, reflected light 132 reflected by first reflecting mirror 111 is incident on half mirror 113 again.

Reflected light 132 incident on half mirror 113 contains a large amount of the circularly polarized light obtained by changing the phase of the S-polarized light and inverting the rotation direction. That is, first retardation film 121 of half mirror 113 changes most of reflected light 132 to the P-polarized light. The component of reflected light 132 that has changed to the P-polarized light reaches reflective polarizing film 123 and transmitted through reflective polarizing film 123 and emitted from output window 101. For example, an image projected by the light emitted from output window 101 on the retina is visible, as an image displayed on the output window of display system 100, to the driver.

Figure 6A:
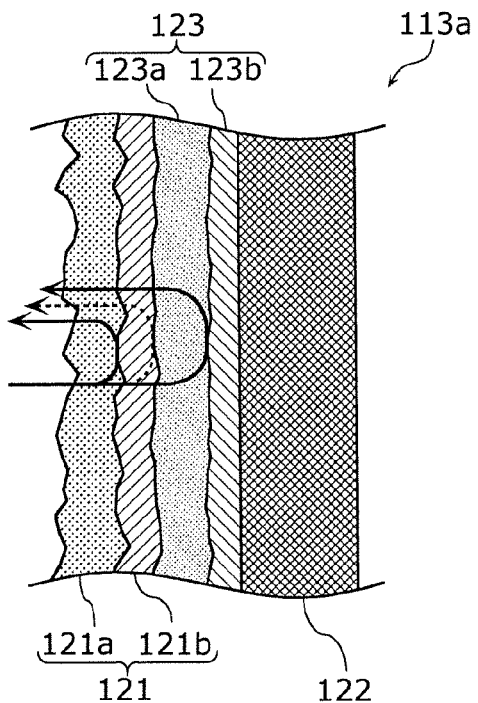
FIG. 6A illustrates components of reflected light in a conventional display system.
Figure 6B:
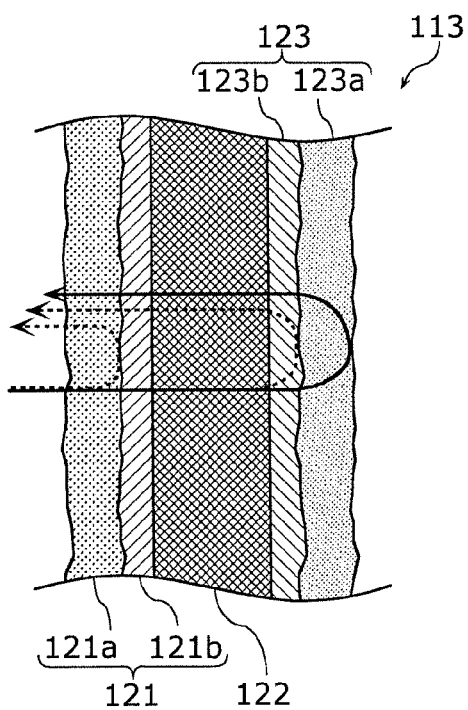
FIG. 6B illustrates components of reflected light in the display system according to Embodiment 1.

FIG. 6A illustrates components of reflected light in the conventional display system. FIG. 6B illustrates components of reflected light in the display system according to the embodiment. FIGS. 6A and 6B show detailed configurations of half mirror 113a of the conventional display system and half mirror 113 of display system 100 according to this embodiment.

As shown in FIGS. 6A and 6B, first retardation film 121 includes first phase difference layer 121a and adhesive layer 121b. Through adhesive layer 121b, first retardation film 121 adheres to an adhesion target. Similarly, as shown in FIGS. 6A and 6B, reflective polarizing film 123 includes reflective polarizing layer 123a and adhesive layer 123b. Through adhesive layer 123b, reflective polarizing film 123 adheres to an adhesion target.

As shown in FIG. 6A, half mirror 113a used in the conventional display system includes reflective polarizing film 123 on first support substrate 122 and first retardation film 121 on the reflective polarizing film. Although first support substrate 122 is a hard member and has thus highly flatness, reflective polarizing film 123 stacked thereon is made of a soft material and reduces the flatness. As a result, the less flat surface (i.e., non-flat surface) is formed at the interface between adhesive layer 123b and reflective polarizing layer 123a and the surface of reflective polarizing layer 123a opposite to the interface.

In addition, first retardation film 121 is stacked on the surface with the reduced flatness in this manner, which largely reduced the flatness. Specifically, the flatness is largely reduced on the interface between adhesive layer 121b and first phase difference layer 121a and on the surface of first phase difference layer 121a opposite to the interface.

On such the non-flat surfaces, unintended reflection occurs due to the wavelength, incident angle, or any other characteristic of incident light. The interference of the light at each interface may leads to the coloring phenomenon. The interfering light contains the light actually reflected by reflective polarizing film 123 and indicated by the solid arrow in the figure. In the figure, the interface between first phase difference layer 121a and adhesive layer 121b is a surface with largely reduced flatness. A large amount of light may thus be reflected as indicated by the solid arrow in the figure under certain conditions. Similarly, the interface between adhesive layer 121b and reflective polarizing layer 123a is a surface with reduced flatness but the non-flatness is reduced at a certain level. The light is thus less reflected as indicated by the broken arrow in the figure.

On the other hand, as shown in FIG. 6B, half mirror 113 used in display system 100 according to this embodiment includes first retardation film 121 on one principal surface of first support substrate 122 and reflective polarizing film 123 on the other principal surface. Each surface has the flatness reduced at a certain level. Therefore, the non-flat surface is less formed in display system 100 and unintended reflection less occurs as indicated by the broken arrow in the figure.

Figure 7:
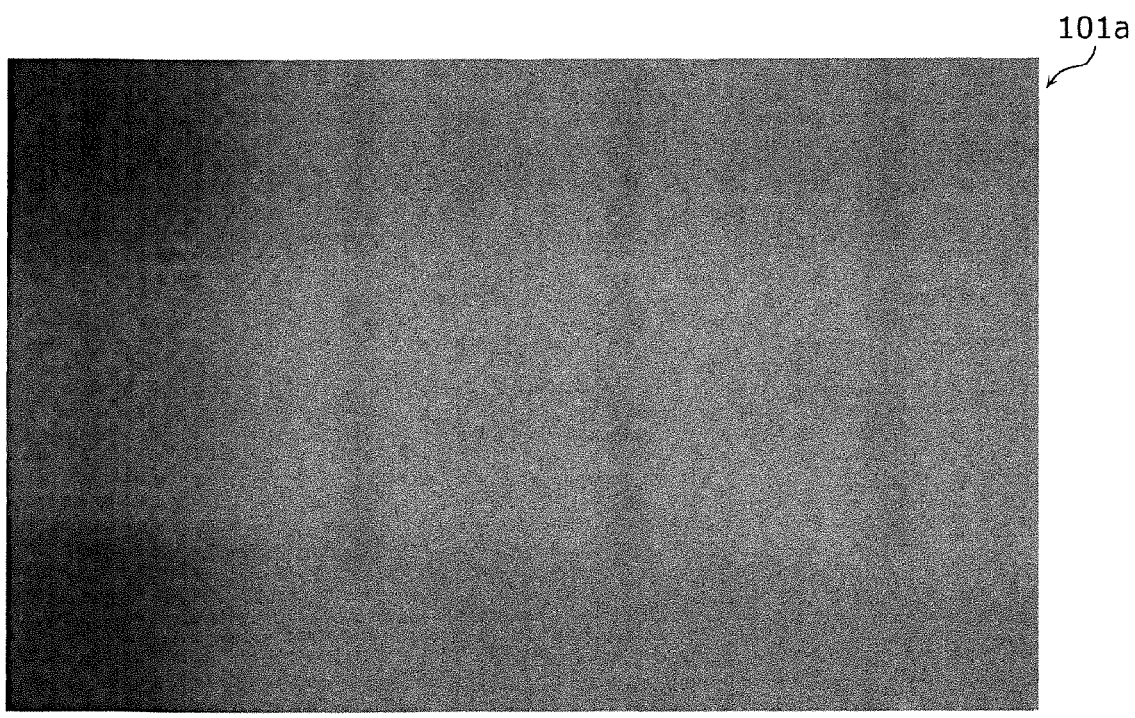
FIG. 7 illustrates an image displayed by the display system according to Embodiment 1.

FIG. 7 illustrates an image displayed by the display system according to the embodiment. FIG. 7 shows a plain image with no pattern displayed by display system 100 like in FIG. 3. As shown in FIG. 7, it can be seen that no coloring phenomenon occurs, in which colors different from viewing direction to viewing direction are mottled and rippling as in the example of FIG. 3 and that display system 100 displays image 101a properly. As described above, display system 100 according to this embodiment effectively reduces the coloring phenomenon and displays image 101a more properly.

Variation 1

Figure 8:
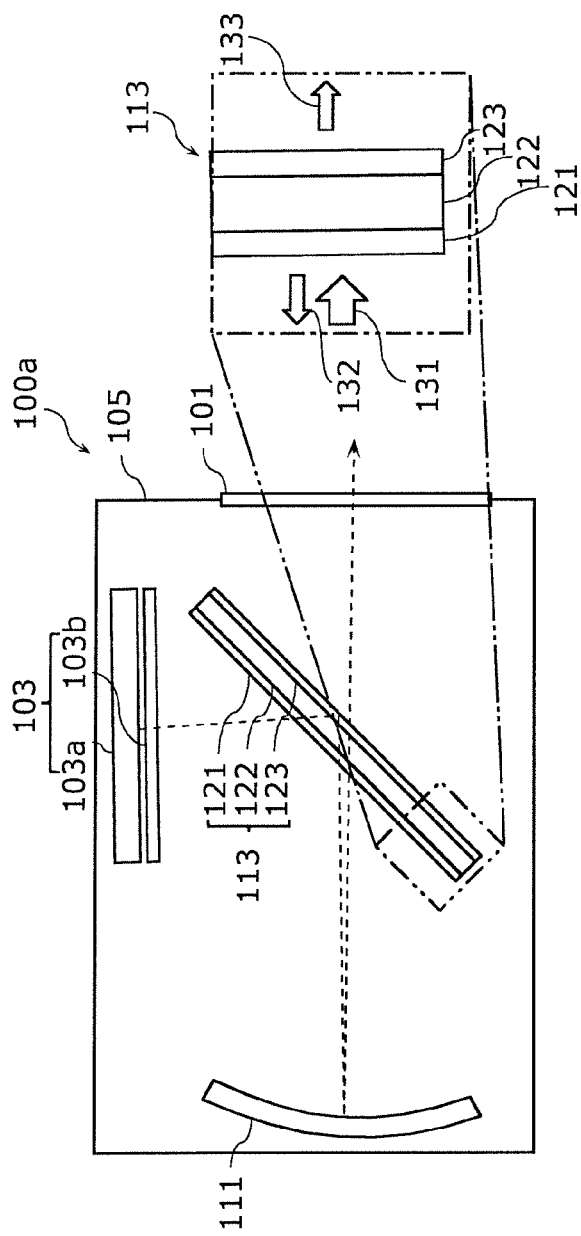
FIG. 8 illustrates an optical system of a display system according to Variation 1 of Embodiment 1.

Now, display system 100 according to variations of the embodiment will be further described. In the following description, differences from the embodiment described above will be mainly described and the description of substantially the same configurations as in the embodiment is omitted or simplified. FIG. 8 illustrates an optical system of a display system according to Variation 1 of the embodiment. Unlike in the embodiment, display system 100a shown in FIG. 8 includes no second reflecting mirror 112.

In this variation, in display device 103a, light is changed to circularly polarized light by third retardation film 103b, reflected by half mirror 113, and incident on first reflecting mirror 111 with the rotation direction unchanged. The circularly polarized light incident on first reflecting mirror 111 is incident on half mirror 113 again. In half mirror 113, the P-polarized light changed from the circularly polarized light reaches reflective polarizing film 123, is transmitted through reflective polarizing film 123, and is emitted from output window 101.

In this manner, display system 100 is achieved even without second reflecting mirror 112. Second reflecting mirror 112 is thus inessential. Without second reflecting mirror 112 in this manner, display system 100a can be miniaturized and the costs can be reduced.

Alternatively, there may be a plurality of second reflecting mirrors 112 that are not plane mirrors but may be any combination of concave and convex mirrors. The optical location of second reflecting mirror 112 is not limited to what is described above in the embodiment. For example, second reflecting mirror 112 may be located on the light path from half mirror 113 to first reflecting mirror 111, on the light path from first reflecting mirror 111 to half mirror 113, or on both the paths. Any optical system 104 only needs to be formed in accordance with the specifications required for display system 100.

Variation 2

Figure 9A:
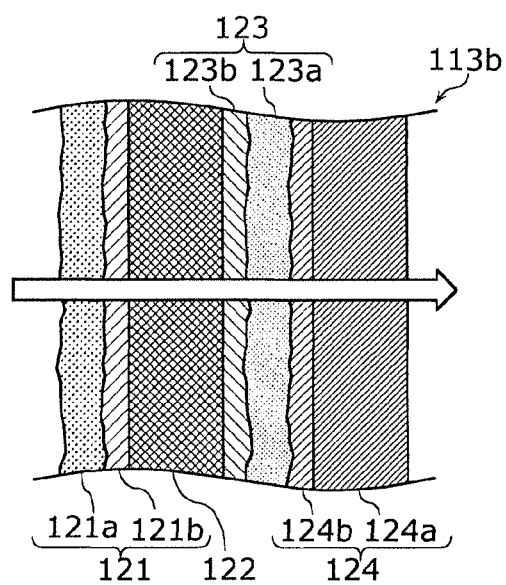
FIG. 9A is a first view illustrating a half mirror of a display system according to Variation 2 of Embodiment 1.
Figure 9B:
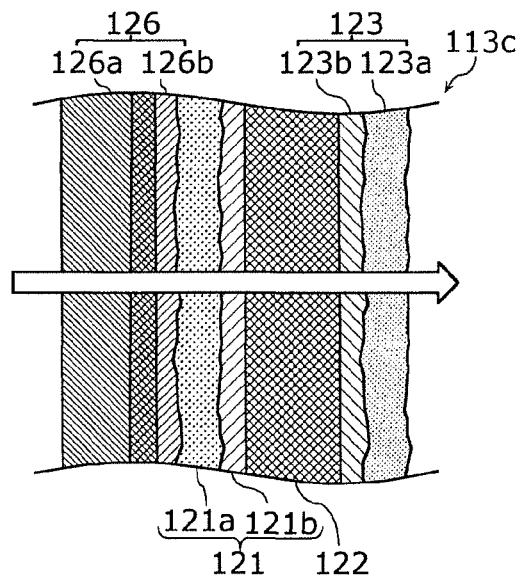
FIG. 9B is a second view illustrating the half mirror of the display system according to Variation 2 of Embodiment 1.

FIG. 9A is a first view illustrating a half mirror of a display system according to Variation 2 of the embodiment. FIG. 9B is a second view illustrating the half mirror of the display system according to Variation 2 of the embodiment. In display system 100 shown in FIGS. 9A and 9B, half mirror 113 has a different configuration from that in the embodiment described above.

In the example of FIG. 9A, half mirror 113b includes second support substrate 124. Specifically, second support substrate 124 is further stacked on the surface of reflective polarizing film 123 opposite to first support substrate 122. Second support substrate 124 is stacked as follows. Second support layer 124a constituting second support substrate 124 adheres, with adhesive layer 124b, onto reflective polarizing layer 123a of reflective polarizing film 123. Second support layer 124a of second support substrate 124 is made of a hard member like first support substrate 122. This configuration secures the flatness of reflective polarizing film 123 interposed between second support layer 124a and first support substrate 122. Accordingly, display system 100 with such half mirror 113b displays image 101a more properly.

In the example of FIG. 9B, half mirror 113c includes third support substrate 126. Specifically, third support substrate 126 is further stacked on the surface of first retardation film 121 opposite to first support substrate 122. Third support substrate 126 is stacked as follows. Third support layer 126a constituting third support substrate 126 adheres, with adhesive layer 126b, onto first phase difference layer 121a of first retardation film 121. This configuration secures the flatness of first retardation film 121 interposed between third support layer 126a and first support substrate 122. Accordingly, display system 100 with such half mirror 113c displays image 101a more properly.

Variation 3

Figure 10:
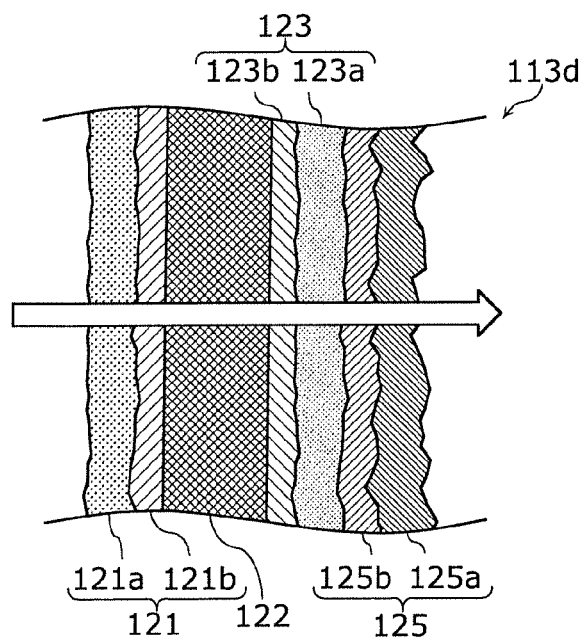
FIG. 10 illustrates a half mirror of a display system according to Variation 3 of Embodiment 1.

FIG. 10 illustrates a half mirror of display system according to Variation 3 of the embodiment. In display system 100 shown in FIG. 10, half mirror 113 has a different configuration from that in the embodiment described above.

In this variation, half mirror 113d includes second retardation film 125. Specifically, second retardation film 125 is further stacked on the surface of reflective polarizing film 123 opposite to first support substrate 122. Second retardation film 125 is stacked as follows. Second phase difference layer 125a constituting second retardation film 125 adheres, with adhesive layer 125b, onto reflective polarizing layer 123a of reflective polarizing film 123. Like first retardation film 121, second retardation film 125 applies a phase difference of a ¼ wavelength to the phase of the incident light to change the light between linearly polarized light and circularly polarized light. As described above in the embodiment, the light transmitted through reflective polarizing film 123 is the P-polarized light of the linearly polarized light. For example, when a driver with polarized sunglasses, for example, views this light, the polarized light may be invisible or less visible depending on the directions. If second retardation film 125 is further stacked on reflective polarizing film 123, the P-polarized light transmitted through reflective polarizing film 123 heads, as the circularly polarized light, for output window 101. That is, display system 100 can be achieved which displays images highly visible to a driver even with polarized sunglasses, for example. Accordingly, display system 100 including such half mirror 113d displays image 101a more properly.

Embodiment 2

Now, a display system applicable to various types of vehicles will be described in addition to what has been described above.

For example, PTL 2 describes a mirror adjustment device including a back mirror attached to a vehicle and an image detection means. The image detection means may include a video camera for creating and recording images of the head of the driver. As viewed from above the vehicle, the back mirror is located diagonally in front of the driver. As viewed from above the vehicle, the image detection means is located in front of the driver.

In the mirror adjustment device described in PTL 1, the camera is mounted in a limited position depending on the type of the vehicle. It is thus difficult to apply the device in common to various types of vehicles.

It is an objective of Embodiment 2, which will be described below, to provide a display system that is applicable to various types of vehicles and displays images more properly.

As an example, the display system according to this embodiment includes a display, a half mirror, a first reflecting mirror, a case, and a camera. The display has a display surface that displays videos of the area behind the vehicle. The reflecting mirror reflects the rays emitted from the display. The first reflecting mirror reflects the rays reflected by the reflecting mirror. The case includes inside, the display, the reflecting mirror, and the first reflecting mirror. The camera is located in the case. The case includes an emitter that emits the rays reflected by the first reflecting mirror. In the display system, the rays emitted from the emitter enter the eyes of the observer to display the videos. The imaging direction of the camera is directed to the inside of the vehicle interior.

With this configuration, the display system according to this embodiment is advantageous in being applicable to various types of vehicles.

Note that FIGS. 11 to 32C, which will be described in the following embodiments, are conceptual diagrams, and the ratios of the sizes and thicknesses of the constituent elements are not necessarily drawn strictly to scale.

[Outline]

Figure 11:
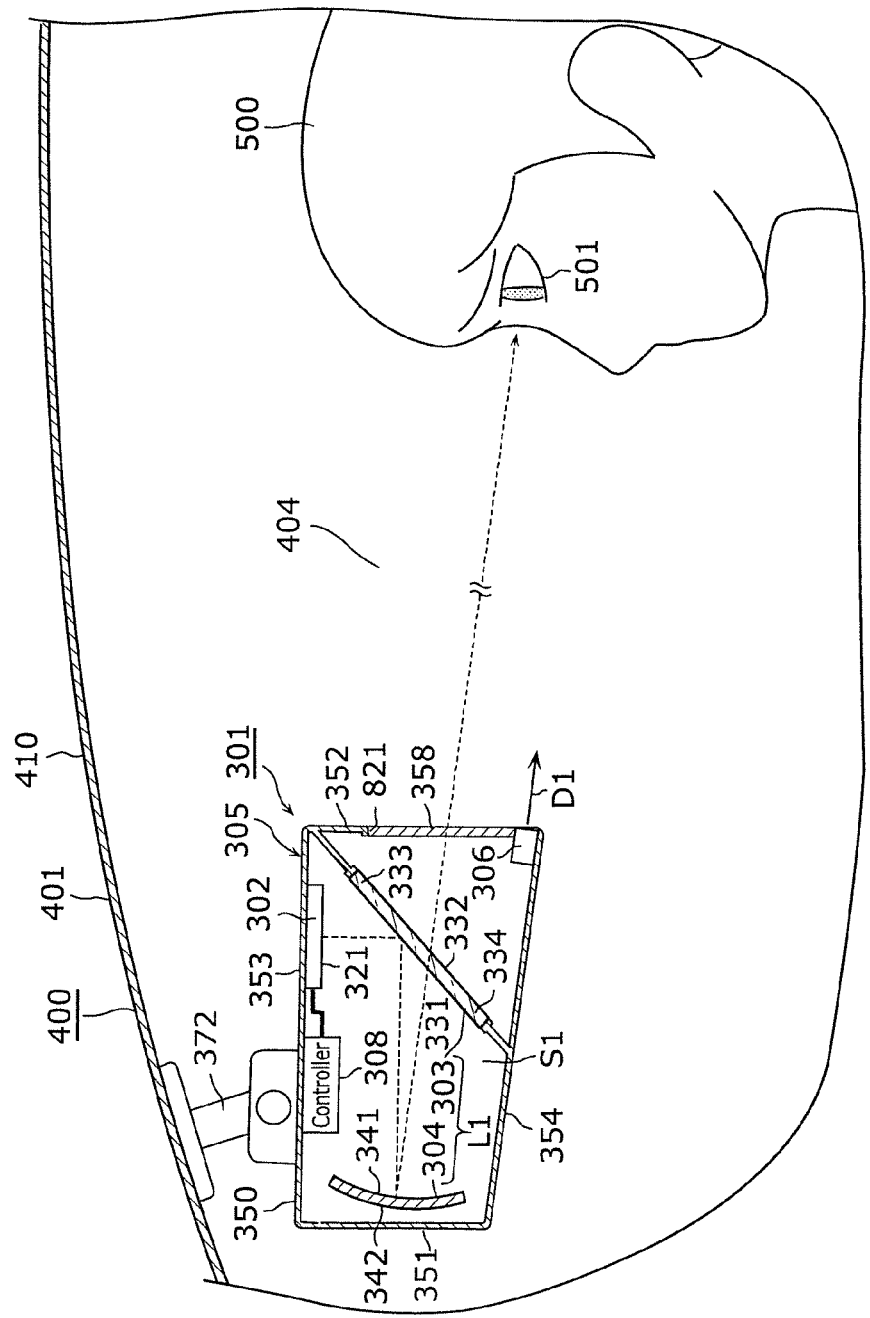
FIG. 11 is a schematic configuration diagram of a display system according to Embodiment 2.

As shown in FIG. 11, display system 301 according to Embodiment 2 is used for, for example, vehicle (e.g., motor vehicle) 400 as a moving object.

Display system 301 is mounted in the body of the moving object that is body (i.e., vehicle body) 410 of vehicle 400.

Display system 301 includes display 302, half mirror 303, first reflecting mirror 304 that is a concave mirror, and case 305.

Display 302 has display surface 321 that displays videos of the area behind vehicle 400. The videos are output from, for example, imager 309 (see FIG. 12) that images the area behind vehicle 400. Imager 309 is mounted in body 410 of vehicle 400. Note that display system 301 according to this embodiment and imager 309 (see FIG. 12) constitute electronic mirror system 310. The moving object includes electronic mirror system 310 and body 410 including electronic mirror system 310.

Half mirror 303 reflects the rays emitted from display 302. First reflecting mirror 304 reflects the rays reflected by half mirror 303. Case 305 includes inside, display 302, half mirror 303, and first reflecting mirror 304. Case 305 includes emitter 358 that emits the rays reflected by first reflecting mirror 304. In display system 301, once the videos of the area behind the vehicle are displayed on display surface 321, the videos reflected by half mirror 303 and first reflecting mirror 304 are emitted from emitter 358.

In display system 301, the rays emitted from emitter 358 enter the eyes of observer 500 to display the videos. Accordingly, observer 500 views the videos based on the rays emitted from display surface 321 of display 302. Observer 500 is the driver of vehicle 400, for example.

Display system 301 includes camera 306. Camera 306 is located in case 305. In display system 301, the imaging direction of camera 306 is directed to the inside of interior 404 of vehicle 400.

Display system 301 is located at the front of ceiling 401 of body 410 near windshield (i.e., front window) 402 so as to be visible to observer 500 who is seated on driver's seat 430 and viewing forward (see FIG. 11).

[Configuration]

As described above, display system 301 according to this embodiment includes display 302, half mirror 303, first reflecting mirror 304, case 305, and camera 306.

Figure 12:
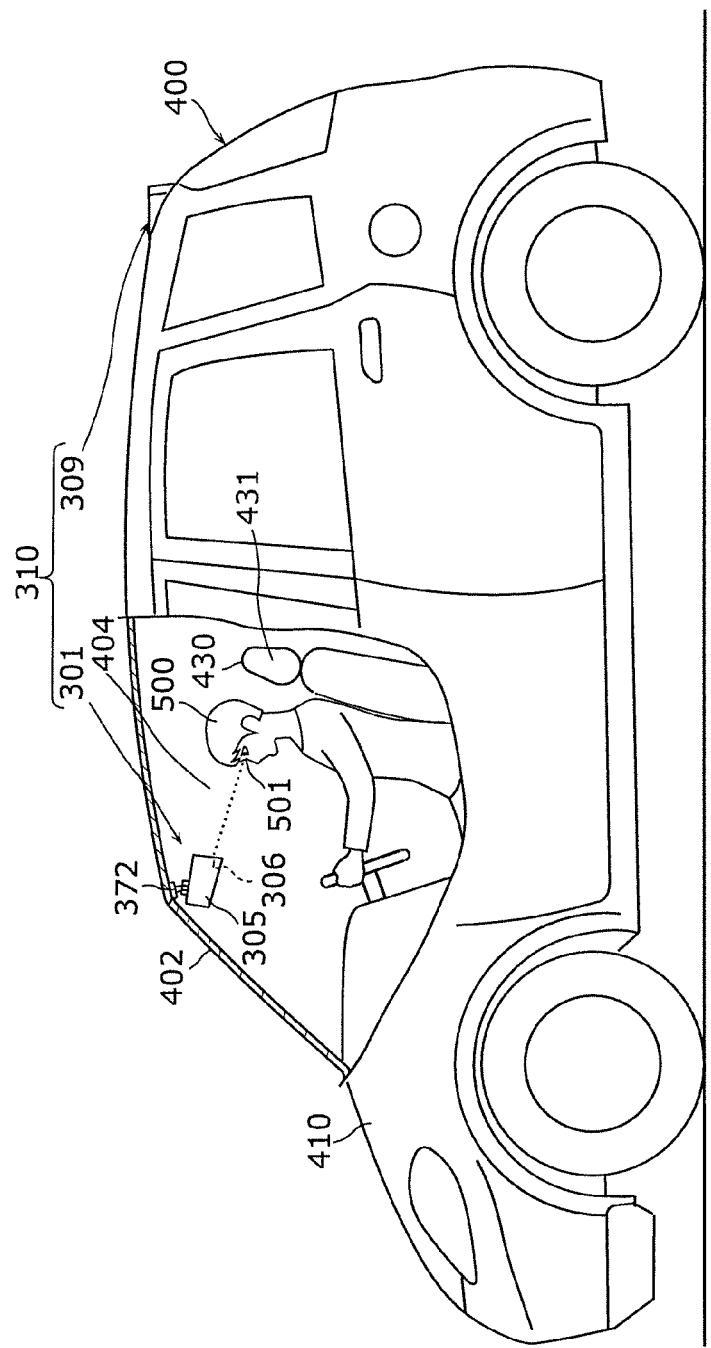
FIG. 12 is a schematic illustration of a moving object including the display system according to Embodiment 2.
Figure 13:
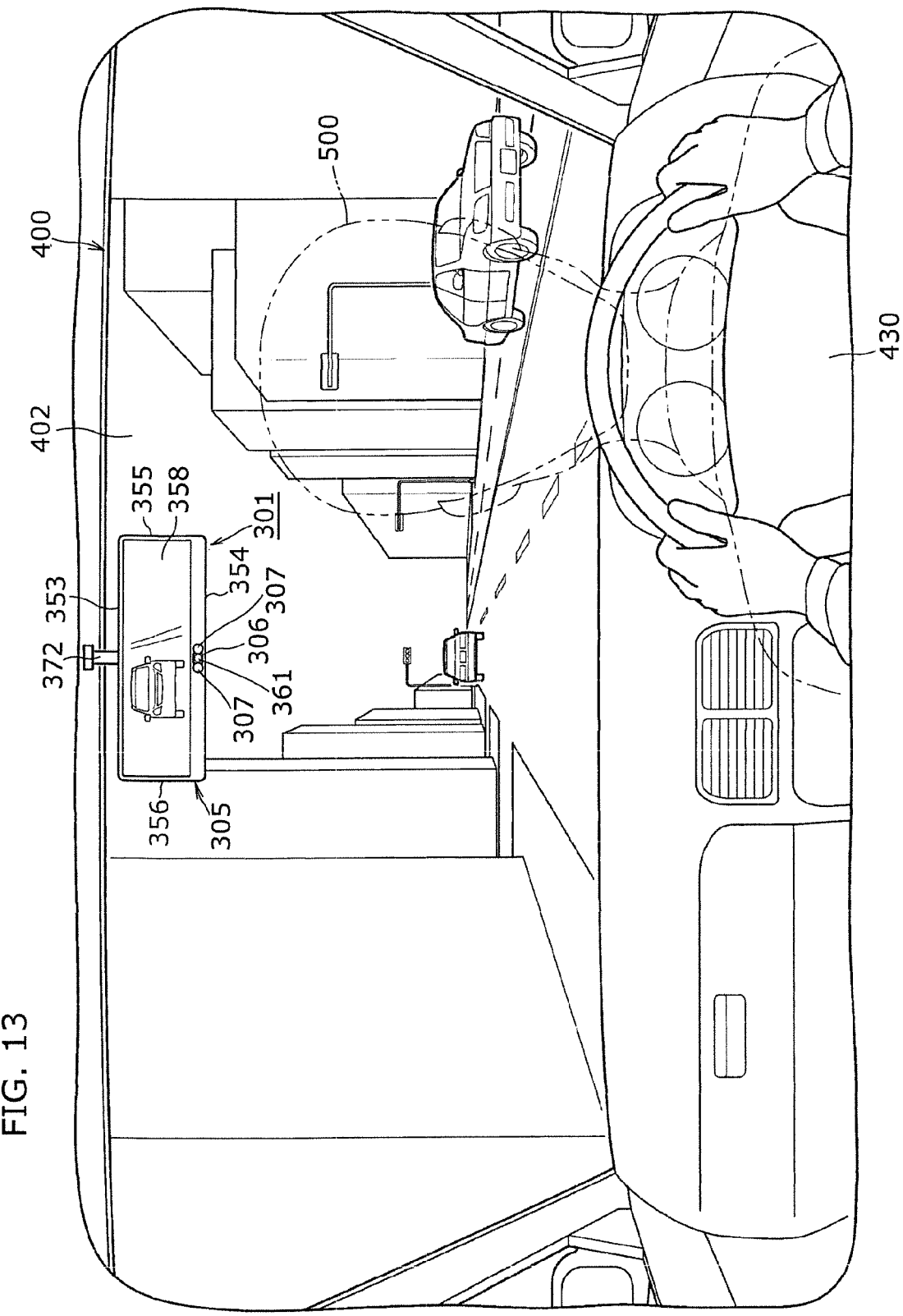
FIG. 13 illustrates conditions of use of the display system according to Embodiment 2.

Display 302 is housed in case 305. Display 302 is located in an upper region of inner space S1 of case 305. Display 302 is housed in case 305 with display surface 321 facing downward. Display 302 outputs rays that form video images. Display 302 includes a light source device and a liquid crystal display (LCD) panel, for example. The LCD panel is located in front of the light source device. The light source device is used as the backlight of the LCD panel. The light source device is what is called a "surface light source". The light source device is a side light source device using a solid-state light-emitter such as a light-emitting diode or a laser diode. The rays from the light source device are transmitted by the LCD panel and emitted from display surface 321 of display 302. The rays emitted from display surface 321 of display 302 form the images. The rays output from display surface 321 reflect the images displayed on the LCD panel. In FIGS. 11 and 12, the course of the rays output from a point (i.e., a certain pixel point) of an image to be displayed on display surface 321 of display 302 are schematically represented by the dotted lines.

Display system 301 according to this embodiment includes half mirror 303 and first reflecting mirror 304 as the reflecting members that reflect the rays emitted from display surface 321 of display 302. That is, display system 1 has the optical system including half mirror 303 and first reflecting mirror 304.

Half mirror 303 functions to transmit a part of incident light and reflect the other part of the incident light. Half mirror 303 is a beam splitter in the shape of a flat plate with a light-transmittance and a light-reflectivity of about 50%. Half mirror 303 reflects the rays emitted from display 302 toward first reflecting mirror 304, and transmits the rays reflected by first reflecting mirror 304. Half mirror 303 is located below display surface 321 of display 302. Half mirror 303 faces reflecting surface 341 of first reflecting mirror 304 and is spaced apart from first reflecting mirror 304. Half mirror 303 is inclined as follows with respect to the plane orthogonal to the direction in which first reflecting mirror 304 and half mirror 303 are aligned. In the direction in which first reflecting mirror 304 and half mirror 303 are aligned, the distance between first reflecting mirror 304 and upper end 333 of half mirror 303 is longer than that between first reflecting mirror 304 and lower end 334 of half mirror 303. Accordingly, in the longitudinal direction of vehicle 400, upper end 333 of half mirror 303 is located behind lower end 334 of half mirror 303.

Half mirror 303 has first surface 331 and second surface 332 that intersect the thickness direction. First surface 331 of half mirror 303 faces each of display surface 321 of display 302 and reflecting surface 341 of first reflecting mirror 304. The term "faces" here means that two surfaces face each other and are not necessarily parallel to each other. Being a plane in this embodiment, first surface 331 may be a curved surface such as a free-form surface. First surface 331 of half mirror 303 that is the free-form surface reduces distortion of the images formed on reflecting surface 341 of first reflecting mirror 304, reduces curves of the image planes, or improves the resolution.

First reflecting mirror 304 includes, for example, a concave mirror body containing glass, and a reflective film on the surface of the concave mirror body. The concave mirror body is made of a material including glass, for example. The reflective film may be made of metal highly reflective to visible light and includes aluminum, for example. Optical system L1 including half mirror 303 and first reflecting mirror 304 is placed as follows in inner space S1 of case 305. First reflecting mirror 304 is closer to the front, whereas half mirror 303 is closer to the rear. First reflecting mirror 304 is located in inner space S1 of case 305 with reflecting surface 341 facing rearward. In other words, first reflecting mirror 304 faces first surface 331 of half mirror 303 in inner space S1 of case 305.

In optical system L1 including half mirror 303 and first reflecting mirror 304, the rays emitted from display surface 321 of display 302 are reflected by first surface 331 of half mirror 303 toward first reflecting mirror 304. Reflecting surface 341 of first reflecting mirror 304 reflects the rays from half mirror 303 toward half mirror 303. Half mirror 303 transmits the rays from first reflecting mirror 304.

Case 305 includes emitter 358 that emits the light reflected by first reflecting mirror 304 and transmitted by half mirror 303. Emitter 358 transmits visible light. Accordingly, in display system 301, the rays emitted from emitter 358 enter eyes 501 of observer 500 so that observer 500 views an image based on an image displayed on display surface 321 of display 302. That is, observer 500 views an image reflected by half mirror 303 and first reflecting mirror 304 of optical system L1. In the viewing direction in which observer 500 views reflecting surface 341 of first reflecting mirror 304 through half mirror 303, the image is displayed by display 302 as if the image were in a position farther from reflecting surface 341 (e.g., three meters ahead from the viewpoint of observer 500). In short, display 302 displays a virtual image. It is thus advantageous in facilitating focus adjustment, when observer 500 views an image (i.e., a virtual image) displayed by display system 301 after viewing forward through windshield 402.

Case 305 includes body 350 and emitter 358. Body 350 has front wall 351, rear wall 352, upper wall 353, lower wall 354, first side wall (i.e., right wall as viewed from observer 500) 355 and second side wall (i.e., left wall as viewed from observer 500) 356. The case is in the shape of a box having opening (i.e., through-hole) 821 in rear wall 352, and inner space S1. Case 305 is made of a material including a resin. Opening 821 is in the rectangular shape with the transverse width larger than the vertical width. The ratio of the transverse width to the vertical width ranges from about 3:1 to about 6:1. Emitter 358 is in the shape of a flat plate with a rectangular outer periphery and covers opening 821 of rear wall 352. Being attached to body 410 of vehicle 400, case 305 has a size in the transverse direction of body 410 (i.e., along the vehicle width) larger than the sizes in the vertical and longitudinal directions.

Case 305 is attached to the front of ceiling 401 of body 410 near windshield 402 so as to be visible to observer 500 seated on a front seat such as driver's seat 430 (see FIG. 12). Case 305 is attached to ceiling 401 of body 410 via support member 372 and hanging from ceiling 401. Case 305 is located here not to block the front view of observer 500. Support member 372 includes an adjustment mechanism (e.g., a ball joint) for adjusting the orientation of case 305. Note that case 305 is not necessarily attached to ceiling 401 but may be attached to windshield 402, for example.

In this embodiment, camera 306 is located in the vicinity of emitter 358. Camera 306 is located under rear wall 352 of case 305 at the center in the transverse direction. Imaging direction D1 of camera 306 is directed to the inside of interior 404 of vehicle 400. More specifically, imaging direction D1 of camera 306 corresponds to the optical axis of lens 361 of camera 306, for example. Camera 306 is an infrared camera used to image near-infrared light. The camera is not limited thereto and may be a camera useful for imaging both of near-infrared light and visible light.

In display system 301, imaging direction D1 of camera 306 is directed to the inside of interior 404 of vehicle 400. In display system 301, imaging direction D1 of camera 306 is directed to headrest 431 of driver's seat 430 in interior 404. Accordingly, eyes 501 of observer 500 who is the driver seated on driver's seat 430 can be imaged.

As shown in FIG. 11, assume that camera 306 is located under emitter 358. With this location, even if observer 500 wears a hat or cap, eyes 501 of observer 500 are less blocked by the brim.

In display system 301, the rays are emitted from emitter 358 in imaging direction D1 of camera 306 in one preferred embodiment. In display system 301 here, the direction in which the rays from emitter 358 are emitted is substantially parallel to imaging direction D1 of camera 306 in one preferred embodiment. The term "parallel" here may include not only the positional relationship "strictly parallel to each other" but also the positional relationship "substantially parallel to each other". The expression "substantially parallel to each other" may include the positional relationship where the direction in which the rays from emitter 358 are emitted and imaging direction D1 of camera 306 form an angle of 10 degrees or less.

Display system 301 further includes two near-infrared light sources 307. Two near-infrared light sources 307 emit near-infrared light. Two near-infrared light sources 307 are far-infrared light-emitting diodes (LEDs). Each of two near-infrared light sources 307 is located at one end of camera 306 in the transverse direction of case 305. The optical axes of two near-infrared light sources 307 extend in imaging direction D1 of camera 306. The optical axes of two near-infrared light sources 307 are parallel to imaging direction D1 of camera 306 in one preferred embodiment. The term "parallel" here may include not only the positional relationship "strictly parallel to each other" but also the positional relationship "substantially parallel to each other". The expression "substantially parallel to each other" may include the positional relationship where the optical axes of near-infrared light sources 307 and imaging direction D1 of camera 306 form angles of 10 degrees or less.

Display system 301 further includes controller 308. Controller 308 is electrically connected to display 302 and camera 306. Controller 308 is also connected to two near-infrared light sources 307. Controller 308 controls the conditions of display 302 displaying images. Controller 308 establishes communications (e.g., wired communications or wireless communications) with imager 309 via an in-vehicle network of vehicle 400, for example. Controller 308 receives, from the imager, image data indicating the images of the area behind vehicle 400. Controller 308 causes display 302 to display the images based on the captured images received from imager 309. The "images based on the captured images" may be here captured images themselves, the images obtained by processing the captured images or computer graphics (CG) images created based on the captured images. For example, since the images captured by imager 309 are dark in the night, the brightness of the images captured by imager 309 may be corrected. Alternatively, CG images or makers, for example, indicating obstacles in images may be created based on the images captured by imager 309. Display surface 321 of display 302 may display images obtained by superimposing the CG images or makers, for example, on the images captured by imager 309. Alternatively, display 302 may display images obtained by superimposing makers indicating driving assistance information (e.g., vehicle speed information, navigation information, pedestrian information, preceding vehicle information, lane departure information, and vehicle condition information) on the images captured by imager 309.

Controller 308 includes a computer system. The computer system includes, as main components, a processor and a memory being hardware. In the computer system, the processor executes programs stored in the memory to fulfill the functions of controller 308. The programs may be stored in advance in the memory of the computer system and provided through telecommunications lines. Alternatively, the programs may be stored in a non-transitory recording medium, such as a memory card, an optical disk, or a hard disk drive, readable by the computer system so as to be provided. The processor of the computer system includes one or more electronic circuits such as semiconductor integrated circuits (ICs) or large-scale integrated (LSI) circuits. The integrated circuits such as ICs or LSI circuits are here referred to depending on the degree of integration and may include integrated circuits such as system LSI circuits, very large scale integrated (VLSI) circuits or ultra large scale integrated (ULSI) circuits. In addition, a field programmable gate array (FPGA) programmed after the manufacture of an LSI circuit or a logic device capable of reconfiguring the connections or circuit divisions inside an LSI may be employed as the processor. The plurality of electronic circuits may be integrated into a single chip or distributed into a plurality of chips. The plurality of chips may be integrated into a single device or may be distributed into a plurality of devices. The computer system includes here a microcontroller including one or more processors and one or more memories. The microcontroller also includes one or more electronic circuits such as semiconductor integrated circuits or large-scale integrated circuits.

Imager 309 is a complementary metal-oxide semiconductor (CMOS) image sensor that is attached to the rear of vehicle 400, for example, and images the area behind vehicle 400. Imager 309 is not limited to the CMOS image sensor and may be an image sensor such as a charge-coupled device (CCD) image sensor.

Imager 309 outputs image data on the imaged area behind vehicle 400 via, for example, an in-vehicle network to controller 308. Imager 309 is located for example, at the rear of vehicle 400 at the center in the transverse direction and images the range visible by a typical room mirror. Electronic mirror system 310 serves as a rearview mirror such as a typical room mirror. Since imager 309 is attached to the rear of vehicle 400, the images captured by imager 309 include no rear seat or no pillar, for example. Note that the area behind vehicle 400 may include both sides behind vehicle 400 and that imager 309 may image the area on both the sides behind vehicle 400. Imager 309 may capture the range visible by a typical door or fender mirror. Electronic mirror system 310 may serve as a rearview mirror in place of the typical door or fender mirror. Imager 309 is attached to the upper rear of body 410, the attachment position of imager 309 is a mere example. Imager 309 may be attached in a position in which a desired range is imageable.

In display system 301 according to this embodiment, the images displayed by display 302, that is, the rays output from display surface 321 of display 302 are reflected once by each of half mirror 303 and first reflecting mirror 304. That is, in display system 301, the rays output from display surface 321 of display 302 are reflected twice by optical system L1. The distance (i.e., the visual range) from observer 500 to the display position of an image viewed by observer 500 is here determined by the optical path length from display surface 321 of display 302 to reflecting surface 341 of first reflecting mirror 304, the focal length of optical system L1, or any other factor. In this embodiment, the rays emitted from display surface 321 of display 302 are reflected twice. The size of case 305 (i.e., inner space S1) can thus be reduced, while maintaining the visual range to the display position of the image at a desired distance. Accordingly, in the direction in which observer 500 views reflecting surface 341 through half mirror 303, case 305 can be miniaturized.

[Operation]

Operations of display system 301 according to this embodiment and electronic mirror system 310 including display system 301 will be described below.

For example, once electric power is supplied from the battery of vehicle 400 to electronic mirror system 310 and a control signal causing the start of operation is input from an electronic control unit (ECU) included in vehicle 400 to electronic mirror system 310, electronic mirror system 310 starts operating.

For example, once the control signal causing the start of operation is input from the ECU of vehicle 400 to controller 308, controller 308 causes imager 309 to image the area behind vehicle 400 at a predetermined frame rate and obtains, from imager 309, image data on the captured image.

Once the image data on the captured image is input from imager 309, controller 308 creates an image based on the captured image and causes display surface 321 of display 302 to display the image.

Once an image is displayed on display surface 321 of display 302, the rays forming this image are emitted toward first surface 331 of half mirror 303. First surface 331 of half mirror 303 reflects the rays from display 302 toward first reflecting mirror 304. First reflecting mirror 304 reflects the rays forming the image obtained by magnifying the image of display surface 321 toward first surface 331 of half mirror 303. Once the rays reflected by reflecting surface 341 of first reflecting mirror 304 are incident on first surface 331 of half mirror 303, a part of the rays is transmitted by half mirror 303 and emitted outside from emitter 358 of case 305. Observer 500 views the image magnified by reflecting surface 341. Accordingly, observer 500 views the image magnified by reflecting surface 341 via half mirror 303 to check the area behind vehicle 400.

Once the control signal described above is input, controller 308 causes camera 306 to image the face of observer 500 in imaging direction D1 at a predetermined frame rate and obtains, from camera 306, image data on the captured image. Camera 306 images here the face, including eyes 501, for example, of observer 500. If imaging direction D1 of camera 306 is directed toward headrest 431 of driver's seat 430, camera 306 serves as a driver monitoring camera that monitors the driver as observer 500.

Controller 308 may function to detect the positions of eyes 501 of observer 500 based on the images captured by from camera 306 and detect distracted driving, dozing, or any other risky behavior of observer 500. Additionally or alternatively, controller 308 may function to detect the posture of observer 500 based on the images captured by from camera 306. Additionally or alternatively, controller 308 may detect at least one value or the amount of change of the position of the face, viewpoint, and viewing direction of observer 500 based on the images of observer 500 captured by camera 306. Based on the detected value or amount of change, at least one of the position and size of the video to be displayed by display surface 321 of display 302 may be changed. That is, controller 308 controls display 302 to shift, magnify, or reduce the video to be displayed by display surface 321 of display 302. Accordingly, the field of view can be largely shifted by slightly moving the face position or the viewpoint vertically or transversely, or magnified or reduced by slightly moving the face position or the viewpoint longitudinally. The field of view can also be shifted by moving the viewing direction to an end of the field of view, without changing the viewpoint or the face position.

Controller 308 detects the viewpoint of observer 500 based on the images of observer 500 captured by camera 306. If the viewpoint is determined to fall out of a fixed eye-box, the controller may issue an alert signal. The "eye-box" here corresponds to the range in which the images are without lack visible to observer 500. More specifically, the "eye-box" corresponds to the range of the viewpoint in which the whole field of view of observer 500 includes a part of the virtual image.

Display system 301 may include support member 372 having the adjustment mechanism described above, as a drive unit that drives case 305 to change the direction in which the rays from emitter 358 are emitted. In this case, controller 308 is electrically connected to display 302, camera 306, and the drive unit. Controller 308 detects the viewpoint of observer 500 based on the images of observer 500 captured by camera 306 and controls the drive unit so as to drive case 305 based on the viewpoint. Accordingly, display system 301 causes the rays emitted from emitter 358 of case 305 to follow the viewing direction of observer 500.

[Advantages]

In display system 301 according to Embodiment 2, the rays emitted from emitter 358 enter eyes 501 of observer 500 to display videos. In display system 301, camera 306 is located in case 305 that includes inside, display 302, half mirror 303, and first reflecting mirror 304. Imaging direction D1 of camera 306 is directed to the inside of interior 404 of vehicle 400. There is thus no need in vehicle 400 to secure the attachment position and attachment structure for mounting camera 306 in vehicle 400. Accordingly, the system is applicable to various types of vehicles.

Facing the inside of interior 404, particularly observer 500, camera 306 has a smaller viewing angle and images observer 500 at a larger ratio to the captured image. Accordingly, even camera 306 has a relatively small number of pixels, the viewpoint or line of sight of observer 500 can be detected accurately. On the other hand, if camera 306 has a relatively large number of pixels (e.g., where the camera has the same or similar number of pixels as the video camera described in PTL 1), the resolution is improved by narrowing the viewing angle. As a result, the viewpoint or line of sight of observer 500 can be detected at a higher accuracy than in the typical camera.

Embodiment 2 described above is only one of various embodiments of the present disclosure. Various modifications may be made to Embodiment 2 depending on the designs, for example, as long as achieving the objective of being applicable to various types of vehicles and displaying images more properly.

[Variation 1]

Figure 14:
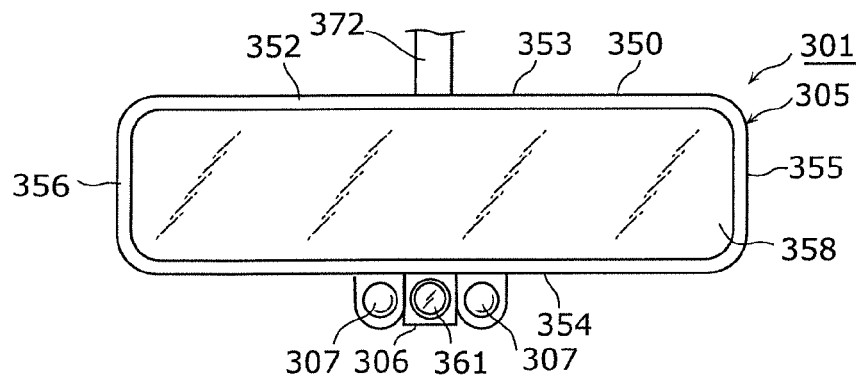
FIG. 14 is a front view of a display system according to Example 1 of Variation 1 of Embodiment 2.

Now, display system 301 according to Example 1 of Variation 1 of Embodiment 2 will be described with reference to FIG. 14.

In display system 301 according to Example 1 of Variation 1 of Embodiment 2, camera 306 and two near-infrared light sources 307 are located on the lower surface of lower wall 354 of case 305, at the center in the transverse direction. In this respect, the display system is different from display system 301 according to Embodiment 2. In display system 301 according to Example 1 of Variation 1 of Embodiment 2, the same reference characters as those in display system 301 according to Embodiment 2 are used to represent equivalent elements, and the detailed explanation thereof will be omitted.

In display system 301 according to Example 1 of Variation 1 of Embodiment 2, camera 306 and two near-infrared light sources 307 protrude downward from case 305. There is thus no need to increase the size of case 305 itself. In addition, camera 306 and two near-infrared light sources 307 are located under case 305. For example, even if observer 500 wears a hat or a cap, the hat or the cap less hinders the imaging of eyes 501 of observer 500 by camera 306 and the projection of the near-infrared light on eyes 501 of observer 500 by near-infrared light sources 307.

Figure 15:
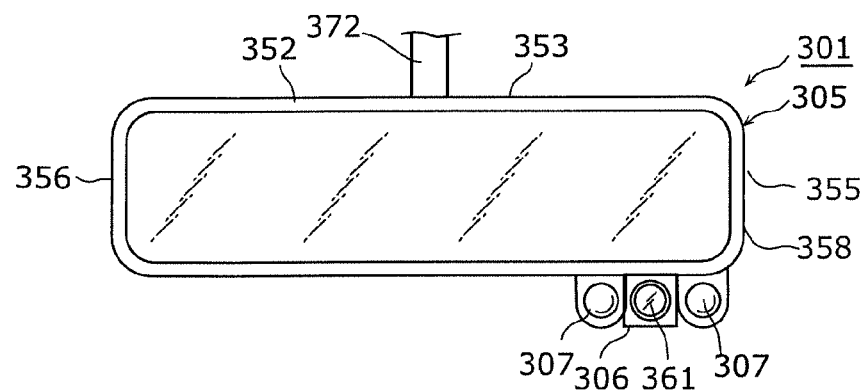
FIG. 15 is a front view of a display system according to Example 2 of Variation 1 of Embodiment 2.

Now, display system 301 according to Example 2 of Variation 1 of Embodiment 2 will be described with reference to FIG. 15. In display system 301 according to Example 2 of Variation 1 of Embodiment 2, camera 306 and two near-infrared light sources 307 are located on the lower surface of lower wall 354 of case 305, at the right end in the transverse direction. In this respect, the display system is different from display system 301 according to Embodiment 2. In display system 301 according to Example 2 of Variation 1 of Embodiment 2, the same reference characters as those in display system 301 according to Embodiment 2 are used to represent equivalent elements, and the detailed explanation thereof will be omitted.

In display system 301 according to Example 2 of Variation 1 of Embodiment 2, camera 306 and two near-infrared light sources 307 protrude downward from case 305. This configuration increases the size of emitter 358 visible from observer 500 in case 305 without increasing the size of case 305.

Unlike in display system 301 according to Example 1 of Variation 1 of Embodiment 2, in display system 301 according to Example 2 of Variation 1 of Embodiment 2, camera 306 and two near-infrared light sources 307 are located closer to the face of observer 500 who is the driver of right-hand drive vehicle 400. This configuration is thus advantageous in imaging eyes 501 of observer 500 and projecting the near-infrared light on eyes 501 of observer 500 using near-infrared light sources 307. If the system is applied to a left-hand drive vehicle, camera 306 and two near-infrared light sources 307 may be located on the lower surface of lower wall 354 of case 305, at the left end in the transverse direction in one preferred embodiment.

Figure 16:
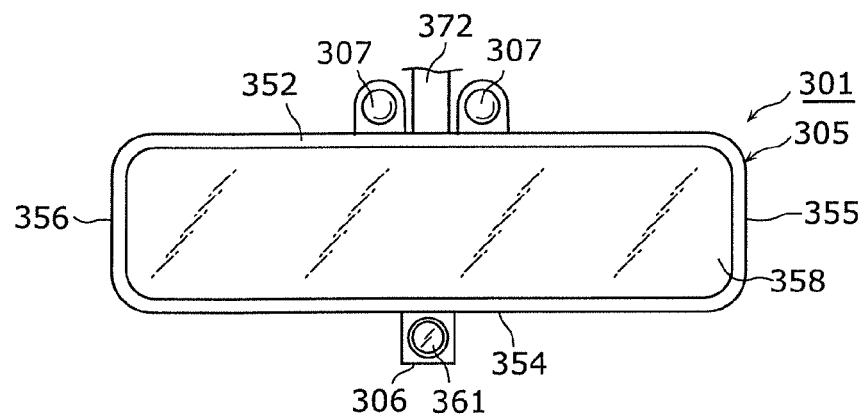
FIG. 16 is a front view of a display system according to Example 3 of Variation 1 of Embodiment 2.

Now, display system 301 according to Example 3 of Variation 1 of Embodiment 2 will be described with reference to FIG. 16.

In display system 301 according to Example 3 of Variation 1 of Embodiment 2, camera 306 is located on the lower surface of lower wall 354 of case 305, at the center in the transverse direction. Two near-infrared light sources 307 are located on the upper surface of upper wall 353 of case 305, at the center in the transverse direction. In these respects, the display system is different from display system 301 according to Embodiment 2. In display system 301 according to Example 3 of Variation 1 of Embodiment 2, the same reference characters as those in display system 301 according to Embodiment 2 are used to represent equivalent elements, and the detailed explanation thereof will be omitted.

Two near-infrared light sources 307 are spaced apart from each other in the transverse direction of case 305.

Like in display system 301 according to Example 1 of Variation 1 of Embodiment 2, in display system 301 according to Example 3 of Variation 1 of Embodiment 2, the front view of observer 500 is less blocked than in the case where two near-infrared light sources 307 protrude downward from lower wall 354 of case 305.

Figure 17:
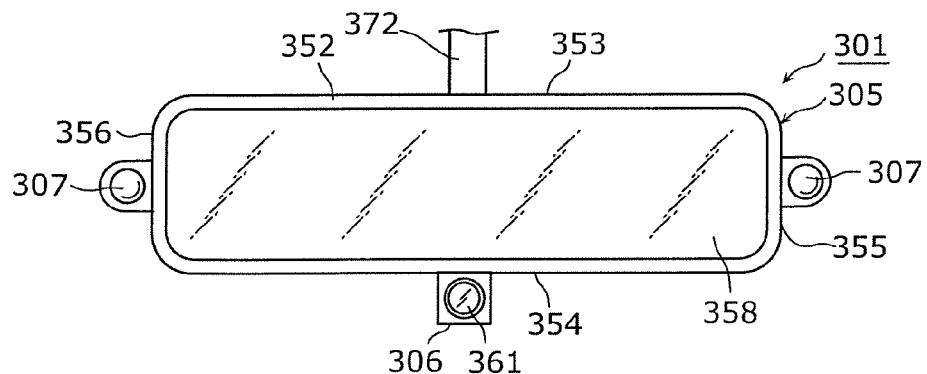
FIG. 17 is a front view of a display system according to Example 4 of Variation 1 of Embodiment 2.

Now, display system 301 according to Example 4 of Variation 1 of Embodiment 2 will be described with reference to FIG. 17.

In display system 301 according to Example 4 of Variation 1 of Embodiment 2, camera 306 is located on the lower surface of lower wall 354 of case 305, at the center in the transverse direction. Two near-infrared light sources 307 are separately arranged on first side wall 355 and second side wall 356 of case 305. In these respects, the display system is different from display system 301 according to Embodiment 2. In display system 301 according to Example 4 of Variation 1 of Embodiment 2, the same reference characters as those in display system 301 according to Embodiment 2 are used to represent equivalent elements, and the detailed explanation thereof will be omitted.

Like in display system 301 according to Example 1 of Variation 1 of Embodiment 2, in display system 301 according to Example 4 of Variation 1 of Embodiment 2, the front view of observer 500 is less blocked than in the case where two near-infrared light sources 307 protrude downward from lower wall 354 of case 305.

Figure 18:
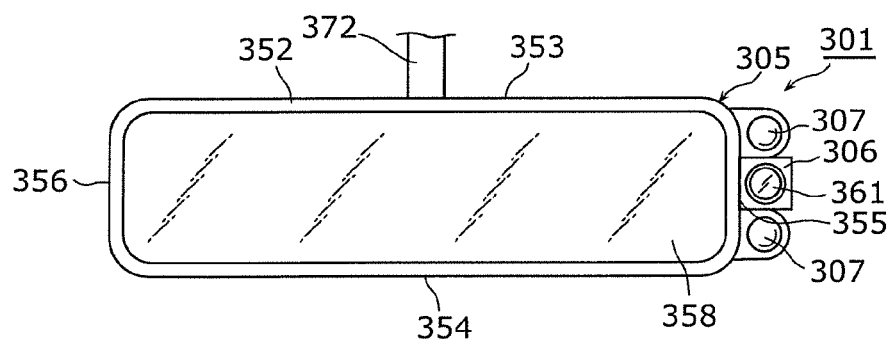
FIG. 18 is a front view of a display system according to Example 5 of Variation 1 of Embodiment 2.

Now, display system 301 according to Example 5 of Variation 1 of Embodiment 2 will be described with reference to FIG. 18.

In display system 301 according to Example 5 of Variation 1 of Embodiment 2, camera 306 and two near-infrared light sources 307 are located on first side wall 355 of case 305. In this respect, the display system is different from display system 301 according to Embodiment 2. In display system 301 according to Example 5 of Variation 1 of Embodiment 2, the same reference characters as those in display system 301 according to Embodiment 2 are used to represent equivalent elements, and the detailed explanation thereof will be omitted.

In display system 301 according to Example 5 of Variation 1 of Embodiment 2, camera 306 and two near-infrared light sources 307 protrude to the right from case 305. There is thus no need to increase the size of case 305 itself.

Unlike in display system 301 according to Example 1 of Variation 1 of Embodiment 2, in display system 301 according to Example 5 of Variation 1 of Embodiment 2, camera 306 and two near-infrared light sources 307 are located closer to the face of observer 500 who is the driver of right-hand drive vehicle 400. This configuration is thus advantageous in imaging eyes 501 of observer 500 and projecting the near-infrared light onto eyes 501 of observer 500 using near-infrared light sources 307. If the system is applied to a left-hand drive vehicle, camera 306 and two near-infrared light sources 307 may be located on second side wall 356 of case 305 in one preferred embodiment.

In Embodiment 2 and Variation 1 of Embodiment 2, camera 306 and near-infrared light sources 307 protrude from case 305. If there is a dead space on the periphery of case 305, camera 306 and near-infrared light sources 307 may be located in the dead space of case 305 and may not protrude. This configuration reduces the presence of camera 306 and near-infrared light sources 307.

[Variation 2]

Figure 19:
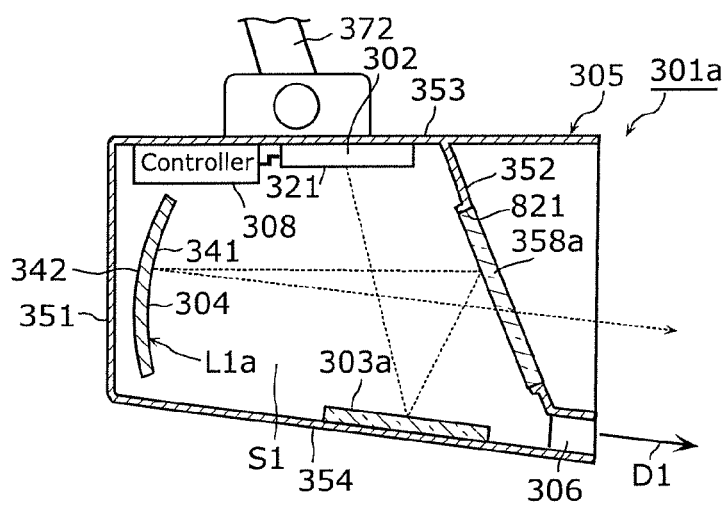
FIG. 19 is a schematic configuration diagram of a display system according to Variation 2 of Embodiment 2.

Now, display system 301a according to Variation 2 of Embodiment 2 will be described with reference to FIG. 19.

In display system 301a according to Variation 2 of Embodiment 2, optical system L1a includes emitter 358a in addition to reflecting mirror 303a and first reflecting mirror 304. The rays from display surface 321 of display 302 are reflected three times by optical system L1a and emitted from emitter 358a. In this respect, the display system is different from display system 301 according to Embodiment 2. In display system 301a according to Variation 2 of Embodiment 2, the same reference characters as those in display system 301 according to Embodiment 2 are used to represent equivalent elements, and the detailed explanation thereof will be omitted.

Display system 301a includes reflecting mirror 303a in place of half mirror 303 of display system 301, and emitter 358a that is a half mirror in place of emitter 358 of display system 301. Emitter 358a functions to transmit a part of incident light and reflect the other part of the incident light. Emitter 358a is a beam splitter in the shape of a flat plate with a light-transmittance and a light-reflectivity of about 50%.

In display system 301a, reflecting mirror 303a is located in inner space S1 of case 305, on lower wall 354 of case 305. Reflecting mirror 303a is here located diagonally below display surface 321 of display 302. Reflecting mirror 303a reflects the rays from display 302 toward emitter 358a.

Emitter 358a reflects, toward first reflecting mirror 304, the rays emitted from display 302 and reflected by reflecting mirror 303a, and transmits the rays reflected by first reflecting mirror 304. Emitter 358a faces reflecting surface 341 of first reflecting mirror 304 and is spaced apart from first reflecting mirror 304. Emitter 358a is inclined as follows with respect to the plane orthogonal to the direction in which first reflecting mirror 304 and emitter 358a are aligned. In the direction in which first reflecting mirror 304 and emitter 358a are aligned, the distance between first reflecting mirror 304 and the upper end of emitter 358a is shorter than that between first reflecting mirror 304 and the lower end of emitter 358a. Accordingly, in the longitudinal direction of vehicle 400 (see FIG. 11), the upper end of emitter 358a is located in front of the lower end of emitter 358a. Like in display system 301 according to Embodiment 2, in display system 301a according to Variation 2 of Embodiment 2, the rays are emitted from emitter 358 in imaging direction D1 of camera 306.

As compared to display system 301 according to Embodiment 2, display system 301a according to Variation 2 of Embodiment 2 has a long optical path length and thus provides a long distance from eyes 501 of observer 500 to the point at which a virtual image is projected.

In display system 301a according to Variation 2 of Embodiment 2, camera 306 and two near-infrared light sources 307 are located in case 305 in the same positions as in display system 301 according to Embodiment 2. The configuration is not limited thereto. The camera and the near-infrared light sources may be in the same positions as in any of Examples 1 to 5 of Variation 1 of Embodiment 2.

[Variation 3]

Figure 20:
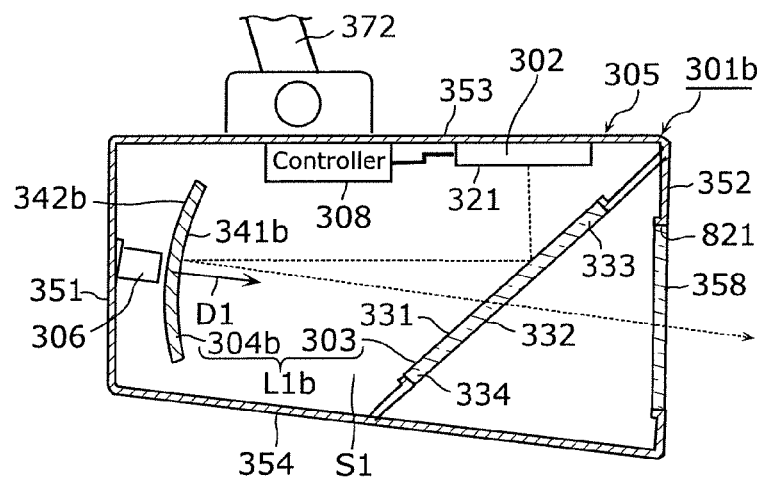
FIG. 20 is a schematic configuration diagram of a display system according to Example 1 of Variation 3 of Embodiment 2.
Figure 21:
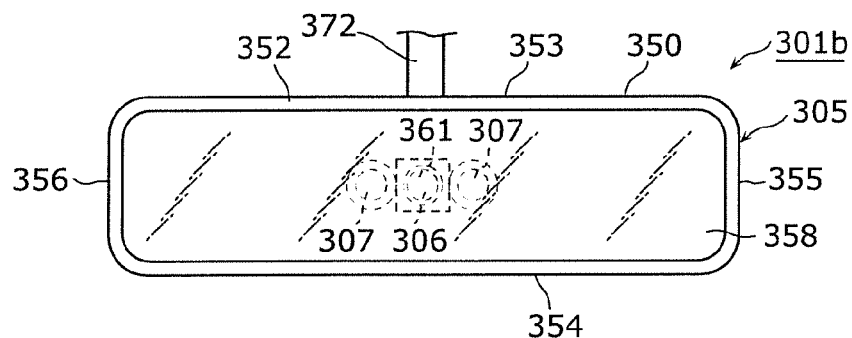
FIG. 21 is a front view of the display system according to Example 1 of Variation 3 of Embodiment 2.

Now, display system 301b according to Example 1 of Variation 3 of Embodiment 2 will be described with reference to FIGS. 20 and 21.

Display system 301b according to Example 1 of Variation 3 of Embodiment 2 includes first reflecting mirror 304b in place of first reflecting mirror 304 of display system 301 according to Embodiment 2. Camera 306 is an infrared camera built in case 305 in a position opposite to emitter 358 as viewed from first reflecting mirror 304b. In these respects, the display system is different from display system 301 according to Embodiment 2. In display system 301b according to Example 1 of Variation 3 of Embodiment 2, half mirror 303 and first reflecting mirror 304b constitute optical system L1b that reflects the rays from display surface 321 of display 302 twice. In display system 301b according to Example 1 of Variation 3 of Embodiment 2, the same reference characters as those in display system 301 according to Embodiment 2 are used to represent equivalent elements, and the detailed explanation thereof will be omitted.

First reflecting mirror 304b functions to transmit near-infrared light and reflect visible light. That is, first reflecting mirror 304b is a cold mirror. First reflecting mirror 304b has concave and convex surfaces, and includes a glass plate and a dielectric multilayer on the concave surface of the glass plate. The glass plate transmits near-infrared light. The dielectric multilayer reflects visible light and transmits near-infrared light. The surface of the dielectric multilayer serves as reflecting surface 341b of first reflecting mirror 304b, whereas the convex surface of the glass plate serves as surface 342b of first reflecting mirror 304b opposite to reflecting surface 341b.

In display system 301b according to Example 1 of Variation 3 of Embodiment 2; two near-infrared light sources 307 are located in the vicinity of camera 306. Two near-infrared light sources 307 are housed in inner space S1 of case 305. Each of two near-infrared light sources 307 is located at one end of camera 306 in the transverse direction of case 305.

In display system 301b according to Example 1 of Variation 3 of Embodiment 2, near-infrared light is emitted from two near-infrared light sources 307 in imaging direction D1 of camera 306. The near-infrared light emitted from two near-infrared light sources 307 is transmitted by first reflecting mirror 304 and emitter 358 and projected onto the face of observer 500 (see FIG. 11).

Like in display system 301 according to Embodiment 2, in display system 301b according to Example 1 of Variation 3 of Embodiment 2, the rays are emitted from emitter 358 in imaging direction D1 of camera 306. Camera 306 images the face of observer 500 (see FIG. 11) via emitter 358 and first reflecting mirror 304b. In display system 301b according to Example 1 of Variation 3 of Embodiment 2, camera 306 and two near-infrared light sources 307 are built in case 305 and located on surface 342b of first reflecting mirror 304b. Unlike Embodiment 2, there is no protrusion as viewed from observer 500 and the front view is not blocked.

The viewing direction of observer 500 agrees with the optical axis of camera 306. The viewpoint or line of sight of observer 500 can be detected at a higher accuracy than in the case as in Embodiment 2 where the direction fails to agree with the optical axis.

In Example 1 of Variation 3 of Embodiment 2, camera 306 and near-infrared light sources 307 are located behind first reflecting mirror 304b as viewed from observer 500. This configuration reduces the presence of these elements.

Figure 22:
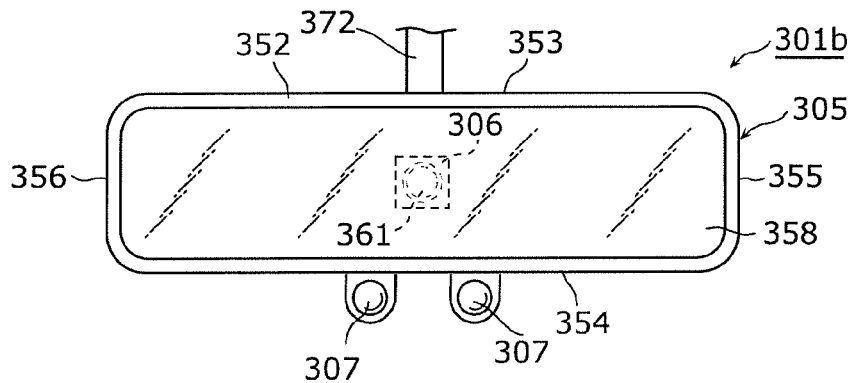
FIG. 22 is a front view of a display system according to Example 2 of Variation 3 of Embodiment 2.

Now, display system 301b according to Example 2 of Variation 3 of Embodiment 2 will be described with reference to FIG. 22.

In display system 301b according to Example 2 of Variation 3 of Embodiment 2, two near-infrared light sources 307 are located in the vicinity of emitter 358. In this respect, the display system is different from display system 301b according to Example 1 of Variation 3 of Embodiment 2. In display system 301b according to Example 2 of Variation 3 of Embodiment 2, the same reference characters as those in display system 301b according to Example 1 of Variation 3 of Embodiment 2 are used to represent equivalent elements, and the detailed explanation thereof will be omitted.

In display system 301b according to Example 2 of Variation 3 of Embodiment 2, two near-infrared light sources 307 are located on the lower surface of lower wall 354 of case 305, at the center in the transverse direction. Two near-infrared light sources 307 are spaced apart from each other in the transverse direction of case 305. Near-infrared light is emitted from two near-infrared light sources 307 in imaging direction D1 of camera 306.

In display system 301b according to Example 2 of Variation 3 of Embodiment 2, two near-infrared light sources 307 protrude downward from case 305. This configuration has the following advantages, as compared to the case where two near-infrared light sources 307 are built in case 305 like in display system 301b according to Example 1 of Variation 3 of Embodiment 2. A smaller amount of the near-infrared light is emitted from near-infrared light sources 307 and the temperature is less increased in case 305, for example.

Figure 23:
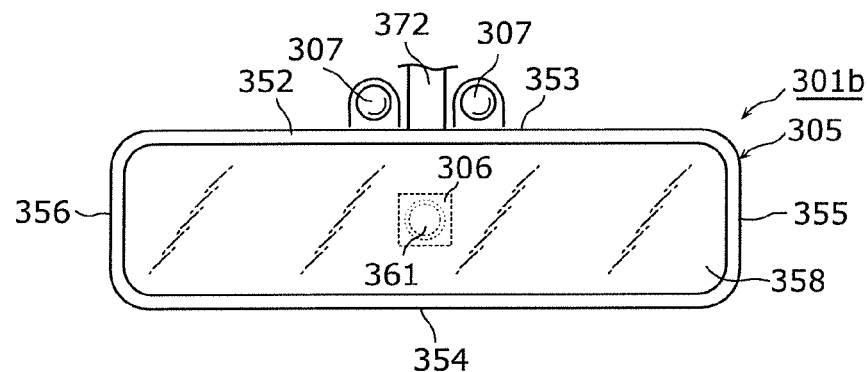
FIG. 23 is a front view of a display system according to Example 3 of Variation 3 of Embodiment 2.

Now, display system 301b according to Example 3 of Variation 3 of Embodiment 2 will be described with reference to FIG. 23.

In display system 301b according to Example 3 of Variation 3 of Embodiment 2, two near-infrared light sources 307 are located in the vicinity of emitter 358. In this respect, the display system is different from display system 301b according to Example 1 of Variation 3 of Embodiment 2. In display system 301b according to Example 3 of Variation 3 of Embodiment 2, the same reference characters as those in display system 301b according to Example 1 of Variation 3 of Embodiment 2 are used to represent equivalent elements, and the detailed explanation thereof will be omitted.

In display system 301b according to Example 3 of Variation 3 of Embodiment 2, two near-infrared light sources 307 are located on the upper surface of upper wall 353 of case 305 at the center in the transverse direction. Two near-infrared light sources 307 are spaced apart from each other in the transverse direction of case 305. The near-infrared light is emitted from two near-infrared light sources 307 in imaging direction D1 of camera 306.

In display system 301b according to Example 3 of Variation 3 of Embodiment 2, two near-infrared light sources 307 protrude upward from case 305. This configuration has the following advantages, as compared to the case where two near-infrared light sources 307 are built in case 305 like in display system 301b according to Example 1 of Variation 3 of Embodiment 2. A smaller amount of the near-infrared light is emitted from near-infrared light sources 307 and the temperature is less increased in case 305, for example. In display system 301b according to Example 3 of Variation 3 of Embodiment 2, since two near-infrared light sources 307 protrude upward from case 305, the view of observer 500 (see FIG. 11) is less blocked by two near-infrared light sources 307.

Figure 24:
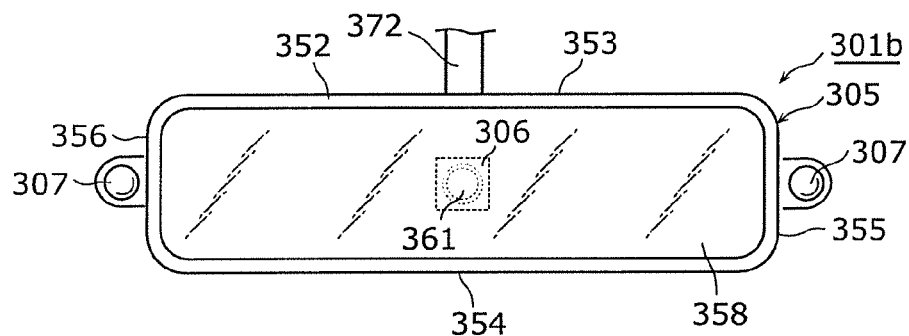
FIG. 24 is a front view of a display system according to Example 4 of Variation 3 of Embodiment 2.

Now, display system 301b according to Example 4 of Variation 3 of Embodiment 2 will be described with reference to FIG. 24.

In display system 301b according to Example 4 of Variation 3 of Embodiment 2, two near-infrared light sources 307 are located in the vicinity of emitter 358. In this respect, the display system is different from display system 301b according to Example 1 of Variation 3 of Embodiment 2. In display system 301b according to Example 4 of Variation 3 of Embodiment 2, the same reference characters as those in display system 301b according to Example 1 of Variation 3 of Embodiment 2 are used to represent equivalent elements, and the detailed explanation thereof will be omitted.

In display system 301b according to Example 4 of Variation 3 of Embodiment 2, two near-infrared light sources 307 are separately located on first side wall 355 and second side wall 356 of case 305. In this respect, the display system is different from display system 301b according to Example 1 of Variation 3 of Embodiment 2. In display system 301*b* according to Example 4 of Variation 3 of Embodiment 2, the same reference characters as those in display system 301*b* according to Example 1 of Variation 3 of Embodiment 2 are used to represent equivalent elements, and the detailed explanation thereof will be omitted.

The near-infrared light is emitted from two near-infrared light sources 307 in imaging direction D1 of camera 306.

In display system 301*b* according to Example 4 of Variation 3 of Embodiment 2, the front view of observer 500 is less blocked than in display system 301*b* according to Example 2 of Variation 3 of Embodiment 2 (see FIG. 22) where two near-infrared light sources 307 protrude downward from lower wall 354 of case 305.

Figure 25:
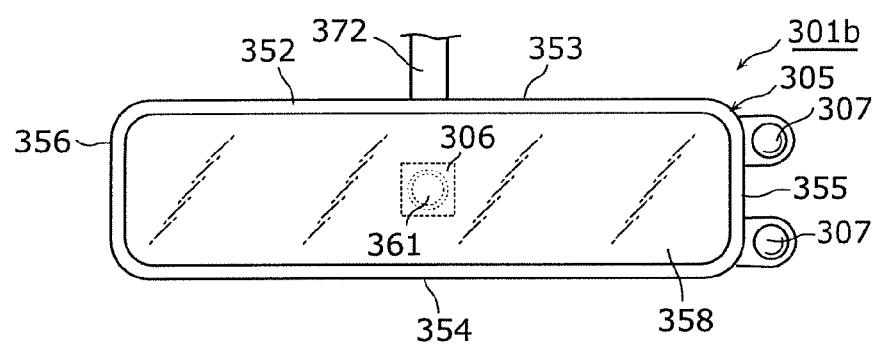
FIG. 25 is a front view of a display system according to Example 5 of Variation 3 of Embodiment 2.

Now, display system 301*b* according to Example 5 of Variation 3 of Embodiment 2 will be described with reference to FIG. 25.

In display system 301*b* according to Example 5 of Variation 3 of Embodiment 2, two near-infrared light sources 307 are located on first side wall 355 of case 305. In this respect, the display system is different from display system 301*b* according to Example 1 of Variation 3 of Embodiment 2. In display system 301*b* according to Example 5 of Variation 3 of Embodiment 2, the same reference characters as those in display system 301*b* according to Example 1 of Variation 3 of Embodiment 2 are used to represent equivalent elements, and the detailed explanation thereof will be omitted.

The near-infrared light is emitted from two near-infrared light sources 307 in imaging direction D1 of camera 306.

In display system 301*b* according to Example 5 of Variation 3 of Embodiment 2, two near-infrared light sources 307 protrude to the right from case 305. There is thus no need to increase the size of case 305 itself.

Unlike in display system 301*b* according to Example 2 of Variation 3 of Embodiment 2, in display system 301*b* according to Example 5 of Variation 3 of Embodiment 2, two near-infrared light sources 307 are located closer to the face of observer 500 (see FIG. 11) who is the driver of right-hand drive vehicle 400 (see FIG. 11).

This configuration is advantageous in projecting the near-infrared light on eyes 501 of observer 500 using near-infrared light sources 307. If the system is applied to a left-hand drive vehicle, two near-infrared light sources 307 may be located on second side wall 356 of case 305 in one preferred embodiment.

Variation 4

Figure 26:
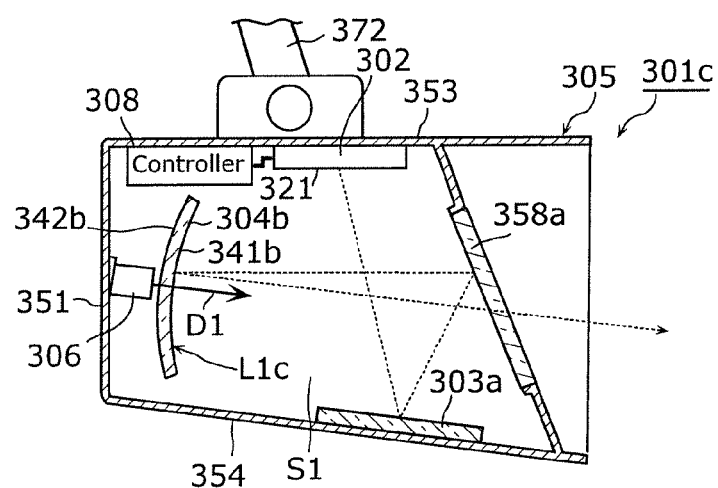
FIG. 26 is a schematic configuration diagram of a display system according to Variation 4 of Embodiment 2.

Now, display system 301*c* according to Variation 4 of Embodiment 2 will be described with reference to FIG. 26.

In display system 301*c* according to Variation 4 of Embodiment 2, optical system L1*c* includes emitter 358*a* in addition to half mirror 303*a* and first reflecting mirror 304*b*. The rays from display surface 321 of display 302 are reflected three times by optical system L1*c* and emitted from emitter 358*a*. In this respect, the display system is different from display system 301*b* according to Example 1 of Variation 3 of Embodiment 2. In display system 301*c* according to Variation 4 of Embodiment 2, the same reference characters as those in display system 301*b* according to Example 1 of Variation 3 of Embodiment 2 are used to represent equivalent elements, and the detailed explanation thereof will be omitted.

Display system 301*c* includes reflecting mirror 303*a* in place of half mirror 303 of display system 301*b*, and emitter 358*a* that is a half mirror in place of emitter 358 of display system 301*b*. Emitter 358*a* functions to transmit a part of incident light and reflect the other part of the incident light. Emitter 358*a* is a beam splitter in the shape of a flat plate with a light-transmittance and a light-reflectivity of about 50%.

In display system 301*c*, reflecting mirror 303*a* is located in inner space S1 of case 305, on lower wall 354 of case 305. Here, reflecting mirror 303*a* is located diagonally below display surface 321 of display 302. Reflecting mirror 303*a* reflects the rays from display 302 toward emitter 358*a*. Reflecting mirror 303*a* is a plane mirror that reflects visible light. The mirror is not limited thereto and may be a half mirror.

Emitter 358*a* reflects, toward first reflecting mirror 304*b*, the rays emitted from display 302 and reflected by reflecting mirror 303*a*, and transmits the rays reflected by first reflecting mirror 304*b*. Emitter 358*a* faces reflecting surface 341*b* of first reflecting mirror 304*b* and is spaced apart from first reflecting mirror 304*b*. Emitter 358*a* is inclined as follows with respect to the plane orthogonal to the direction in which first reflecting mirror 304*b* and emitter 358*a* are aligned. In the direction in which first reflecting mirror 304*b* and emitter 358*a* are aligned, the distance between first reflecting mirror 304*b* and the upper end of emitter 358*a* is shorter than that between first reflecting mirror 304*b* and the lower end of emitter 358*a*. In longitudinal direction of vehicle 400 (see FIG. 11), the lower end of emitter 358*a* is located in front of the upper end of emitter 358*a*. Like in display system 301 according to Embodiment 2, in display system 301*c* according to Variation 4 of Embodiment 2, the rays are emitted from emitter 358 in imaging direction D1 of camera 306.

As compared to display system 301*b* according to Example 1 of Variation 3 of Embodiment 2, display system 301*c* according to Variation 4 of Embodiment 2 has a long optical path length and thus provides a long distance from eyes 501 of observer 500 to the point at which a virtual image is projected.

Like in Example 1 of Variation 3 of Embodiment 2, the viewing direction of observer 500 agrees with the optical axis of camera 306. The viewpoint or line of sight of observer 500 can be detected at a higher accuracy than in the case as in Embodiment 2 where the direction fails to agree with the optical axis.

In display system 301*c* according to Variation 4 of Embodiment 2, camera 306 and two near-infrared light sources 307 are located in case 305 in the same positions as in display system 301*b* according to Example 1 of Variation 3 of Embodiment 2. The configuration is not limited thereto. The camera and the near-infrared light sources may be in the same positions as in any of Examples 1 to 5 of Variation 3 of Embodiment 2.

Variation 5

Figure 27A:
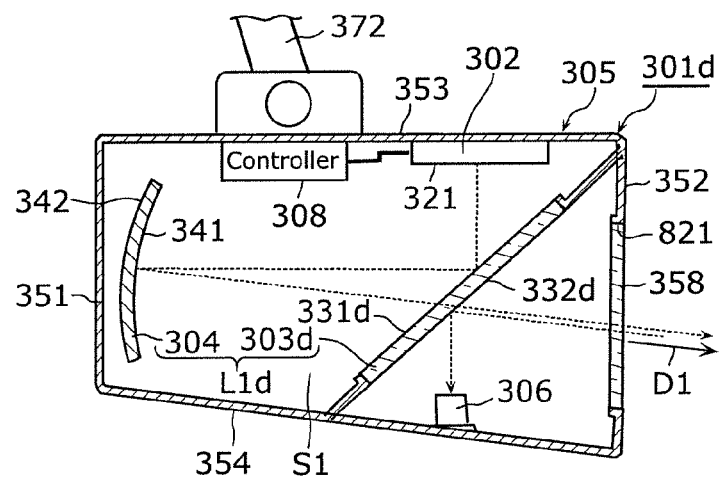
FIG. 27A is a schematic configuration diagram of a display system according to Example 1 of Variation 5 of Embodiment 2.

Now, display system 301*d* according to Variation 5 of Embodiment 2 will be described with reference to FIG. 27A.

Display system 301*d* according to Example 1 of Variation 5 of Embodiment 2 includes half mirror 303*d* in place of half mirror 303 of display system 301*b* according to Example 1 of Variation 3 of Embodiment 2. In this respect, the display system is different from display system 301*b* according to Example 1 of Variation 3 of Embodiment 2. In display system 301*d* according to Example 1 of Variation 5 of Embodiment 2, camera 306 is located opposite to display 302 as viewed from half mirror 303*d* in the direction in which display 302 and half mirror 303*d* are aligned. That is, in display system 301*d*, camera 306 is located below half mirror 303*d* and faces half mirror 303*d* in the vertical direction. The term "faces" here means that two surfaces face each other and are not necessarily parallel to each other. In display system 301*d* according to Example 1 of Variation 5 of Embodiment 2, the same reference characters as those in display system 301b according to Example 1 of Variation 3 of Embodiment 2 are used to represent equivalent elements, and the detailed explanation thereof will be omitted.

Half mirror 303d is in the shape of a flat plate having first surface 331 facing first reflecting mirror 304 and second surface 332d facing emitter 358. Half mirror 303d functions to transmit visible light incident on second surface 332d and reflect near-infrared light. That is, half mirror 303d has first and second principal surfaces, and includes a glass plate and a dielectric multilayer on the second principal surface of the glass plate. The glass plate transmits visible light. The dielectric multilayer reflects near-infrared light. The first principal surface of the glass plate servers as first surface 331d of half mirror 303d, whereas the surface of the dielectric multilayer servers as second surface 332d of half mirror 303d.

First surface 331d of half mirror 303d reflects the rays from display surface 321 of display 302 toward first reflecting mirror 304. Half mirror 303d transmits the rays reflected by reflecting surface 341 of first reflecting mirror 304 toward half mirror 303d. Second surface 332d of half mirror 303d reflects near-infrared light incident through emitter 358 downward. In FIG. 27A, the course of the near-infrared light incident through emitter 358 is schematically illustrated by the broken line.

In display system 301d according to Example 1 of Variation 5 of Embodiment 2, the rays are emitted from emitter 358 in imaging direction D1 of camera 306. In imaging direction D1 of camera 306 here, the camera images observer 500 (see FIG. 11) via half mirror 303d.

Like display system 301 according to Embodiment 2, in display system 301d according to Example 1 of Variation 5 of Embodiment 2, the rays emitted from emitter 358 enter eyes 501 of observer 500 (see FIG. 11) to display videos. In display system 301d, camera 306 is located in case 305 that includes inside, display 302, half mirror 303, and first reflecting mirror 304. Imaging direction D1 of camera 306 is directed to the inside of interior 404 of vehicle 400 (see FIG. 11). There is thus no need in vehicle 400 to secure the attachment position and attachment structure for mounting camera 306 in vehicle 400. Accordingly, the system is applicable to various types of vehicles.

Like in Example 1 of Variation 3 of Embodiment 2 and Variation 4 of Embodiment 2, the viewing direction of observer 500 agrees with the optical axis of camera 306. The viewpoint or line of sight of observer 500 can be detected at a higher accuracy than in the case as in Embodiment 2 where the direction fails to agree with the optical axis.

Figure 27B:
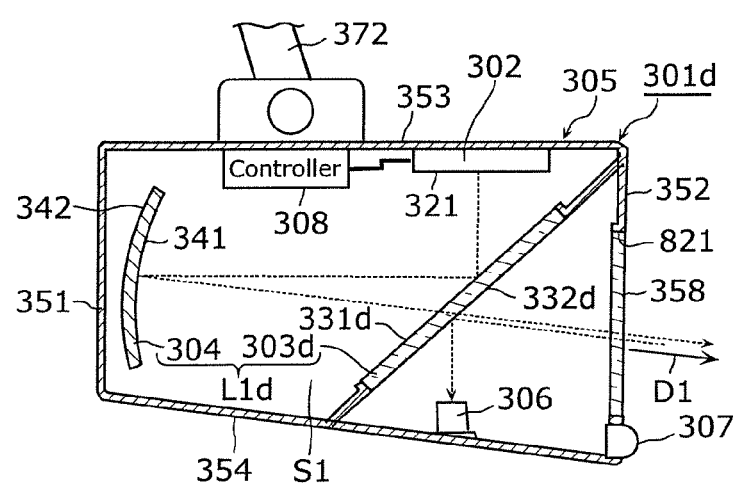
FIG. 27B is a schematic configuration diagram of a display system according to Example 2 of Variation 5 of Embodiment 2.

Now, display system 301d according to Example 2 of Variation 5 of Embodiment 2 will be described with reference to FIG. 27B.

In display system 301d according to Example 2 of Variation 5 of Embodiment 2, near-infrared light sources 307 are located in different positions from those in display system 301d according to Example 1 of Variation 5 of Embodiment 2. Like in display system 301d according to Example 1 of Variation 5 of Embodiment 2, in display system 301d according to Example 2 of Variation 5 of Embodiment 2, camera 306 is located close to emitter 358 of case 305 below half mirror 303d and faces half mirror 303d in the vertical direction. The term "faces" here means that two surfaces face each other and are not necessarily parallel to each other. In display system 301d according to Example 2 of Variation 5 of Embodiment 2, the same reference characters as those in display system 301d according to Example 1 of Variation 5 of Embodiment 2 are used to represent equivalent elements, and the detailed explanation thereof will be omitted.

In display system 301d according to Example 2 of Variation 5 of Embodiment 2, near-infrared light source 307 is located on rear wall 352 of case 305 and spaced apart from camera 306 in the longitudinal direction (i.e., the transverse direction of the paper). Near-infrared light source 307 emits near-infrared light toward the outside of case 305 in imaging direction D1 of the camera.

Both of camera 306 and near-infrared light source 307 are functional modules that generate heat during the operation. If located close to each other, these modules promote the heat generation and causes a heat damage, which may lead to malfunction of the modules. The heat affects the members, such as half mirror 303d and outputter 358, constituting the optical system and may cause distortion in the optical system and degradation of display system 301d.

In this example, as described above, camera 306 is spaced apart from near-infrared light source 307 in the longitudinal direction, which reduces such the heat damage. With this separation in the longitudinal direction, the direction in which the near-infrared light is emitted from near-infrared light sources 307 comes closer to imaging direction D1 of camera 306. That is, the modules are spaced apart from each other to reduce the heat damage and degradation of the imaging quality of camera 306 due to the separation.

Even the interchanged positions of near-infrared light source 307 and camera 306 provide similar advantages. Specifically, near-infrared light source 307 is located below half mirror 303d and faces half mirror 303d in the vertical direction. Camera 306 is placed on rear wall 352 of case 305 and images the outside of case 305. This configuration also reduces the heat damage and degradation of the imaging quality at the same time.

Variation 6

Now, display system 301e according to Variation 6 of Embodiment 2 will be described with reference to FIGS. 28 to 30. Display system 301e according to Variation 6 of Embodiment 2 further includes mirror member 900. In this respect, the display system is different from display system 301b according to Example 1 of Variation 3 of Embodiment 2. In display system 301e according to Variation 6 of Embodiment 2, the same reference characters as those in display system 301b according to Example 1 of Variation 3 of Embodiment 2 are used to represent equivalent elements, and the detailed explanation thereof will be omitted.

In display system 301e according to Variation 6 of Embodiment 2, an opening of the rear wall of case 305 serves as emitter 358e.

Mirror member 900 is located in case 305 and has reflecting surface 901 that reflects visible light. In addition, mirror member 900 is in the shape of a flat plate having light-shielding surface 902 opposite to reflecting surface 901 and shielding visible light.

Figure 30:
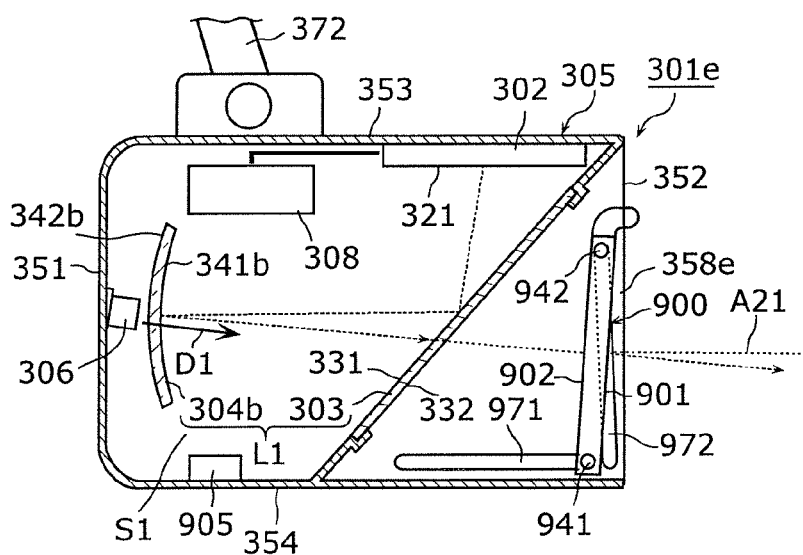
FIG. 30 is a schematic illustration of the display system according to Variation 6 of Embodiment 2 where the mirror member is located in the second position.
Figure 31:
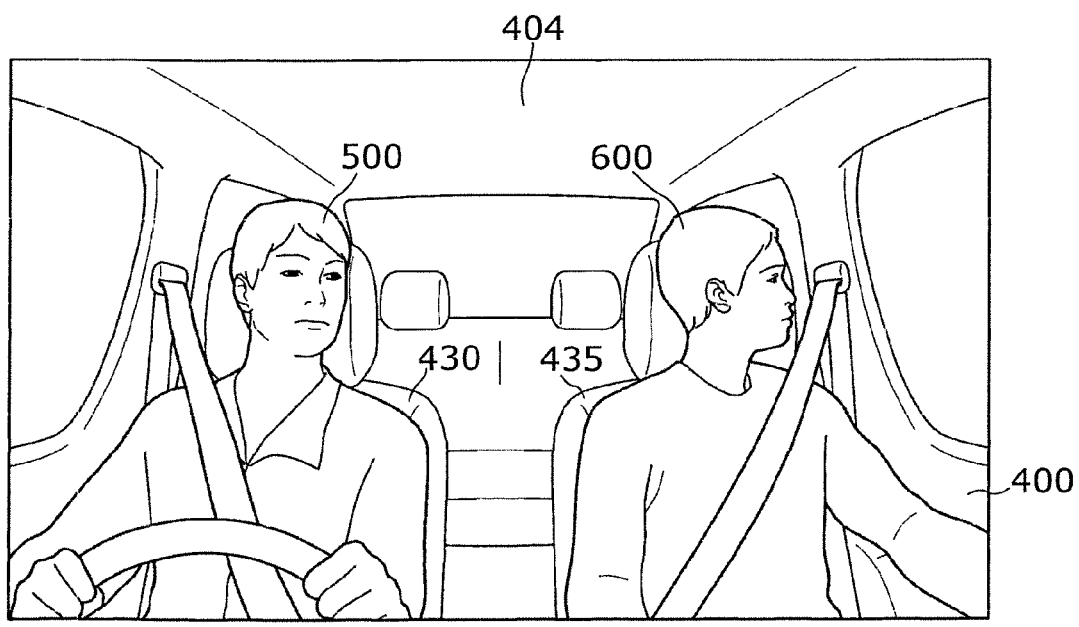
FIG. 31 illustrates the inside of the interior of a vehicle.

Mirror member 900 is attached to case 305 while being movable between a first position (i.e., the position shown in FIG. 28) and a second position (i.e., the position shown in FIG. 30). The first position is out of the light path of the rays emitted from display surface 321 of display 302, reflected by half mirror 303, and reflected by first reflecting mirror 304b. More specifically, the first position is above and adjacent to lower wall 354 of case 305, does not overlap half mirror 303 in the longitudinal direction of case 305, and substantially parallel to lower wall 354. The expression "substantially parallel" here includes the case where mirror member 900 in the first position and lower wall 354 form an angle (acute angle) of 10 degrees or less in a side view of display system 301e shown in FIG. 28. The second position is on the light path of the rays emitted from display surface 321 of display 302, reflected by half mirror 303, and reflected by first reflecting mirror 304b. More specifically, the second position overlaps emitter 358e as viewed from first reflecting mirror 304b, that is, opposite to first reflecting mirror 304b as viewed from half mirror 303. Reflecting surface 901 faces emitter 358e. In other words, mirror member 900 in the second position has reflecting surface 901 opposite to half mirror 303 and light-shielding surface 902 facing half mirror 303. When observer 500 who is the driver is seated on driver's seat 430 of vehicle 400, mirror member 900 in the second position is located between half mirror 303 and observer 500. Reflecting surface 901 of mirror member 900 faces observer 500.

Mirror member 900 has a rectangular shape as viewed in the thickness direction. In the second position, mirror member 900 has the transverse and vertical lengths that are the same as the apparent sizes of half mirror 303 as viewed from eyes 501 of observer 500. In a second mode where mirror member 900 is in the second position, whole half mirror 303 is covered by mirror member 900 as viewed from observer 500. In the second mode, whole half mirror 303 is not necessarily covered by mirror member 900 as viewed from observer 200 and a part of half mirror 303 may be visible from observer 500.

In display system 301e, while mirror member 900 is in the second position, the adjustment mechanism of support member 372 adjusts the orientation of case 305 so that observer 500 views the reflection images obtained by reflecting the light from the rear of vehicle 400 using mirror member 900.

Light-shielding surface 902 of mirror member 900 has a lower reflectivity to visible light than reflecting surface 901. In addition, mirror member 900 functions to absorb the light incident on light-shielding surface 902. Light-shielding surface 902 is in a color darker than the inner surface of ceiling 401 of body 410 of vehicle 400, for example, black. While mirror member 900 is in the first position, light-shielding surface 902 of mirror member 900 faces half mirror 303. In display system 301e, mirror member 900 functions to absorb the light incident on light-shielding surface 902. This configuration reduces reflection of the light incident on light-shielding surface 902 of mirror member 900 from the outside of case 305 by light-shielding surface 902, while mirror member 900 is in the first position. Accordingly, display system 301e reduces reflection of the light incident on light-shielding surface 902 from the outside of case 305 by light-shielding surface 902 and half mirror 303 and the entry of light to eyes 501 of observer 500. As a result, the contrast of the images to be displayed by display system 301 improves.

Mirror member 900 has first protrusion 941 and second protrusion 942 at left and right edges, respectively. When mirror member 900 is in the first position, first protrusion 941 is located in front of second protrusion 942 in the longitudinal direction. When mirror member 900 is in the second position, second protrusion 942 is located above first protrusion 941 in the vertical direction.

The surfaces facing each other of first side wall 355 and second side wall 356 of case 305 have first guide groove 971 and second guide groove 972, respectively. First guide groove 971 guides first protrusion 941 movably in the longitudinal direction of case 305, whereas second guide groove 972 guides second protrusion 942 movably in the vertical direction of case 305. First guide groove 971 extends, on the surfaces facing each other of first side wall 355 and second side wall 356 of case 305, in the longitudinal direction of case 35. Second guide groove 972 extends, on the surfaces facing each other of first side wall 355 and second side wall 356 of case 305, in the vertical direction of case 305.

Figure 28:
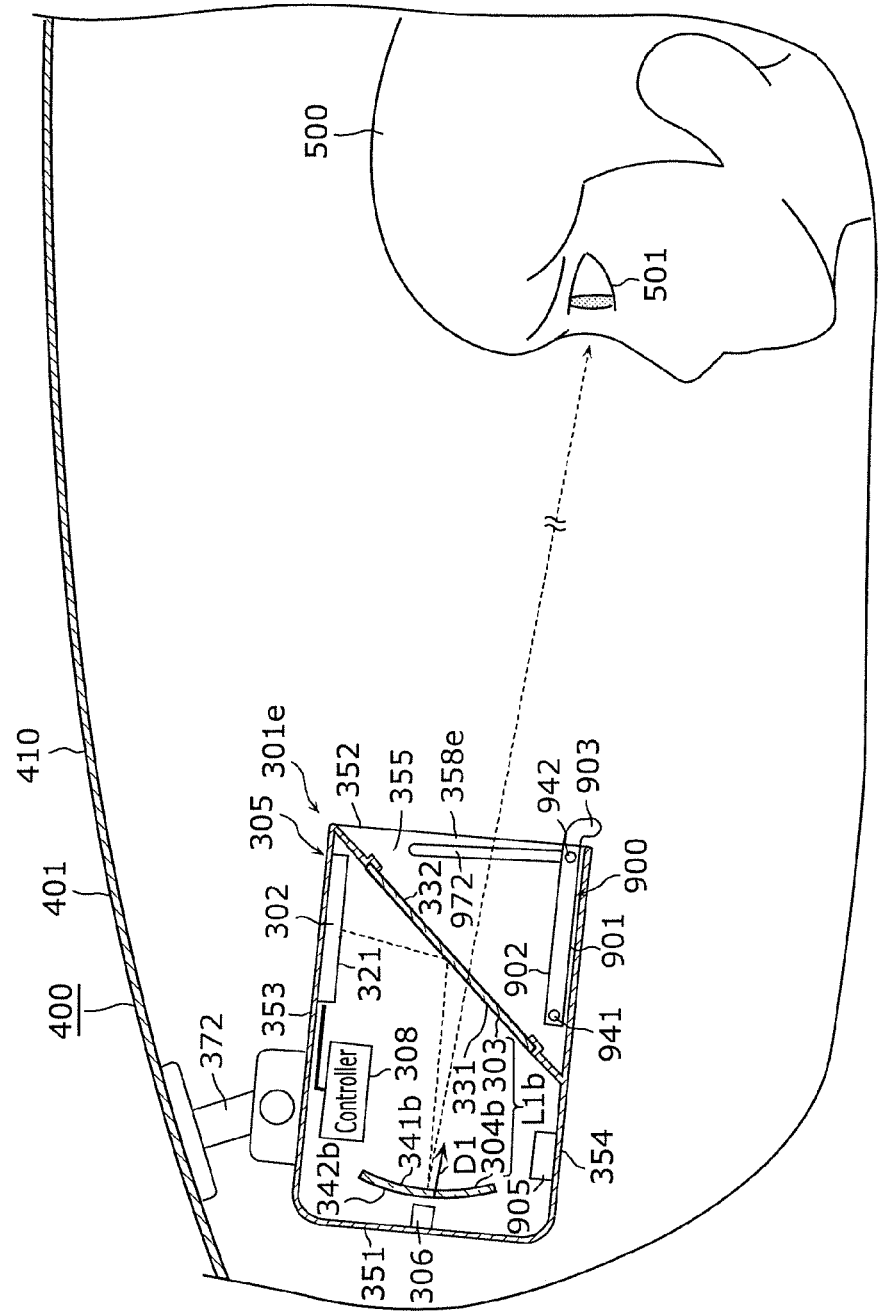
FIG. 28 is a schematic illustration of a display system according to Variation 6 of Embodiment 2 where a mirror member is located in a first position.

As shown in FIG. 28, in the first mode where mirror member 900 is in the first position, first protrusion 941 is located at the front end inside first guide groove 971, whereas second protrusion 942 is located at the lower end inside second guide groove 972. Accordingly, mirror member 900 is located along the upper surface of lower wall 354 of case 305, out of the light path of the rays transmitted by half mirror 303 and incident on eyes 501 of observer 500. Thus, while mirror member 900 is in the first mode, observer 900 views magnified and far-viewed images obtained by reflecting the images displayed on display surface 321 of display 302 using optical system L1. While mirror member 900 is in the first position, for example, an end of mirror member 900 is latched by a hook or any other means in case 305 to keep mirror member 900 in the first mode.

Display system 301e further includes projecting piece 903 as an operator for manually switching mirror member 900 between the first and second modes. Projecting piece 903 is integral with mirror member 900. While mirror member 900 is in the first position, projecting piece 903 protrudes obliquely downward.

Observer 500, for example, pushes up or pulls down projecting piece 903 as the operator to move mirror member 900.

Figure 29:
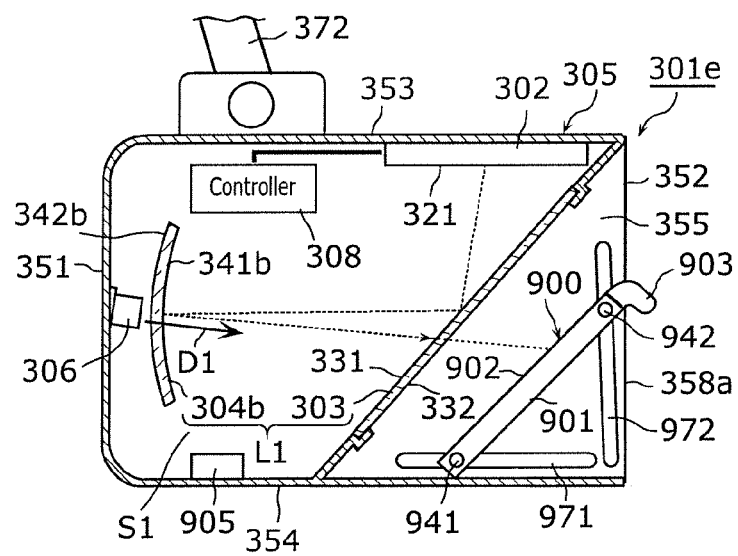
FIG. 29 is a schematic illustration of the display system according to Variation 6 of Embodiment 2 where the mirror member is located between the first position and a second position.

Once the user pushes up projecting piece 903 of mirror member 900 in the first mode, first protrusion 941 slides backward inside first guide groove 971, whereas second protrusion 942 slides upward inside second guide groove 972, as shown in FIG. 29.

Once mirror member 900 moves to the second position, first protrusion 941 is located at the rear end inside first guide groove 971, whereas second protrusion 942 is located at the upper end inside second guide groove 972, as shown in FIG. 30. In the second mode where mirror member 900 is in the second position, mirror member 900 extends in the vertical direction with reflecting surface 901 not facing half mirror 303. The expression "extends in the vertical direction" here does not necessarily mean "to extend in the vertical direction". Mirror member 900 may be inclined with respect to the vertical direction as long as the area behind vehicle 400 is visible to observer 500 via reflecting surface 901. In the second mode where mirror member 900 is in the second position, for example, an end of mirror member 900 is latched by a hook or any other means in case 305 to keep mirror member 900 in the second mode.

In this second mode, observer 500 views reflection images obtained by reflecting light A21 from the outside of case 305 (e.g. the area behind vehicle 400) using reflecting surface 901. In the second mode, the rays reflected by first reflecting mirror 304 and transmitted by half mirror 303 are blocked by mirror member 900. Thus, observer 500 cannot view the images displayed on display surface 321 of display 302.

In order to switch mirror member 900 from the second mode to the first mode, for example, observer 500 pulls down projecting piece 903 of mirror member 900. Once projecting piece 903 is pulled down, first protrusion 941 moves forward inside first guide groove 971 and second protrusion 942 moves downward inside second guide groove 972. Accordingly, mirror member 900 is switched from the second mode to the first mode. With the switch of mirror member 900 to the first mode, observer 500 views the reflection images obtained by reflecting the images displayed on display surface 321 of display 302 using optical system L1*b*.

Display system 301*e* includes actuator 905 as a drive unit that moves mirror member 900 between the first and second positions. Controller 308 is also electrically connected to with actuator 905.

Actuator 905 includes an electric motor, for example. Here, the electric motor has an output shaft coupled to a worm gear. A part of the worm gear is exposed to the inside of first guide groove 971. In this case, first protrusion 941 is in the shape of a pinion gear that meshes with the worm gear. First protrusion 941 is fixed to mirror member 900. Once controller 308 causes actuator 905 to rotate the worm gear, first protrusion 941 moves inside first guide groove 971 in accordance with the rotation of the worm gear. With the movement of first protrusion 941 inside first guide groove 971, mirror member 900 moves between the first and second positions. Actuator 905 is not limited to the motor and may be a solenoid, for example, for driving a mechanism that moves mirror member 900 from the first position to the second position.

Controller 308 detects the distance between emitter 358 and the face of observer 500 based on the image captured by camera 306, for example, and controls actuator 905 as follows. If the distance is longer than a predetermined value, actuator 905 moves mirror member 900 to the first position. If the distance is shorter than or equal to the predetermined value, actuator 905 moves mirror member 900 to the second position. Accordingly, display system 301*e* reduces the collection of sunlight at the eyes of observer 500 by mirror member 900, when the face of observer 500 comes closer to mirror member 900. The distance between emitter 358 and the face of observer 500 may be obtained utilizing, for example, the distance between two eyes 501 of observer 500 in an image of observer 500 captured by camera 306 or the focal length of camera 306, for example, for the autofocus.

Controller 308 may cause actuator 905 to move mirror member 900 from the first position to the second position, for example, upon receipt of an abnormal signal indicating the abnormality of the display by display 302 from display 302. Accordingly, if abnormality occurs in the display by display 302, observer 500 views the reflection images on reflecting surface 901 of mirror member 900, since mirror member 900 is in the second position. As a result, display system 301*e* performs alternative display, even if abnormality occurs in the display by display 302.

Note that controller 308 may cause actuator 905 to move mirror member 900 to the first position, for example, upon receipt of a notification signal indicating restoration of the display by display 302. Accordingly, once the display by display 302 is restored, observer 500 views the images displayed by display 302 via optical system L1*b*.

Note that display system 301*e* may further include a detection switch for detecting that mirror member 900 is in the second position. In this case, once the detection switch detects that mirror member 900 is in the second position, controller 308 may stop the display by display 302 based on the result of detection by the detection switch.

[Other Variations]

Embodiment 2 described above is only one of various embodiments of the present disclosure. Various modifications may be made to Embodiment 2 depending on the designs, for example, as long as achieving the objective described above.

For example, in display system 301, camera 306 may have a wide-angle lens to image passenger's seat 435 (see FIG. 31) inside interior 404. In this case, display system 301 monitors even passenger 600 (see FIG. 31) seated on passenger's seat 435.

Controller 308 may extract images of a passenger on a rear seat of vehicle 400 from the images captured by camera 306, superimpose the extracted images on videos from imager 9, and cause display 302 to display the superimposed images.

Figure 32A:
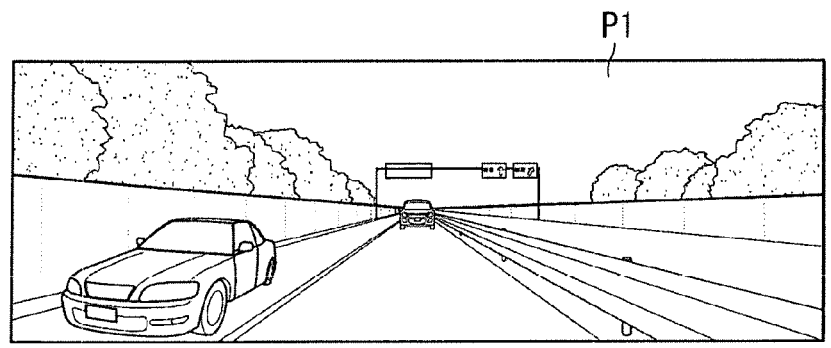
FIG. 32A shows an example image coming from an imager.
Figure 32B:
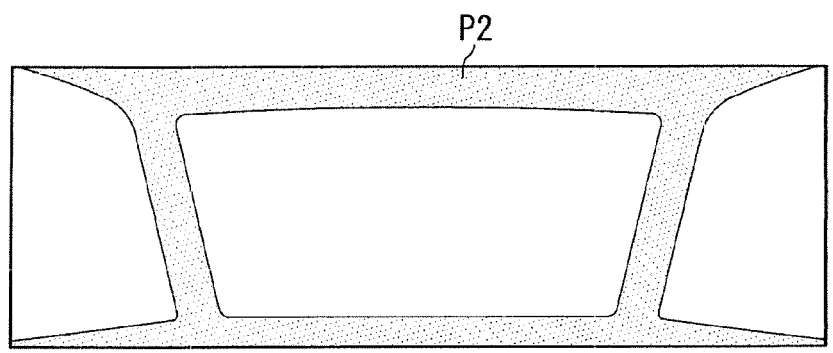
FIG. 32B shows an image of an interior including pillars behind the rear seats of a vehicle.
Figure 32C:
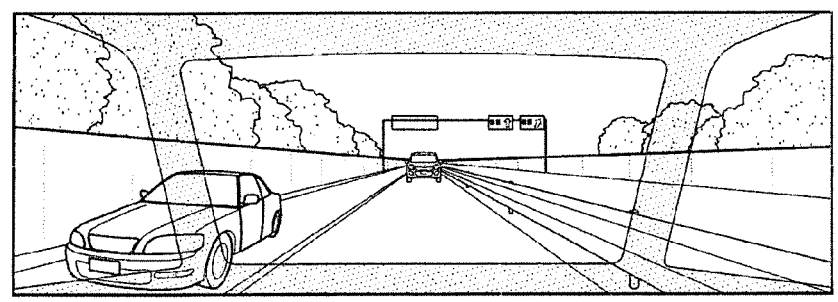
FIG. 32C shows an example image obtained by superimposing the image of the interior on the image coming from the imager.

For example, as shown in FIG. 32C, controller 308 may superimpose image P2 (see FIG. 32B) of the interior (e.g., window pillars behind the rear seats) of vehicle 400 on image P1 (see FIG. 32A) from imager 309 and cause display 302 to display the superimposed images. The images of the interior may be stored in advance in a memory or any other medium included in controller 308, for example. Note that the interior is not limited to the window pillars and may include at least a part of the rear seats of vehicle 400, for example.

Half mirror 303 described in Embodiment 2 may have the same or similar configuration as half mirror 113 described above in Embodiment 1 or may be a universal half mirror used generally.

[Conclusion]

As described above, the display system (301, 301*a*, 301*b*, 301*c*, 301*d*, or 301*e*) according to a first aspect of this embodiment includes the display (302), the half mirror (303, 303*d*, or reflecting mirror 303*a*), the first reflecting mirror (304 or 304*b*), the case (305), and the camera (306). The display (302) has the display surface (321) that displays videos of the area behind the vehicle (400). The half mirror (303, 303*d*, or reflecting mirror 303*a*) reflects the ray emitted from the display (302). The first reflecting mirror (304 or 304*b*) reflects the ray reflected by half mirror (303, 303*d*, or reflecting mirror 303*a*). The case (305) includes inside, the display (302), half mirror (303, 303*d*, or reflecting mirror 303*a*), and the first reflecting mirror (304 or 304*b*). The camera (306) is located in the case (305). The case (305) includes the emitter (358, 358*a*, or 358*e*) that emits the ray reflected by the first reflecting mirror (304 or 304*b*). In the display system (301, 301*a*, 301*b*, 301*c*, 301*d*, or 301*e*), the ray emitted from the emitter (358, 358*a*, or 358*e*) enters the eyes (501) of the observer (500) to display the video. The imaging direction (D1) of the camera (306) is directed to the inside of the interior (404) of the vehicle (400).

The display system (301, 301*a*, 301*b*, 301*c*, 301*d*, or 301*e*) according to the first aspect is advantageously applicable to various types of vehicles.

According to a second aspect, in the display system (301, 301*a*, 301*b*, 301*c*, 301*d*, or 301*e*) according to the first aspect, the ray is emitted from the emitter (358) in the imaging direction (D1) of the camera (306).

In the display system (301, 301*a*, 301*b*, 301*c*, 301*d*, or 301*e*) according to the second aspect, the camera (306) has a smaller angle of view, requiring no extra margin. Accordingly, the eyes (501) of the observer (500), for example, are detected at a higher accuracy.

According to a third aspect, in the display system (301, 301*a*, 301*b*, 301*c*, 301*d*, or 301*e*) according to the first aspect, the imaging direction (D1) of the camera (306) is directed to the headrest (431) of the driver's seat (430) inside the interior (404).

According to a fourth aspect, in the display system (301, 301*a*, 301*b*, 301*c*, 301*d*, or 301*e*) according to the first aspect, the imaging direction (D1) of the camera (306) is directed to the passenger's seat inside the interior (404).

The display system (301, 301*a*, 301*b*, 301*c*, 301*d*, or 301*e*) according to the fourth aspect monitors the passenger (600) of the vehicle (400).

According to a fifth aspect, in the display system (301, 301*a*, 301*b*, 301*c*, 301*d*, or 301*e*) according to any one of the first to fourth aspects, the camera (306) is located in the vicinity of the emitter (358, 358*a*, or 358*e*).

In the display system (301, 301*a*, 301*b*, 301*c*, 301*d*, or 301*e*) according to the fifth aspect, there is no need to increase the size of the case (305) itself. Accordingly, the front view of the observer (500) may be less blocked by the case (305).

According to a sixth aspect, the display system (301, 301*a*, or 301*d*) according to the fifth aspect further includes the near-infrared light source (307) in the vicinity of the emitter (358 or 358*a*). The near-infrared light is emitted from the near-infrared light source (307) in the imaging direction (D1) of the camera (306).

The display system (301, 301*a*, or 301*d*) according to the sixth aspect allows imaging by the camera (306), even if it is dark in the night, for example.

According to a seventh aspect, in the display system (301*b*, 301*c*, or 301*e*) according to any one of the first to third aspects, the first reflecting mirror (304*b*) functions to transmits the near-infrared light and reflect the visible light. The camera (306) is built in the case (305) in the position opposite to the emitter (358 or 358*a*) as viewed from the first reflecting mirror (304*b*).

In the display system (301*b*, 301*c*, or 301*e*) according to the seventh aspect, the view of the observer (500) is not blocked by the near-infrared light source (307).

According to an eighth aspect, the display system (301*b*, 301*c*, or 301*e*) according to the seventh aspect further includes the near-infrared light source (307) in the vicinity of the emitter (358 or 358*a*). The near-infrared light is emitted from the near-infrared light source (307) in the imaging direction (D1) of the camera (306).

The display system (301*b*, 301*c*, or 301*e*) according to the eighth aspect allows imaging by the camera (306), even if it is dark in the night, for example.

According to a ninth aspect, the display system (301 or 301*a*) according to the seventh aspect further includes the near-infrared light source (307) in the vicinity of the emitter (358 or 358*a*). The near-infrared light is emitted from the near-infrared light source (307) in the imaging direction (D1) of the camera (306).

The display system (301 or 301*a*) according to the ninth aspect allows imaging of the observer (500) by the camera (306), even if it is dark in the night, for example.

According to a tenth aspect, the display system (301, 301*a*, 301*b*, 301*c*, 301*d*, or 301*e*) according to any one of the first to ninth aspects further includes the controller (308). The controller (308) is electrically connected to the display (302) and the camera (306). The controller (308) detects at least one value or the amount of change of the face position, the viewpoint, and the viewing direction in the video of the observer (500) captured by the camera (306), and changes at least one of the position and the size of the video based on the detected value or amount of change.

The display system (301, 301*a*, 301*b*, 301*c*, 301*d*, or 301*e*) according to the tenth aspect allows shift, magnification, and reduction of the video.

According to an eleventh aspect, the display system (301, 301*a*, 301*b*, 301*c*, 301*d*, or 301*e*) according to any one of the first to third and seventh to ninth aspects further includes the controller (308). The controller (308) is electrically connected to the display (302) and the camera (306). The controller (308) detects the viewpoint of the observer (500) based on the image of the observer (500) captured by the camera (306), and issues the alert signal upon determination that the viewpoint falls out of the fixed eye-box.

The display system (301, 301*a*, 301*b*, 301*c*, 301*d*, or 301*e*) according to the eleventh aspect issues the alert signal, once the viewpoint of the observer (500) falls out of the fixed eye-box.

According to a twelfth aspect, the display system (301, 301*a*, 301*b*, 301*c*, 301*d*, or 301*e*) according to any one of the first to ninth aspects further includes the mirror member (900), the actuator (905), and the controller (308). The mirror member (900) is located in the case (305) and has the reflecting surface (901) that reflects visible light. The controller (308) is electrically connected to the display (302), the camera (306), and the actuator (905). The mirror member (900) is movable between the first position out of the light path of the ray reflected by the first reflecting mirror (304 or 304*b*) and the second position on the light path and overlapping the emitter (358*e*) as viewed from the first reflecting mirror (304 or 304*b*). The controller (308) detects the distance between the emitter (358) and the face of the observer (500) based on the distance using the image captured by the camera (306), and causes the actuator (905) to move the mirror member (900) to the first position if the distance is longer than a predetermined distance, and to the second position if the distance is shorter than or equal to the predetermined distance. In the second position, the reflecting surface (901) of the mirror member (900) faces the observer (500).

The display system (301, 301*a*, 301*b*, 301*c*, 301*d*, or 301*e*) according to the twelfth aspect reduces the reflection of sunlight by the mirror member (900) and collection of the sunlight onto the observer (500), when the face of the observer (500) comes closer to the mirror member (900).

According to a thirteenth aspect, the display system (301, 301*a*, 301*b*, 301*c*, 301*d*, or 301*e*) according to any one of the first to ninth aspects further includes the controller (308). The controller (308) is electrically connected to the display (302) and the camera (306). The controller (308) extracts the image of the passenger on a rear seat of the vehicle (400) from the image captured by the camera (306), superimposes the extracted image on the video, and causes the display (302) to display the superimposed video.

The display system (301, 301*a*, 301*b*, 301*c*, 301*d*, or 301*e*) according to the thirteenth aspect allows the observer (500) to view the passenger on the rear seat.

According to a fourteenth aspect, the display system (301, 301*a*, 301*b*, 301*c*, 301*d*, or 301*e*) according to any one of the first to eleventh aspects further includes the drive unit (i.e., support member 372) and the controller (308). The drive unit drives the case (305) to change the direction in which the ray is emitted from the emitter (358 or 358*a*). The controller (308) is electrically connected to the drive unit, the display (302), and the camera (306). The controller (308) detects the viewpoint of the observer (200) based on the image of the observer (500) captured by the camera (306) and causes the drive unit to drive the case (305) based on the viewpoint.

The display system (301, 301*a*, 301*b*, 301*c*, 301*d*, or 301*e*) according to the fourteenth aspect allows imaging by the camera (306), even if the viewpoint of the observer (500) moves. In the display system (301, 301*a*, 301*b*, 301*c*, 301*d*, or 301*e*) according to the fourteenth aspect, the ray emitted from the emitter (358) of the case (305) follows the viewing direction of the observer (500).

Embodiment 3

Now, a display system allowing the observer viewing a displayed video to grasp the distance between the own vehicle and a following vehicle will be described in addition to what has been described above.

A typical display device, for a vehicle, including a display that displays a video, a reflector that reflects the video displayed by the display, and a concave mirror that reflects the video reflected by the reflector is known (see, e.g., PTL 3). In the display device for a vehicle described in PTL 3, the reflector transmits the video reflected by the concave mirror. The center of curvature of the concave mirror is located on the optical axis between the display and the point of view of a passenger of the vehicle.

With the display device for a vehicle described in PTL 3, the observer viewing the video has difficulty in grasping the distance between the own vehicle and a following vehicle.

It is an objective of Embodiment 3, which will be described below, to provide a display system that allows an observer viewing a displayed video to grasp the distance between the own vehicle and a following vehicle and displays images more properly.

As an example, the display system according to this embodiment includes a display, a second reflecting mirror, and a first reflecting mirror. The display has a display surface that displays videos of the area behind the vehicle. The second reflecting mirror has a planar reflecting surface and directly reflects the rays emitted from the display. The first reflecting mirror reflects the rays reflected by at least the second reflecting mirror. The display system further includes a display for displaying an interior. The display is integral with the second reflecting mirror and located directly on or indirectly above the reflecting surface. The display displays an interior pattern corresponding to at least a part of the rear interior of the vehicle. In the display system, the rays reflected by the first reflecting mirror are superimposed on the interior pattern and enter the eyes of the observer to display the video and the interior pattern.

With this configuration, the display system according to this embodiment is advantageous in allowing an observer viewing a displayed video to grasp the distance between the own vehicle and a following vehicle.

Note that FIGS. 33 to 41, which will be described in the following embodiments, are conceptual diagrams, and the ratios of the sizes and thicknesses of the constituent elements are not necessarily drawn strictly to scale.

[Outline]

Figure 33:
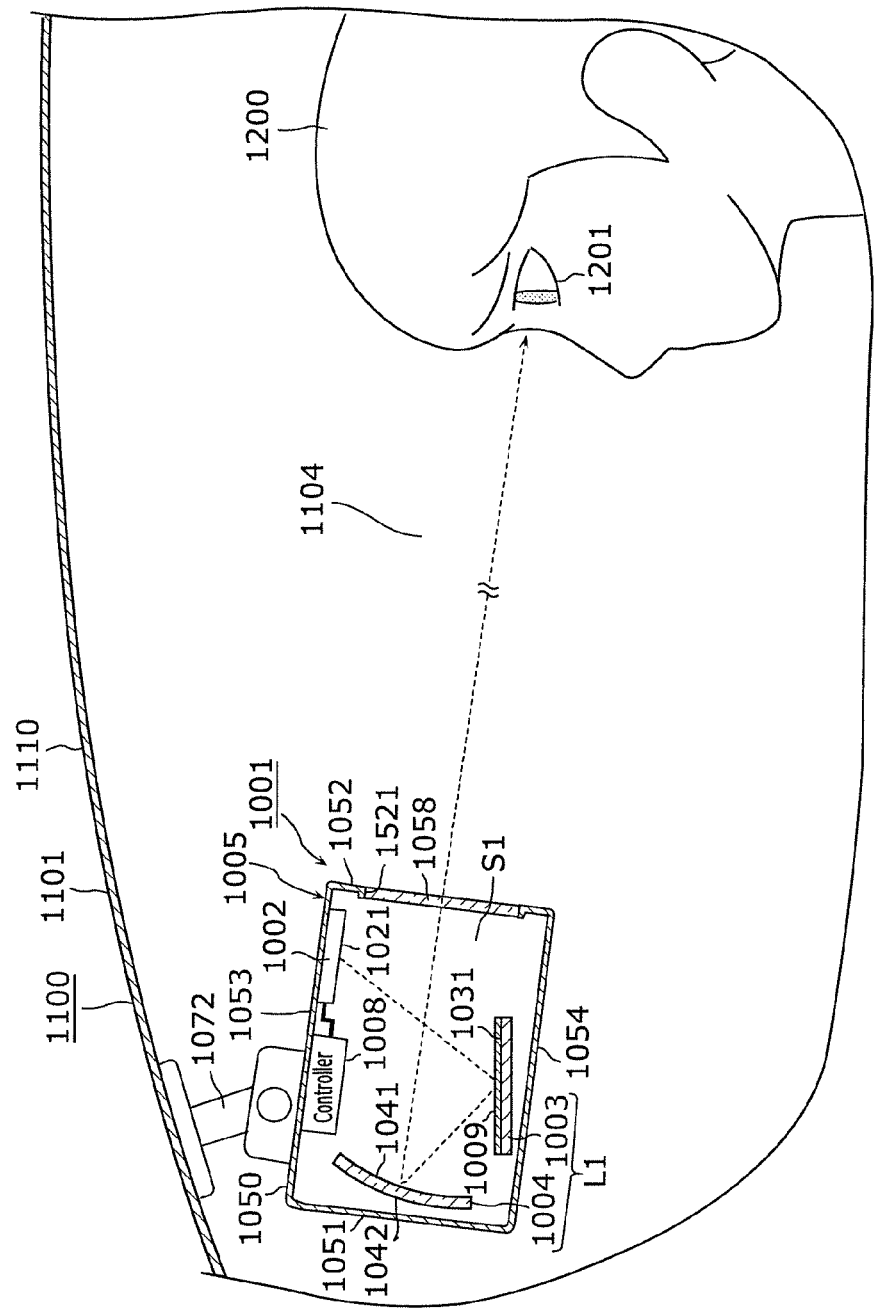
FIG. 33 is a schematic configuration diagram of a display system according to Embodiment 3.

As shown in FIG. 33, display system 1001 according to Embodiment 3 is used for vehicle (i.e., motor vehicle) 1100 as a moving object, for example.

Display system 1001 is mounted in the moving object body of the moving object that is body (i.e., vehicle body) 1110 of vehicle 1100.

Display system 1001 includes display 1002, second reflecting mirror 1003, and first reflecting mirror 1004. Display system 1001 further includes case 1005.

Display 1002 has display surface 1021 that displays videos of the area behind vehicle 1100. The videos are output from imager 1090 (see FIG. 34) that images the area behind vehicle 1100, for example. Imager 1090 is mounted in body 1110 of vehicle 1100. Note that display system 1001 according to Embodiment 3 and imager 1090 constitute electronic mirror system 1010. The moving object includes electronic mirror system 1010 and body 1110 including electronic mirror system 1010.

Second reflecting mirror 1003 has planar reflecting surface 1031 that reflects the rays emitted from display 1002. First reflecting mirror 1004 reflects the rays reflected by second reflecting mirror 1003. Case 1005 includes inside, display 1002, second reflecting mirror 1003, and first reflecting mirror 1004. Case 1005 includes emitter 1058 that emits the rays reflected by first reflecting mirror 1004. In display system 1001, once display surface 1021 displays a video of the area behind the vehicle, the video reflected by second reflecting mirror 1003 and first reflecting mirror 1004 is emitted from emitter 1058.

In display system 1001, the rays emitted from emitter 1058 enter the eyes of observer 1200 to display the videos. Accordingly, observer 1200 views the videos based on the rays emitted from display surface 1021 of display 1002. Observer 1200 is the driver of vehicle 1100, for example.

Display system 1001 further includes display 1009 for displaying the interior. Display 1009 is integral with second reflecting mirror 1003 and located on reflecting surface 1031 of second reflecting mirror 1003. Accordingly, display 1009 is built in case 1005. Display 1009 displays at least a part of an interior pattern corresponding to the rear interior of vehicle 1100.

Case 1005 of display system 1001 is located at the front of ceiling 1101 of body 1110 near windshield (i.e., front window) 1102 so as to be visible to observer 1200 who is seated on driver's seat 1130 and viewing forward (see FIG. 33). Note that the face of observer 1200 is located in front of headrest 1131 of driver's seat 1130.

[Configuration]

As described above, display system 1001 according to Embodiment 3 includes display 1002, second reflecting mirror 1003, first reflecting mirror 1004, case 1005, and display 1009.

Figure 34:
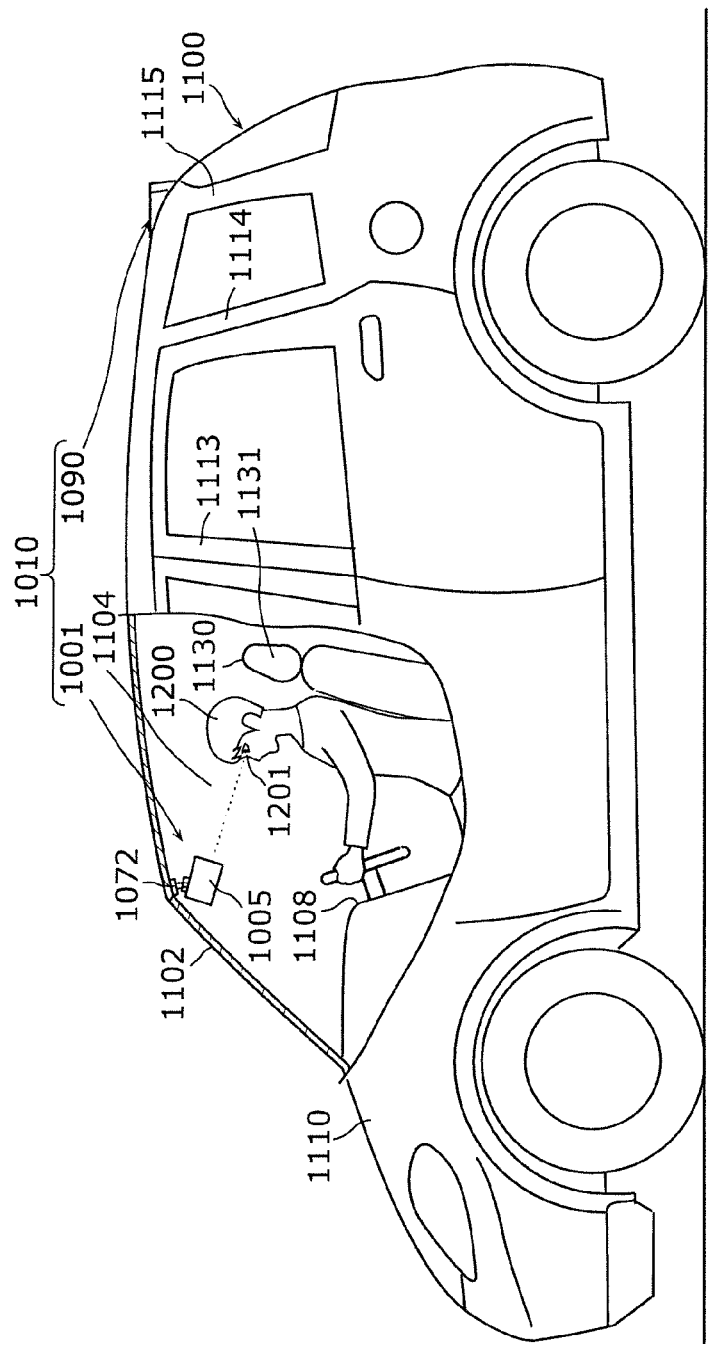
FIG. 34 is a schematic illustration of a moving object including the display system according to Embodiment 3.
Figure 35:
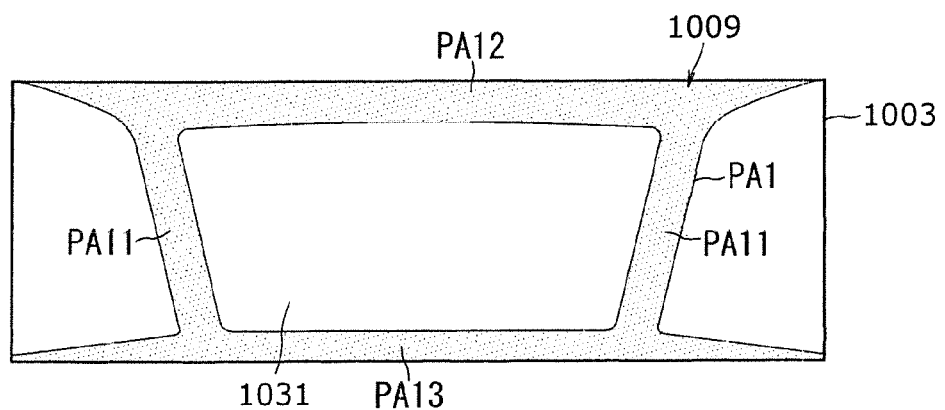
FIG. 35 illustrates an interior pattern on the display system according to Embodiment 3.
Figure 36A:
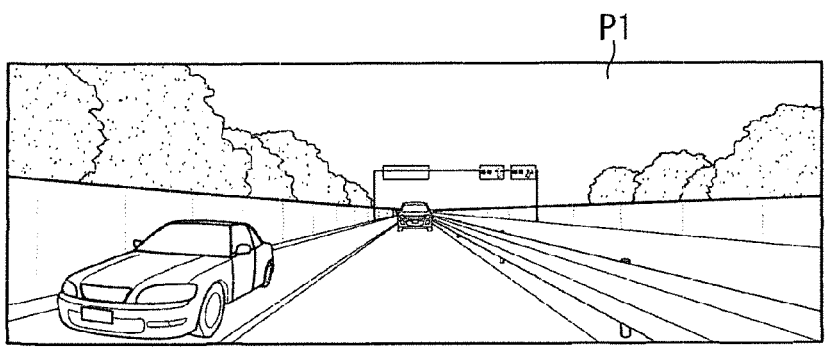
FIG. 36A shows an image on the display surface of the display system according to Embodiment 3.
Figure 36B:
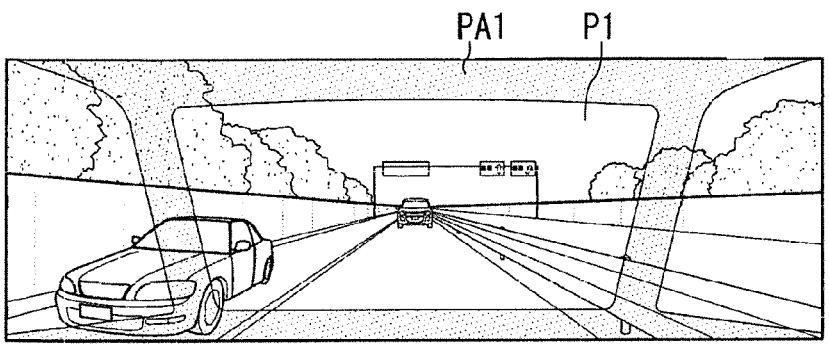
FIG. 36B is a display obtained by superimposing the image on the display surface and the interior pattern in the display system according to Embodiment 3.

Display 1002 is housed in case 1005. Display 1002 is located in an upper portion in inner space S1 of case 1005. Display 1002 is housed in case 1005 with display surface 1021 facing downward. Display 1002 outputs rays that form a video image. Display 1002 includes a light source device and a liquid crystal display (LCD) panel, for example. The LCD panel is located in front of the light source device. The light source device is used as the backlight of the LCD panel. The light source device is what is called a "surface light source". The light source device is a side light source device using a solid-state light-emitter such as a light-emitting diode or a laser diode. The rays from the light source device are transmitted by the LCD panel and emitted from display surface 1021 of display 1002. The rays emitted from display surface 1021 of display 1002 form the images. The rays output from display surface 1021 reflect the images displayed on the LCD panel. In FIGS. 33 and 34, the course of the rays output from a point (i.e., a certain pixel point) of image P1 (see, e.g., FIG. 36A) to be displayed on display surface 1021 of display 1002 are schematically represented by the dotted lines.

Display system 1001 according to Embodiment 3 includes second reflecting mirror 1003 and first reflecting mirror 1004 as reflecting members that reflect the rays emitted from display surface 1021 of display 1002. That is, display system 1001 has the optical system (i.e., a catoptric system) including second reflecting mirror 1003 and first reflecting mirror 1004.

Second reflecting mirror 1003 directly reflects the rays emitted from display 1002. The expression "directly reflects" means here to reflect the rays emitted from display 1002 and incident on reflecting surface 1031 without being reflected by other members. Second reflecting mirror 1003 reflects the rays emitted from display 1002 and incident on reflecting surface 1031, on the reflecting surface 1031 toward first reflecting mirror 1004. Second reflecting mirror 1003 is located below display surface 1021 of display 1002. Reflecting surface 1031 of second reflecting mirror 1003 faces display surface 1021 of display 1002. The term "faces" here means that display surface 1021 and reflecting surface 1031 face each other and are not necessarily parallel to each other.

Second reflecting mirror 1003 includes, for example, a plane mirror body and a reflective film on the surface of the plane mirror body. The material of the plane mirror body includes glass, for example. The reflective film may be made of metal highly reflective to visible light and includes aluminum, for example. In second reflecting mirror 1003, the surface of the reflective film serves as reflecting surface 1031.

First reflecting mirror 1004 includes, for example, a concave mirror body and a reflective film on the surface of the concave mirror body. The concave mirror body is made of a material including glass, for example. The reflective film may be made of metal highly reflective to visible light and includes aluminum, for example. In first reflecting mirror 1004, the surface of the reflective film serves as reflecting surface 1041.

In optical system L1 including second reflecting mirror 1003 and first reflecting mirror 1004, the rays emitted from display surface 1021 of display 1002 are reflected by reflecting surface 1031 of second reflecting mirror 1003 toward first reflecting mirror 1004. Reflecting surface 1041 of first reflecting mirror 1004 reflects the rays from second reflecting mirror 1003.

In display system 1001, case 1005 includes emitter 1058 that emits the rays reflected by first reflecting mirror 1004. Emitter 1058 transmits visible light. Accordingly, in display system 1001, the rays emitted from emitter 1058 enter eyes 1201 of observer 1200 so that observer 1200 views an image based on an image displayed on display surface 1021 of display 1002. That is, observer 1200 views an image reflected by second reflecting mirror 1003 and first reflecting mirror 1004 of optical system L1. In the viewing direction in which observer 1200 views reflecting surface 1041 of first reflecting mirror 1004 through emitter 1058, the image is displayed by display 1002 as if the image were in a position farther from reflecting surface 1041 (e.g., three meters ahead from the viewpoint of observer 500). In short, display 1002 displays a virtual image. It is thus advantageous in facilitating focus adjustment, when observer 1200 views an image (i.e., a virtual image) displayed by display system 1001 after viewing forward through windshield 1102.

Case 1005 includes body 1050 and emitter 1058. Body 1050 has front wall 1051, rear wall 1052, upper wall 1053, lower wall 1054, and a pair of side walls (i.e., the right and left walls as viewed from observer 1200). The case is in the shape of a box having opening (i.e., through-hole) 1521 in rear wall 1052, and inner space S1. Case 1005 is made of a material including a resin. Opening 1521 is in the rectangular shape with the transverse width larger than the vertical width. The ratio of the transverse width to the vertical width ranges from about 3:1 to about 6:1. Emitter 1058 is in the shape of a flat plate with a rectangular outer periphery and covers opening 1521 of rear wall 1052. Being attached to body 1110 of vehicle 1100, case 1005 has a size in the transverse of body 1110 (i.e., along the vehicle width) larger than the sizes in the vertical and longitudinal directions.

Emitter 1058 also functions as a dust cover for reducing the entry of dust, for example, into inner space S1 of case 1005. Emitter 1058 is a transparent plate that transmits visible light, for example. The transparent plate is made of glass, for example, with transparency. The expression "with transparency" means here having a light-transmittance of 50% or more, preferably 70% or more, more preferably 90% or more to visible light. The transparent plate is not limited to glass and may be a resin such as an acrylic. Emitter 1058 is not limited to the transparent plate and may be a liquid crystal mirror.

Case 1005 is attached to the front of ceiling 1101 of body 1110 near windshield 1102 so as to be visible to observer 1200 seated on a front seat such as driver's seat 1130 (see FIG. 34). Case 1005 is attached to ceiling 1101 of body 1110 via support member 1072 and hanging from ceiling 1101. Case 1005 is located here not to block the front view of observer 1200. Support member 1072 includes an adjustment mechanism (e.g., a ball joint) for adjusting the orientation of case 1005. Note that case 1005 is not necessarily attached to ceiling 1101 but may be attached to windshield 1102, for example.

Display system 1001 further includes controller 1008. Controller 1008 is electrically connected to display 1002. Controller 1008 controls the conditions of display 1002 displaying images. Controller 1008 establishes communications (e.g., wired communications or wireless communications) with imager 1090 via an in-vehicle network of vehicle 1100, for example. Controller 1008 receives, from imager 1090, image data indicating the images of the area behind vehicle 1100. Controller 1008 causes display 1002 to display the images based on the captured images received from imager 1090. The "images based on the captured images" may be here captured images themselves or the images obtained by processing the captured images. For example, since the images captured by imager 1090 are dark in the night, the brightness of the images captured by imager 1090 may be corrected. Alternatively, CG images or makers, for example, indicating obstacles in images may be created based on the images captured by imager 1090. Display surface 1021 of display 1002 may display images obtained by superimposing the CG images or makers, for example, on the images captured by imager 1090. Alternatively, display 1002 may display images obtained by superimposing makers indicating driving assistance information (e.g., vehicle speed information, navigation information, pedestrian information, preceding vehicle information, lane departure information, and vehicle condition information) on the images captured by imager 1090.

Controller 1008 includes a computer system. The computer system includes, as main components, a processor and a memory being hardware. In the computer system, the processor executes programs stored in the memory to fulfill the functions of controller 1008. The programs may be stored in advance in the memory of the computer system and provided through telecommunications lines. Alternatively, the programs may be stored in a non-transitory recording medium, such as a memory card, an optical disk, or a hard disk drive, readable by the computer system so as to be provided. The processor of the computer system includes one or more electronic circuits such as semiconductor integrated circuits (ICs) or large-scale integrated (LSI) circuits. The integrated circuits such as ICs or LSI circuits are here referred to depending on the degree of integration and may include integrated circuits such as system LSI circuits, very large scale integrated (VLSI) circuits or ultra large scale integrated (ULSI) circuits. In addition, a field programmable gate array (FPGA) programmed after the manufacture of an LSI circuit or a logic device capable of reconfiguring the connections or circuit divisions inside an LSI may be employed as the processor. The plurality of electronic circuits may be integrated into a single chip or distributed into a plurality of chips. The plurality of chips may be integrated into a single device or may be distributed into a plurality of devices. The computer system includes here a microcontroller including one or more processors and one or more memories. The microcontroller also includes one or more electronic circuits such as semiconductor integrated circuits or large-scale integrated circuits.

Imager 1090 is a complementary metal-oxide semiconductor (CMOS) image sensor that is attached to the rear of vehicle 1100, for example, and images the area behind vehicle 1100. Imager 1090 is not limited to the CMOS image sensor and may be an image sensor such as a charge-coupled device (CCD) image sensor.

Imager 1090 outputs image data on the imaged area behind vehicle 1100 via, for example, an in-vehicle network to controller 1008. Imager 1090 is located for example, at the rear of vehicle 1100 at the center in the transverse direction and images the range visible by a typical room mirror. Electronic mirror system 1010 serves as a rearview mirror such as a typical room mirror. Since imager 1090 is attached to the rear of vehicle 1100, the images captured by imager 1090 include no rear seat or no pillar (e.g., window pillar), for example. Note that the area behind vehicle 1100 may include both sides behind vehicle 1100 and that imager 1090 may image the area on both the sides behind vehicle 1100. Imager 1090 may capture the range visible by a typical door or fender mirror. Electronic mirror system 1010 may serve as a rearview mirror in place of the typical door or fender mirror. Imager 1090 is attached to the upper rear of body 1110, the attachment position of imager 1090 is a mere example. Imager 1090 may be attached in a position in which a desired range is imageable.

In display system 1001 according to Embodiment 3, the images displayed by display 1002, that is, the rays output from display surface 1021 of display 1002 are reflected once by each of second reflecting mirror 1003 and first reflecting mirror 1004. That is, in display system 1001, the rays output from display surface 1021 of display 1002 are reflected twice by optical system L1. The distance (i.e., the visual range) from observer 1200 to the display position of an image viewed by observer 1200 is here determined by the optical path length from display surface 1021 of display 1002 to reflecting surface 1041 of first reflecting mirror 1004, the focal length of optical system L1, or any other factor. In display system 1001 according to Embodiment 3, the rays emitted from display surface 1021 of display 1002 are reflected twice. The size of case 1005 (i.e., inner space S1) can thus be reduced, while maintaining the visual range to the display position of the image at a desired distance. Accordingly, in the direction in which observer 1200 views reflecting surface 1041 through emitter 1058, case 1005 can be miniaturized.

In display system 1001 according to Embodiment 3, display 1009 is integral with second reflecting mirror 1003 and located on reflecting surface 1031 of second reflecting mirror 1003. Second reflecting mirror 1003 is in the shape of a rectangular plate. Display 1009 is located on the light path between display surface 1021 of display 1002 and first reflecting mirror 1004.

Display 1009 displays interior pattern PA1 (see FIG. 35) corresponding to at least a part of the rear interior of vehicle 1100. Specifically, display 1009 displays, as interior pattern PA1, at least a part of the interior of vehicle 1100 within the field of view of first reflecting mirror 1004 and outside field FV9 of view of imager 1090. Note that display system 1001 does not necessarily display whole interior pattern PA1 on display 1009 inside the field of view of first reflecting mirror 1004 but may display at least a part of interior pattern PA1. At least a part of the rear interior of vehicle 1100 includes two pillars 1115 (only one pillar 1115 is shown in FIG. 34) of the rear window at the rear of vehicle 1100, for example. The "pillars 1115" are here the window pillars diagonally behind the rear seats of vehicle 1100. In display 1009, interior pattern PA1 includes two image parts PA11, image part PA12, and image part PA13 as an example. Two image parts PA11 correspond to two pillars 1115 spaced apart from each other on the right and left of vehicle 1100, respectively. Image part PA12 corresponds to the rear of ceiling 1101 (see FIG. 33) connected to the upper ends of two pillars 1115 of vehicle 1100. Image part PA13 corresponds to the part connected to the lower ends of two pillars 1115 of vehicle 1100. Interior pattern PA1 is not limited to the example of FIG. 35 and may include, for example, at least two image parts PA11 corresponding to two pillars 1115, respectively. Image parts PA11 of pillars 1115 have a thickness depending on the type of vehicle 1100, for example. Image parts PA11 may seem to have a thickness smaller than pillars 1115 of vehicle 1100. The lines corresponding to the heating wires of the rear window may be drawn in the area corresponding to the rear window.

In display system 1001, the rays reflected by first reflecting mirror 1004 are superimposed on interior pattern PA1 and enter eyes 1201 of observer 1200 to display the video and interior pattern PA1.

In display system 1001, interior pattern PA1 included in display 1009 is displayed on reflecting surface 1031 of second reflecting mirror 1003. Interior pattern PA1 is here formed by printing. Interior pattern PA1 may be, for example, a translucent print film or may be printed in a fine dotted pattern to be apparently translucent.

[Operation]

Operations of display system 1001 according to Embodiment 3 and electronic mirror system 1010 including display system 1001 will be described below.

For example, once electric power is supplied from the battery of vehicle 1100 to electronic mirror system 1010 and a control signal causing the start of operation is input from an electronic control unit (ECU) included in vehicle 1100 to electronic mirror system 1010, electronic mirror system 1010 starts operating.

For example, upon receipt of the control signal causing the start of operation from the ECU of vehicle 1100, controller 1008 causes imager 1090 to image the area behind vehicle 1100 at a predetermined frame rate and obtains, from imager 1090, image data on the captured image.

Upon receipt of image data on the captured images from imager 1090, controller 1008 creates images based on the captured images and causes display surface 1021 of display 1002 to display the images.

Once an image is displayed on display surface 1021 of display 1002, the rays forming this image are emitted toward reflecting surface 1031 of second reflecting mirror 1003. Reflecting surface 1031 of second reflecting mirror 1003 reflects the rays from display 1002 toward first reflecting mirror 1004. First reflecting mirror 1004 reflects the rays obtained by magnifying the image of display surface 1021. Accordingly, observer 1200 views the image magnified by reflecting surface 1041 to check the area behind vehicle 400. In display system 1001, the rays reflected by reflecting surface 1041 of first reflecting mirror 1004 are emitted outside from emitter 1058 of case 1005. Emitter 1058 is not limited to an object such as a transparent plate or a liquid crystal mirror, and may be opening 1521 of case 1005.

[Advantages]

Display system 1001 according to Embodiment 3 includes display 1002, second reflecting mirror 1003, and first reflecting mirror 1004. The rays reflected by first reflecting mirror 1004 enter eyes 1201 of observer 1200 to display videos. Display system 1001 further includes display 1009 integral with second reflecting mirror 1003. For observer 1200 viewing first reflecting mirror 1004, image P1 (see FIG. 36A) displayed on display surface 1021 and interior pattern PA1 (see FIG. 35) displayed by display 1009 seem to overlap each other (see FIG. 36B). Accordingly, display system 1001 has the following advantage, as compared to the case where the observer directly views a display device that displays, as videos, video signals output from imager 1090. Observer 1200 grasps the distance between the rear of vehicle 1100 and another vehicle or any other object.

In display system 1001, since display 1009 is integral with second reflecting mirror 1003, the light path from display 1009 to eyes 1201 is shorter than that from display 1002 to eyes 1201 of observer 1200. Accordingly, observer 1200 recognizes interior pattern PA1 (i.e., a virtual image) in front of image P1 (i.e., a virtual image) of the area behind vehicle 1100 displayed by display 1002 in FIG. 36B. Since the positional relationship between interior pattern PA1 and image P1 of the area behind the vehicle is closer to the actual positional relationship, observer 1200 feels less discomfort in the rear field of view.

[Variation 1]

Figure 37:
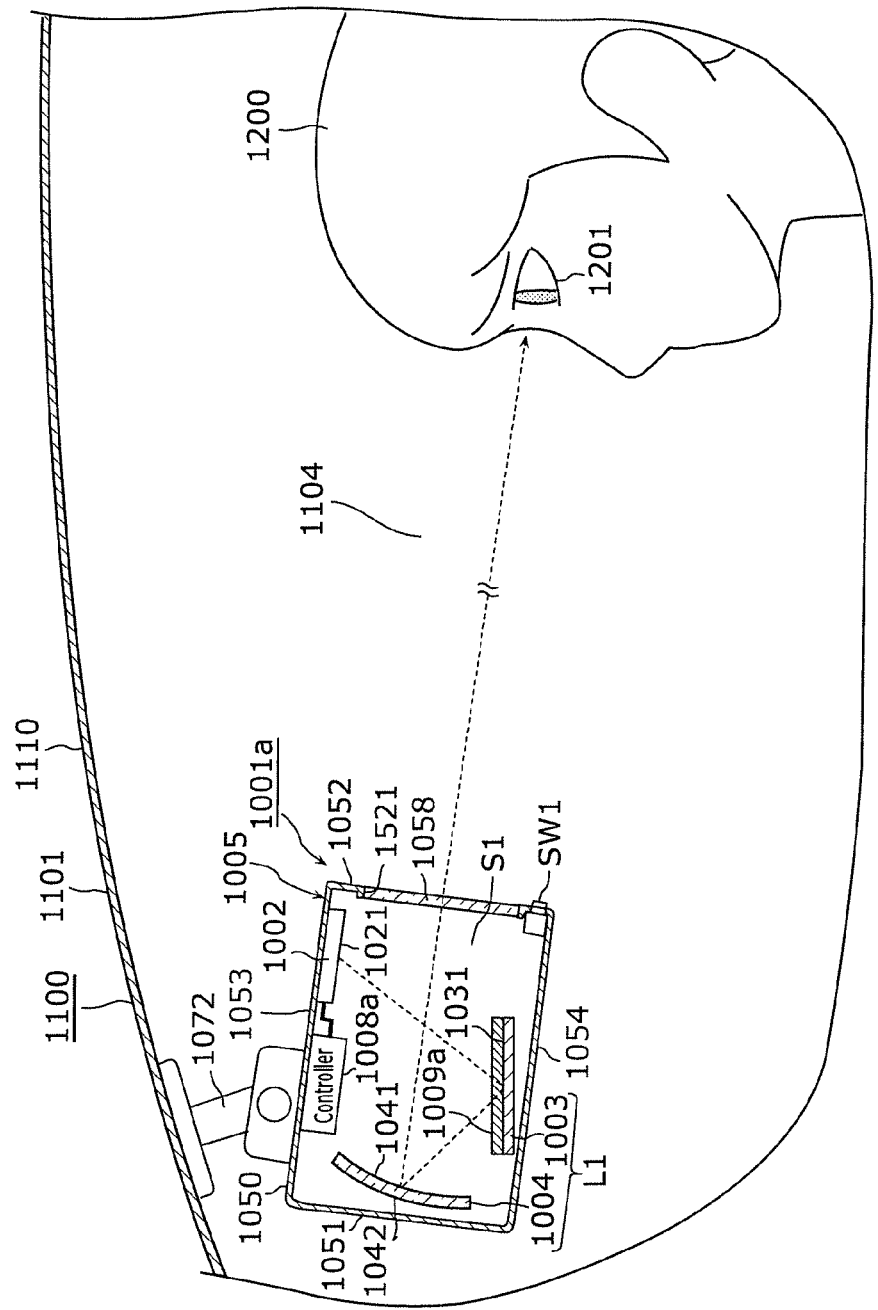
FIG. 37 is a schematic configuration diagram of a display system according to Example 1 of Variation 1 of Embodiment 3.

Now, display system 1001a according to Variation 1 of Embodiment 3 will be described with reference to FIG. 37.

Display system 1001a according to Variation 1 of Embodiment 3 includes display 1009a in place of display 1009 of display system 1001 according to Embodiment 3. In this respect, the display system differs from display system 1001 according to Embodiment 3. Specifically, as a configuration for displaying the interior, as described above in Embodiment 3, display 1009 may display interior pattern PA1 formed by printing. Alternatively, display 1009a, such as a liquid crystal display, may display interior pattern PA2, which will be described later. In display system 1001a according to Variation 1 of Embodiment 3, the same reference characters as those in display system 1001 according to Embodiment 3 are used to represent equivalent elements, and the detailed explanation thereof will be omitted.

Display 1009a is a second display element separated from display 1002 (hereinafter also referred to as "first display element 1002") and capable of displaying interior pattern PA2. Display 1009a is integral with second reflecting mirror 1003 and located on reflecting surface 1031 of second reflecting mirror 1003. The second display element as display 1009 is a liquid crystal display, for example. Interior pattern PA2 includes two image parts PA21, image part PA22, and image part PA23 as an example.

Two image parts PA21 correspond to two pillars 1115 spaced apart from each other on the right and left of vehicle 1100, respectively. Image part PA22 corresponds to the rear of ceiling 1101 connected to the upper ends of two pillars 1115 of vehicle 1100. Image part PA23 corresponds to the part connected to the lower ends of two pillars 1115 of vehicle 1100.

Display system 1001a according to Variation 1 of Embodiment 3 includes controller 1008a in place of controller 1008 according to Embodiment 3. Controller 1008 is electrically connected to first display element 1002 and the second display element. Like controller 1008 of display system 1001 according to Embodiment 3, controller 1008a controls first display element 1002.

In display system 1001a, for observer 1200 viewing first reflecting mirror 1004, image P1 (see FIG. 38A) displayed on display surface 1021 and interior pattern PA2 (see FIG. 38B) displayed by display 1009a seem to be image (hereinafter also referred to as reflection image) P2 reflected by first reflecting mirror 1004 (see FIG. 38C). In reflection image P2, image P1 and interior pattern PA2 seem to overlap each other. That is, display system 1001a includes display 1009a integral with second reflecting mirror 1003. For observer 1200 viewing first reflecting mirror 1004, image P1 (see FIG. 38A) displayed on display surface 1021 and interior pattern PA2 (see FIG. 38B) displayed by display 1009a seem to overlap each other (see FIG. 38C). Accordingly, display system 1001a has the following advantage, as compared to the case where the observer directly views a display device that displays, as videos, video signals output from imager 1090. Observer 1200 grasps the distance between the rear of vehicle 1100 and another vehicle or any other object. Like in Embodiment 3, observer 1200 recognizes interior pattern PA2 (i.e., a virtual image) in front of image P1 (i.e., a virtual image) of the area behind vehicle 1100 displayed by display 2 in FIGS. 38A to 38C as well. Since the positional relationship between interior pattern PA2 and image P1 of the area behind the vehicle is closer to the actual positional relationship, observer 1200 feels less discomfort in the rear field of view.

Display system 1001a further includes switch SW1. Switch SW1 is electrically connected to controller 1008a. Switch SW1 is located on rear wall 1052 of case 1005, for example, operable by observer 1200, for example. Through the operation of switch SW1, controller 1008a switches display and non-display of interior pattern PA2 on the second display element. That is, through the operation of switch SW1 by observer 1200, display system 1001a switches display and non-display of interior pattern PA2.

Figure 38A:
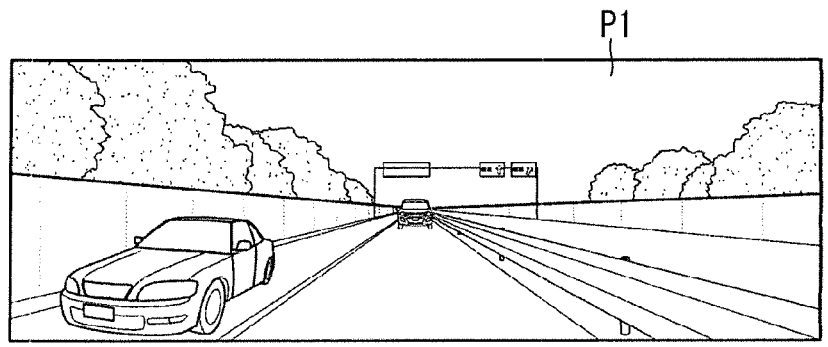
FIG. 38A shows an image on a display surface of the display system according to Example 1 of Variation 1 of Embodiment 3.
Figure 38B:
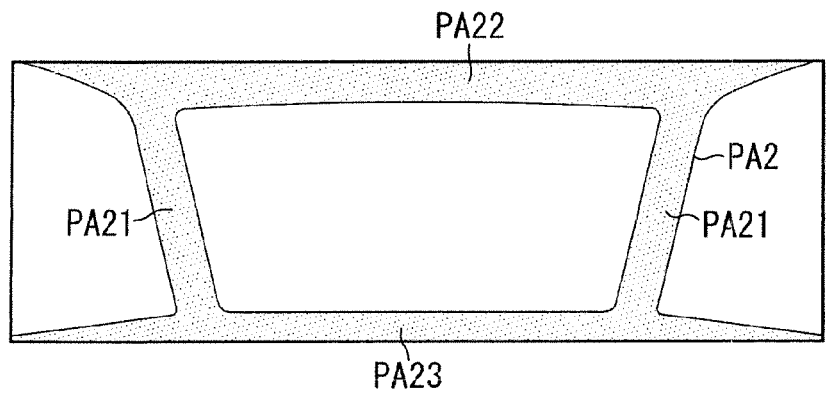
FIG. 38B is a display by a display, for displaying an interior, of the display system according to Example 1 of Variation 1 of Embodiment 3.
Figure 38C:
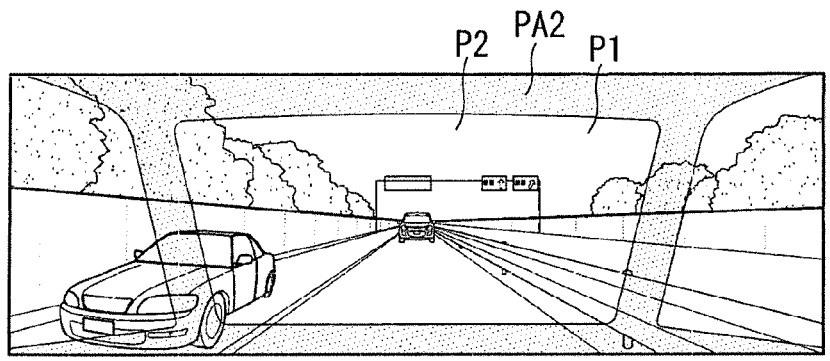
FIG. 38C is a display obtained by superimposing the image on the display surface and an interior pattern in the display system.

When the second display element displays interior pattern PA2, image P1 and interior pattern PA2 seem to overlap each other for observer 1200 as shown in FIG. 38C, for example. When the second display element does not display interior pattern PA2, the image of FIG. 38A seems to be reflected by first reflecting mirror 1004, for example, for observer 1200.

Figure 39:
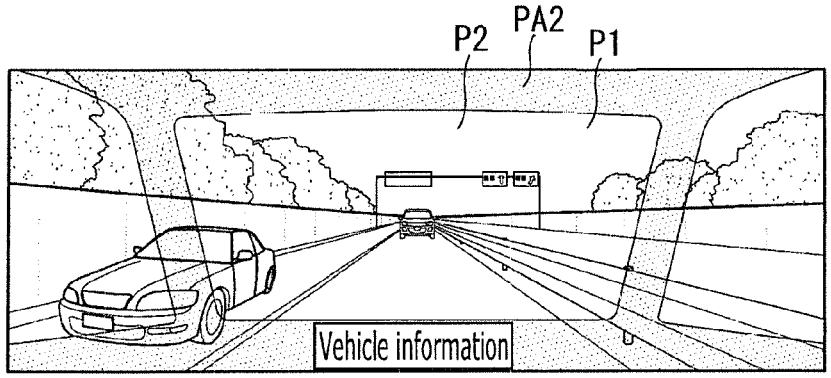
FIG. 39 is a display obtained by superimposing an image on a display surface and an interior pattern in a display system according to Example 2 of Variation 1 of Embodiment 3.

In display system 1001a, controller 1008a obtains vehicle information related to vehicle 1100. The vehicle information may include information on a following vehicle in addition to the information on own vehicle 1100. The information on the own vehicle includes vehicle speed information, lane departure information, and vehicle condition information, for example. The information on a following vehicle includes alert information indicating approach of the following vehicle. Through the operation of switch SW1, controller 1008a causes display 1009a to display at least one of interior pattern PA2 and the vehicle information. FIG. 39 shows an example of reflection image P2 visible to observer 1200, when display 1009a displays both of interior pattern PA2 and the vehicle information.

Figure 40:
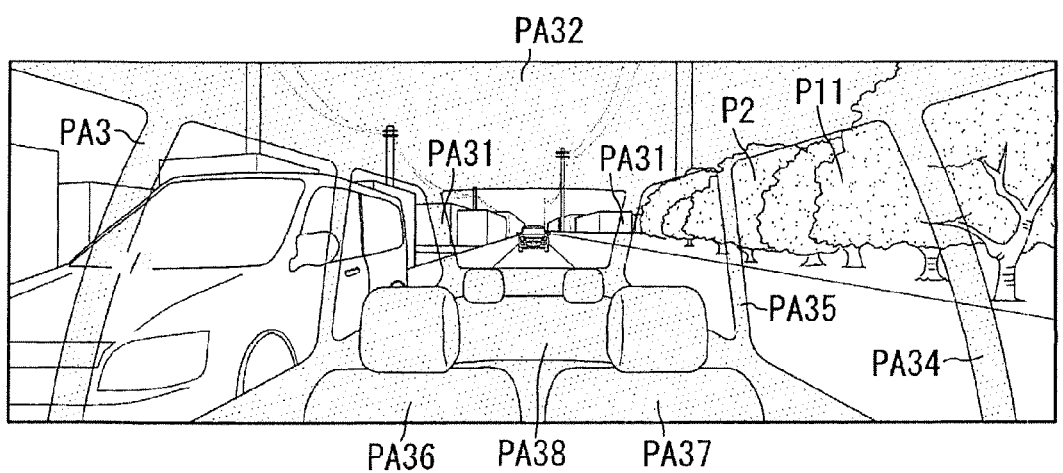
FIG. 40 is a display obtained by superimposing an image on a display surface and an interior pattern in a display system according to Example 3 of Variation 1 of Embodiment 3.

As shown in FIG. 40, display system 1001a may superimpose interior pattern PA3 corresponding to a part of the interior of vehicle 1100 on image (composite image) P11 and display the superimposed image. Image P11 is obtained by combining captured image output from imager (i.e., first camera) 1090 capturing the area behind vehicle 1100, a second camera capturing the area behind vehicle 1100 to the right, and a third camera capturing the area behind vehicle 1100 to the left. FIG. 40 shows reflection image P2 on first reflecting mirror 1004 where display surface 1021 of display 1002 displays the composite image and display 1009a displays interior pattern PA3. Interior pattern PA3 corresponds to the interior of vehicle 1100 in a range wider than interior pattern PA2. Interior pattern PA3 includes, in addition to image part PA31 corresponding to rear window pillar 1115, image parts PA34 and PA35 corresponding to side widow pillars 1113 and 1114, respectively (see FIG. 34), and image parts PA36, PA37, and PA38 corresponding to the rear seats.

The videos to be displayed by display 1002 are obtained by combining the videos of the area straight behind vehicle 1100, the videos of the area behind vehicle 1100 to the right, and the videos of the area behind vehicle 1100 to the left. The rear interior of vehicle 1100 is viewed from dash board 1108 of vehicle 1100.

[Variation 2]

Figure 41:
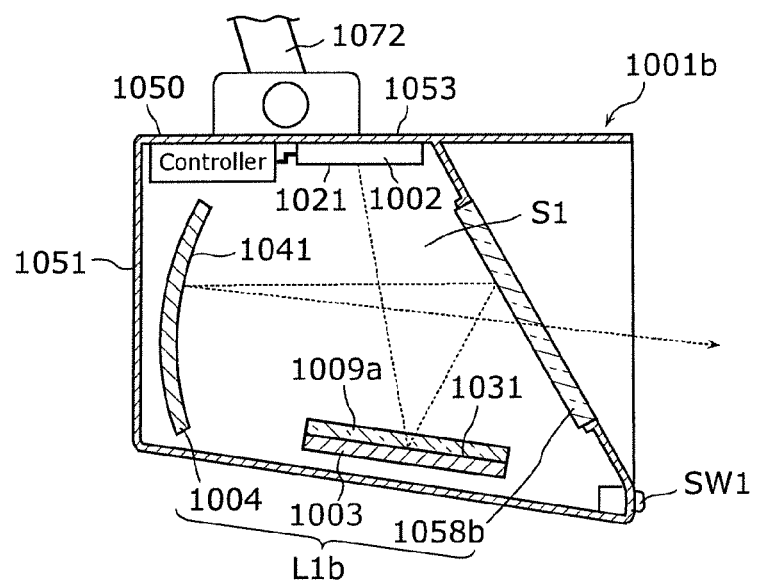
FIG. 41 is a schematic configuration diagram of a display system according to Variation 2 of Embodiment 3.

Now, display system 1001b according to Variation 2 of Embodiment 3 will be described with reference to FIG. 41.

In display system 1001b according to Variation 2 of Embodiment 3, optical system L1b includes emitter 1058b in addition to second reflecting mirror 1003 and first reflecting mirror 1004. The rays from display surface 1021 of display 1002 are reflected three times by optical system L1b and emitted from emitter 1058b. In this respect, the display system is different from display system 1001a according to Variation 1 of Embodiment 3. In display system 1001b according to Variation 2 of Embodiment 3, the same reference characters as those in display system 1001a according to Variation 1 of Embodiment 3 are used to represent equivalent elements, and the detailed explanation thereof will be omitted.

Display system 1001b includes emitter 1058b that is a half mirror in place of emitter 1058 of display system 1001a. Emitter 1058b functions to transmit a part of incident light and reflect the other part of the incident light. Emitter 1058b is a beam splitter in the shape of a flat plate with a light-transmittance and a light-reflectivity of about 50%.

In display system 1001b, second reflecting mirror 1003 is located to reflect the rays from display 1002 toward emitter 1058b.

Emitter 1058b reflects, toward first reflecting mirror 1004, the rays emitted from display 1002 and reflected by second reflecting mirror 1003, and transmits the rays reflected by first reflecting mirror 1004. Emitter 1058b faces reflecting surface 1041 of first reflecting mirror 1004 and is spaced apart from first reflecting mirror 1004. Emitter 1058b is inclined as follows with respect to the plane orthogonal to the direction in which first reflecting mirror 1004 and emitter 1058b are aligned. In the direction in which first reflecting mirror 1004 and emitter 1058b are aligned, the distance between first reflecting mirror 1004 and the upper end of emitter 1058b is shorter than that between first reflecting mirror 1004 and the lower end of emitter 1058b. Accordingly, in the longitudinal direction of vehicle 1100 (see FIG. 33), the upper end of emitter 1058b is located in front of the lower end of emitter 1058b.

Like display system 1001a according to Variation 1 of Embodiment 3, display system 1001b according to Variation 2 of Embodiment 3 includes display 1009a integral with second reflecting mirror 1003. For observer 1200 viewing first reflecting mirror 1004, image P1 (see FIG. 38A) displayed on display surface 1021 and interior pattern PA2 (see FIG. 38B) displayed by display 1009a seem to overlap each other (see FIG. 38C). Accordingly, display system 1001a has the following advantage, as compared to the case where the observer directly views a display device that displays, as videos, video signals output from imager 1090. Observer 1200 grasps the distance between the rear of vehicle 1100 and another vehicle or any other object. Like in Embodiment 3, in Variation 2 of Embodiment 3, observer 1200 recognizes interior pattern PA2 (i.e., a virtual image) in front of image P1 (i.e., a virtual image) of the area behind vehicle 1100 displayed by display 1002. Since the positional relationship between interior pattern PA2 and image P1 of the area behind the vehicle is closer to the actual positional relationship, observer 1200 feels less discomfort in the rear field of view.

Employing optical system Lib, display system 1001b according to Variation 2 of Embodiment 3 provides a long distance from eyes 1201 of observer 1200 to the point at which a virtual image is projected, as compared to display system 1001a according to Variation 1 of Embodiment 3.

[Other Variations]

Embodiment 3 described above is only one of various embodiments of the present disclosure. Various modifications may be made to Embodiment 3 depending on the designs, for example, as long as achieving the objective described above.

In Embodiment 3, display 1002 is located on the lower surface of upper wall 1053 of case 1005. For example, display 1002 may be placed on the upper surface of lower wall 1054 of case 1005 and the layout inside case 1005 may be inverted vertically.

Display 1009 or 1009a only needs to be integral with second reflecting mirror 1003. The display for displaying the interior is not necessarily located directly on reflecting surface 1031 of second reflecting mirror 1003 but may be located indirectly above reflecting surface 1031 with another member interposed therebetween. The other member is transmissive to visible light.

Display system 1001b according to Variation 2 of Embodiment 3 may employ display 1009 of display system 1001 according to Embodiment 3 in place of display 1009a.

Display system 1001b according to Variation 2 of Embodiment 3 may have a larger number of mirrors to increase the reflection times in optical system Lb1.

Display 1002 does not necessarily include, as the components, the LCD panel and the light source device. Display 1002 may scan a diffuse transmission screen, for example, with laser light from the back of the screen to display images on the screen. Alternatively, display 1002 may project images on a diffuse transmission screen, for example, from the back of the screen using a projector. Display 1002 may be a self-luminous display panel including an organic light-emitting diode (OLED).

In display system 1001, 1001a, or 1001b, the size of first reflecting mirror 1004 may be determined so that the size of the virtual image with respect to whole image P1 on an imaginary plane apart from observer 1200 is larger than the field of view of observer 1200 determined by first reflecting mirror 1004. The size of first reflecting mirror 1004 is here determined so that the outer peripheral line of the field of view of observer 1200 is inside the outer peripheral line of the virtual image on the imaginary plane described above in display system 1001. Accordingly, display system 1001 displays reflection image P2 far away as a virtual image in a position variable with the movement of eyes 1201 of observer 1200 viewing first reflecting mirror 1004.

Display system 1001, 1001a, or 1001b may include a lens on the light path between display surface 1021 and first reflecting mirror 1004.

Electronic mirror system 1010 is applicable not only to moving object such as vehicle 1100. Electronic mirror system 1010 is also applicable to a moving object, such as a motorcycle, train, airplane, construction machine, or ship, other than vehicle 1100. In short, the moving object body is not only the motor vehicle but also a moving object, such as a motorcycle, train, airplane, construction machine, or ship, other than vehicle 1100. In addition, electronic mirror system 1010 is applicable not only to a moving object but also to an amusement facility or medical equipment, for example.

Like display system 1001 according to Embodiment 1 described above, display system 1001 described in Embodiment 3 may include half mirror 113 inside the optical system or may have another configuration.

An example has been described in Embodiment 3 where electronic mirror system 1010 may serve as the back mirror of vehicle. The configuration is not limited thereto. Electronic mirror system 1010 may serve as a door mirror (or a side mirror) of the vehicle. A door mirror usually reflects not the interior but the exterior of a vehicle. In this case, display system 1001 may include a display for displaying the vehicle exterior in place of display 1009 or 1009a. The exterior display displays, as the vehicle exterior, an exterior pattern corresponding to a part of door panels or a part of pillar appearance, for example. The exterior display may display the exterior pattern formed by printing or may be a display element such as a liquid crystal display.

[Conclusion]

This embodiment discloses the following aspects.

The display system (1001, 1001a, or 1001b) according to a first aspect includes the display (1002), the second reflecting mirror (1003), and the first reflecting mirror (1004). The display (1002) has the display surface (1021) that displays the video of the area behind the vehicle (1100). The second reflecting mirror (1003) has the planar reflecting surface (1031) that directly reflects the ray emitted from the display (1002). The first reflecting mirror (1004) reflects the ray reflected by at least the second reflecting mirror (1003). The display system (1001, 1001a, or 1001b) further includes the display (1009 or 1009a) for displaying the interior or the display for displaying the exterior. The display (1009 or 1009a) or the display for displaying the exterior is integral with the second reflecting mirror (1003) and located directly on or indirectly above the planar reflecting surface (1031). The display (1009) displays the interior pattern (PA1, PA2, or PA3) corresponding to at least a part of the rear interior of the vehicle (1100). The display for displaying the exterior displays the exterior pattern corresponding to at least a part of the rear exterior of the vehicle (1100). Once the ray reflected by the first reflecting mirror (1004) is superimposed on the interior pattern (PA1, PA2, or PA3) or the exterior pattern and enters the eyes (1201) of the observer (1200), the display system (1001, 1001a, or 1001b) displays the video and the interior pattern (PA1, PA2, or PA3) or the exterior pattern.

The display system (1001, 1001a, or 1001b) according to the first aspect allows the observer (1200) viewing the displayed video to grasp the distance between the vehicle (1100) and a following vehicle.

According to a second aspect, in the display system according to the first aspect, the display (1009) for displaying the interior or the display for displaying the exterior includes the interior pattern (PA1) or the exterior pattern displayed on the planar reflecting surface (1031) of the second reflecting mirror (1003).

The display system (1001) according to the second aspect achieves the display (1009), for displaying the interior, or the display, for displaying the exterior, with a relatively simple configuration.

According to a third aspect, in the display system (1001a or 1001b) according to the first aspect, the display (1009a) for displaying the interior or the display for displaying the exterior is the second display element separated from the first display element that is the display (1002), and capable of displaying the interior pattern (PA2 or PA3) or the exterior pattern.

The display system (1001a or 1001b) according to the third aspect easily changes the interior pattern (PA2 or PA3) or the exterior pattern.

According to a fourth aspect, the display system (1001a or 1001b) according to the third aspect further includes the controller (1008a) and the switch (SW1). The controller (1008a) is electrically connected to the first display element and the second display element (i.e., display 1009a). The switch (SW1) is electrically connected to the controller (1008a). Through operation of the switch (SW1), the controller (1008a) switches display and non-display of the interior pattern (PA2 or PA3) or the exterior pattern on the second display element (i.e., display 1009a).

Once the observer operates the switch (SW1), the display system (1001a or 1001b) according to the fourth aspect switches display and non-display of the interior pattern (PA2 or PA3) or the exterior pattern.

According to a fifth aspect, in the display system (1001a or 1001b) according to the fourth aspect, the controller (1008a) obtains vehicle information related to the vehicle (1100). Through operation of the switch (SW1), the controller (1008a) causes the second display element (i.e., display 1009a) to display at least one of the vehicle information and the interior pattern (PA2 or PA3) or the exterior pattern.

The display system (1001a or 1001b) according to the fifth aspect superimposes the vehicle information on the video and display the superimposed image.

According to a sixth aspect, in the display system (1001, 1001a, or 1001b) according to any one of the first to fifth aspects, the video displayed by the display (1002) is obtained by combining a video of an area straight behind the vehicle (1100), a video of the area behind the vehicle (1100) to the right, and a video of the area behind the vehicle (1100) to the left. The rear interior of the vehicle (1100) is seen from the dash board of the vehicle (1100).

The display system (1001, 1001a, or 1001b) according to the sixth aspect displays the video and the interior in a wider range and allows the observer (1200) viewing the displayed video to grasp the distance between the vehicle (1100) and a following vehicle.

While the display system according to one or more aspects of the present disclosure have been described above based on the embodiments, the present disclosure is not limited to the embodiments. The one or more aspects of the present disclosure includes other embodiments, such as those obtained by various modifying the embodiments as conceived by those skilled in the art or those achieved by freely combining the constituent elements and functions in the embodiments without departing from the scope and spirit of the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosures of the following Japanese Patent Applications including specification, drawings and claims are incorporated herein by reference in their entirety: Japanese Patent Application No. 2019-197960 filed on Oct. 30, 2019, Japanese Patent Application No. 2019-197961 filed on Oct. 30, 2019, Japanese Patent Application No. 2019-237754 filed on Dec. 27, 2019, and Japanese Patent Application No. 2020-103396 filed on Jun. 15, 2020.

INDUSTRIAL APPLICABILITY

The present disclosure is useful as a display system that causes a display represented by an electronic mirror and mounted in a vehicle, for example, to display images.

The invention claimed is:

1. A display system, comprising:
a display that emits, from a display surface, light corresponding to image information;
a half mirror that receives the light emitted, reflects, as reflected light, a first component of the light received, and transmits a second component of the light received, the second component being different from the first component; and
a first reflecting mirror having a concave surface that receives and reflects the reflected light toward the half mirror, wherein
the half mirror includes a first retardation film, a first support substrate, and a reflective polarizing film stacked in this order from a side on which the light emitted is received, the first retardation film changing a phase of the light received, the first support substrate being light-transmissive, the reflective polarizing film reflecting a first polarized component and transmitting a second polarized component different from the first polarized component.

2. The display system according to claim 1, wherein
the half mirror further includes a second retardation film on a surface of the reflective polarizing film opposite to the first support substrate, and
the second retardation film changes a phase of the second polarized component transmitted through the reflective polarizing film.

3. The display system according to claim 1, wherein
the half mirror further includes, on a surface of the reflective polarizing film opposite to the first support substrate, a second support substrate that is light-transmissive.

4. The display system according to claim 1, wherein
the half mirror further includes, on a surface of the first retardation film opposite to the first support substrate, a third support substrate that is light-transmissive.

5. The display system according to claim 1, further comprising:
a second reflecting mirror different from the first reflecting mirror.

6. The display system according to claim 1, wherein
the image information indicates an image captured by an imaging device.

7. The display system according to claim 1, wherein
the display includes:
a light supplier that supplies linearly polarized light as the light corresponding to the image information, and
a third retardation film that changes a phase of the linearly polarized light supplied from the light supplier and emits the linearly polarized light as the light emitted.

8. The display system according to claim 1, further comprising:
a case including inside, the display, the half mirror, and the first reflecting mirror; and
a camera in the case, wherein
the case includes an emitter that emits a ray reflected by the first reflecting mirror,
the ray emitted from the emitter enters an eye of an observer to display a video of an area behind a vehicle that employs the display system, and
an imaging direction of the camera is directed to an inside of an interior of the vehicle.

9. The display system according to claim 8, wherein
the camera is located in a vicinity of the emitter.

10. The display system according to claim 9, further comprising:
a near-infrared light source around the emitter, wherein
near-infrared light is emitted from the near-infrared light source in the imaging direction of the camera.

11. The display system according to claim 8, wherein
the first reflecting mirror functions to transmit near-infrared light and reflect visible light, and
the camera is built in the case in a position opposite to the emitter as seen from the first reflecting mirror.

12. The display system according to claim 11, further comprising:
a near-infrared light source around at least one of the emitter and the camera, wherein
near-infrared light is emitted from the near-infrared light source in the imaging direction of the camera.

13. The display system according to claim 8, further comprising:
a near-infrared light source that emits a near-infrared light in the imaging direction of the camera, wherein
the half mirror functions to reflect the near-infrared light, and
one of the camera and the near-infrared light source is located close to the emitter of the case to face the half mirror.

14. The display system according to claim 8, further comprising:
a controller electrically connected to the display and the camera, wherein
the controller detects at least one value or an amount of change of a face position, a viewpoint, and a viewing direction based on a video of the observer captured by the camera, and changes at least one of a position and a size of the video based on the at least one value or the amount of change.

15. The display system according to claim 8, further comprising:
a controller electrically connected to the display and the camera, wherein
the controller detects a viewpoint of the observer captured by the camera, and issues an alert signal upon determination that the viewpoint falls out of a fixed eye-box.

16. The display system according to claim 5, wherein
the second reflecting mirror is a plane mirror having a planar reflecting surface that directly reflects a ray emitted from the display, and
the display system further includes:
an interior display that is integral with the second reflecting mirror, located directly on or indirectly above the planar reflecting surface, and displays an interior pattern corresponding to at least a part of a rear interior of a vehicle; or a display, for displaying an exterior, that displays an exterior pattern corresponding to at least a part of a rear exterior of the vehicle, and once the ray reflected by the first reflecting mirror and superimposed on the interior pattern or the exterior pattern enters an eye of observer, the display system displays a video and the interior pattern or the exterior pattern.

17. The display system according to claim 16, wherein the interior display or the exterior display includes the interior pattern or the exterior pattern displayed on the planar reflecting surface of the second reflecting mirror.

18. The display system according to claim 16, wherein the interior display or the exterior display is a second display element separated from a first display element that is the display, and capable of displaying the interior pattern or the exterior pattern.

19. The display system according to claim 18, further comprising:

a controller electrically connected to the first display element and the second display element, and a switch electrically connected to the controller, wherein through operation of the switch, the controller switches display and non-display of the interior pattern or the exterior pattern on the second display element.

20. The display system according to claim 16, wherein the video to be displayed by the display is obtained by combining a video of an area straight behind the vehicle, a video of behind the vehicle to right, and a video of behind the vehicle to left, and the rear interior of the vehicle is viewed from a dash board of the vehicle.

* * * * *